(12) United States Patent
Yamashita et al.

(10) Patent No.: US 9,122,121 B2
(45) Date of Patent: Sep. 1, 2015

(54) RECORDING MEDIUM AND IMAGE RECORDING SET

(71) Applicants: Daiki Yamashita, Kanagawa (JP); Nozomu Tamoto, Shizuoka (JP)

(72) Inventors: Daiki Yamashita, Kanagawa (JP); Nozomu Tamoto, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/293,066

(22) Filed: Jun. 2, 2014

(65) Prior Publication Data

US 2014/0362158 A1    Dec. 11, 2014

(30) Foreign Application Priority Data

Jun. 11, 2013  (JP) .................................. 2013-123245
Dec. 13, 2013  (JP) .................................. 2013-258292

(51) Int. Cl.
| | | |
|---|---|---|
| *B41J 2/315* | (2006.01) | |
| *B41M 5/00* | (2006.01) | |
| *G02F 1/167* | (2006.01) | |
| *B41J 2/32* | (2006.01) | |
| *G02F 1/09* | (2006.01) | |

(52) U.S. Cl.
CPC .  *G02F 1/167* (2013.01); *B41J 2/32* (2013.01); *G02F 1/09* (2013.01); *G02F 2001/094* (2013.01)

(58) Field of Classification Search
USPC ................... 347/99, 100, 171, 215, 217, 221; 359/245, 253, 254, 265, 290, 291, 296, 359/298; 349/33; 345/107; 430/31, 32
See application file for complete search history.

(56) References Cited

U.S. PATENT DOCUMENTS

| | | | |
|---|---|---|---|
| 2012/0249711 A1 | 10/2012 | Tamoto | |
| 2014/0307039 A1* | 10/2014 | Tamoto et al. | ................ 347/221 |

FOREIGN PATENT DOCUMENTS

| | | | | |
|---|---|---|---|---|
| AE | 2013-015580 | | 1/2013 | |
| JP | 50-015115 | | 6/1975 | |
| JP | 64-086116 | | 3/1989 | |
| JP | 2-196227 | | 8/1990 | |
| JP | 2000132122 A | * | 5/2000 | ............... G09F 9/37 |
| JP | 2001-147451 | | 5/2001 | |
| JP | 2001-301325 | | 10/2001 | |
| JP | 2002-365670 | | 12/2002 | |
| JP | 2003-091022 | | 3/2003 | |
| JP | 2003-149691 | | 5/2003 | |
| JP | 2003149691 A | * | 5/2003 | .............. G02F 1/167 |
| JP | 2005-227795 | | 8/2005 | |
| JP | 2005-232108 | | 9/2005 | |
| JP | 2007-011342 | | 1/2007 | |
| JP | 2007-140367 | | 6/2007 | |
| JP | 2007-286124 | | 11/2007 | |
| JP | 2010-002933 | | 1/2010 | |
| JP | 2010-256560 | | 11/2010 | |
| JP | 2012-215835 | | 11/2012 | |
| JP | 2014-077984 | | 5/2014 | |
| WO | WO2014/046217 A1 | | 3/2014 | |

* cited by examiner

*Primary Examiner* — Hai C Pham
(74) *Attorney, Agent, or Firm* — Cooper & Dunham LLP

(57) ABSTRACT

A recording medium includes a first substrate, a second substrate, and an image recording layer with insulating properties provided between the first substrate and the second substrate, the image recording layer containing cells each encapsulating at least one of electrophoretic particles or magnetophoretic particles, a dispersion medium, and at least two kinds of thermoreversible gelling agents.

18 Claims, 16 Drawing Sheets

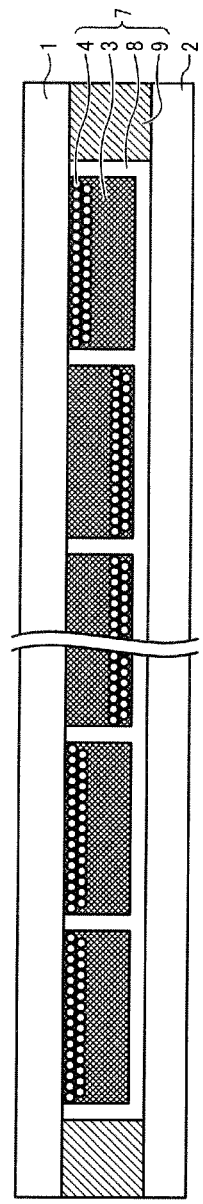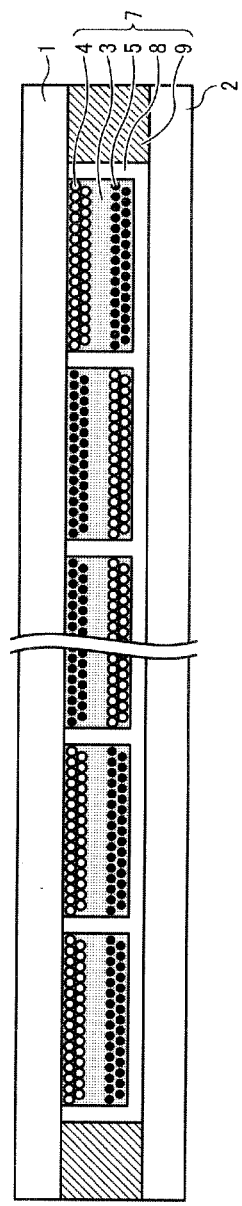

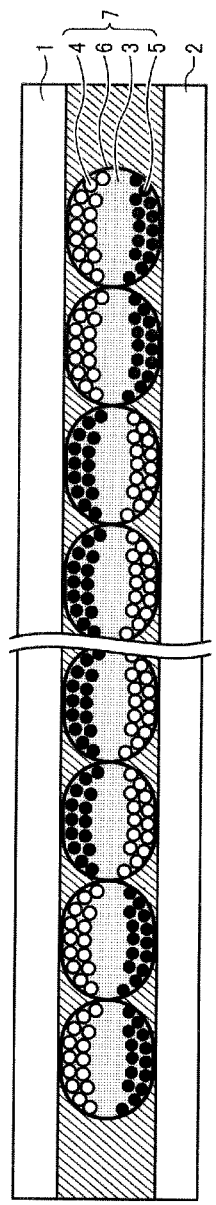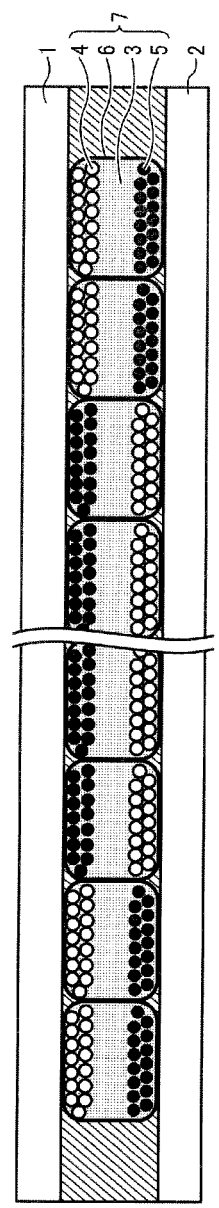

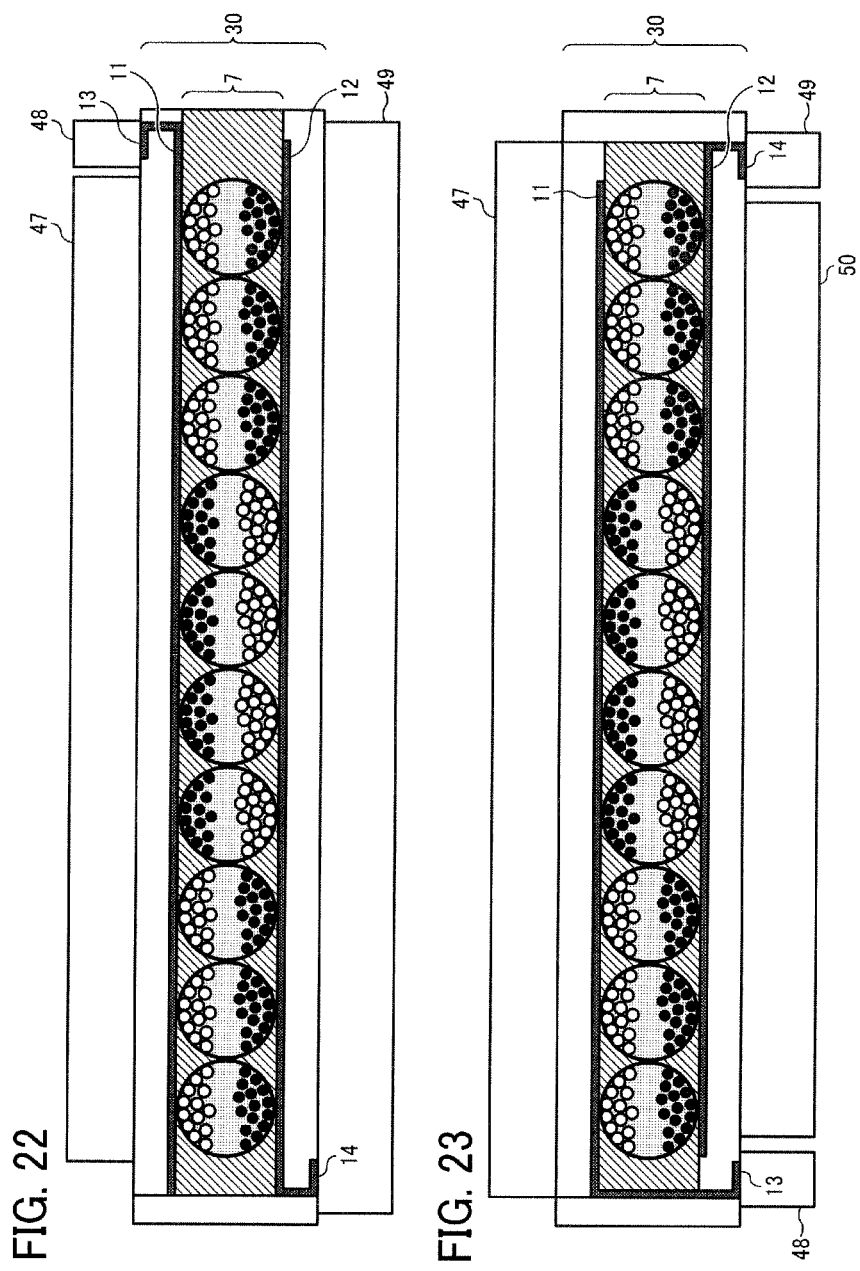

RECORDING MEDIUM AND IMAGE RECORDING SET

CROSS-REFERENCE TO RELATED APPLICATIONS

This patent application is based on and claims priority pursuant to 35 U.S.C. §119(a) to Japanese Patent Application Nos. 2013-123245 and 2013-258292, filed on Jun. 11, 2013 and Dec. 13, 2013, in the Japan Patent Office, the entire disclosures of which are hereby incorporated by reference herein.

BACKGROUND

1. Field of the Invention

The present invention relates to a recording medium and an image recording set.

2. Background Art

In recent years, electronic paper has been put into practical use and gained attention because it is visible and portable like paper material, thin, and lightweight requiring no backlight and less power consumption.

Electronic paper is classified into internally-driven paper-like display (hereinafter referred to as PLD) that includes a drive element inside to display images by itself and externally-driven rewritable paper using a recording medium on which writing is performed by a printer.

The rewritable paper includes all recording media such as paper and sheets on which rewriting can be repeatedly performed.

Various systems of electronic paper have been proposed. Of these, as a PLD, an electrophoretic system, that conducts display by changing an optical reflectance by migrating white and/or colored particles charged in a liquid to the surface side or the opposite direction of a display medium by an electric field is known as the most practical system.

As an example of the electronic paper of such system, JP-S50-15115-B discloses a display or recording device, in which an electric field is applied to a mixed multi particle dispersion system containing particles that migrate in opposite directions depending on the electric field, to optically shield certain particles, thereby changing optical reflection characteristics of the dispersion system. In addition, JP-2551783-B1 (JP-H01-086116-A) discloses an electrophoretic display device, in which a large number of microcapsules each encapsulating a dispersion system obtained by dispersing electrophoretic particles in a colored dispersion medium are provided between a pair of counter electrode plates.

Furthermore, JP-4410135-B1 (JP-2005-227795-A) discloses an ink, in which an electric field is applied to microcapsules each containing first particles and second particles having reverse polarity to that of the first particles to thereby migrate either the first particles or second particles to the surface.

As described above, the electrophoretic system, in particular a microcapsule electrophoretic system, has already been put into practical use as electronic paper and become appealing.

Such electrophoretic electronic paper is capable of retaining displayed content without requiring electric power once displaying the content, which is recognized as one of the advantages. However, in fact, image density changes with time unless an electric field is applied or image quality deteriorates by static electricity and pressure from outside.

In attempts to solve these problems, for example, JP-2007-286124-A discloses a method of controlling a solubility parameter in a dispersion medium by making walls of microcapsules formed by a graft copolymer. Also, JP-2010-002933-A discloses a method of dissolving or dispersing a polymer that does not become thick in a fluid suspension.

These technologies are appropriate to improve the image retention (retentiveness) required for PLD.

However, these are not sufficient to retain images on rewritable paper.

This difference lies in the structures and the purposes of use of PLD and rewritable paper.

PLD has a substrates each having an electric conductive layer, as electrodes, at the top and the bottom of a display layer in which electrophoretic particles move and is covered by a housing, so that it is never or little affected from the outside. In addition, a voltage can be applied thereto if desired, thereby retaining an image on PLD.

However, rewritable paper is not covered by a housing and is easily affected from the outside. In addition, a recording medium includes no element or power source to apply a voltage, meaning that retaining an image from outside for a long period of time is impossible.

It is possible to reduce an impact from outside by providing a protective layer to cover rewritable paper in some cases. However, this is not sufficient to enhance image retention. As a result, advantages such as flexibility and low cost of rewritable paper are lost.

Taking into account the purpose of PLD, images are frequently rewritten and demand for image retention is not strict. By contrast, rewritable paper is required to retain records for a long period of time, almost permanently, like paper.

As a technology to significantly enhance image retention, there are a number of methods including controlling the viscosity of a dispersion medium in which electrophoretic particles are dispersed, lowering the viscosity by heating to conduct recording, and thereafter fixing colored particles by cooling-down.

For example, JP-S50-15115-B1 mentioned above discloses a method of using a resin, rubber, waxes, or synthetic waxes that are solid at normal temperatures and softened thermally or chemically.

JP-4168556-B1 (JP-2001-147451-A) discloses a method of forming a uniform liquid phase by dissolving a solid phase of a dispersion medium, which has both solid and liquid phases present at room temperature, during electrophoretic migration in a liquid dispersion containing electrophoretic particles, the dispersion medium, a dye, and a dispersant.

JP-2001-301325-A discloses a method in which a heat-meltable substance that is solid when it is not heated and becomes liquid when it is heated, specifically, waxes, saturated fatty acid, higher alcohols, and electrophoretic fine particles are encapsulated into microcapsules.

JP-2002-365670-A discloses a method using a mixture that has fluidity at an electrophoretic operating temperature, and becomes an optically opaque solid at temperatures lower than the electrophoretic operating temperature, specifically, a mixture of a substance selected among long-chain alcohols, phenols, aromatic ketones, decanes, and dodecanes and a substance selected among paraffin, waxes, and saturated hydrocarbons.

JP-2003-91022-A discloses a method using higher paraffin hydrocarbons, waxes, or aromatic hydrocarbons as dispersion medium that is solid at normal temperatures and becomes liquid by heating.

JP-2007-140367-A discloses a method in which a dispersion medium is composed mostly of rice wax and contains a surfactant.

Thus, a dispersion medium that is solid at normal temperatures and becomes liquid when being heated is very effective for improvement in image retention because electrophoretic particles are fixed by cooling after recording.

However, since these technologies use a dispersion medium to which waxes and saturated aliphatic acids are added, temperature responsiveness is low in transition between the solid state and the liquid state of electrophoretic particles, which causes problems such that rewriting speed decreases, the viscosity of a dispersion medium is not sufficiently lowered even when heated, thereby degrading contrast, or the quality of an image deteriorates over repeated rewriting.

Further, the dispersibility of electrophoretic particles significantly deteriorates when compared to a case where a solvent is used as the dispersion medium. For this reason, electrophoretic properties may be impaired or particles aggregates, thereby degrading image quality.

A method of using a dispersion medium that turns into a gel in a PLD is disclosed. For example, JP-H02-196227-A discloses a thermal writing system which includes a dispersion medium that turns into a gel and a sol (liquid) reversibly depending on temperatures and electrophoretic particles and locally migrates the electrophoretic particles by locally converting the dispersion medium into a sol.

However, with this technology, as a dispersion medium that turns into a gel and a liquid, specifically, a solvent is used for a high-molecular weight substance, resulting in a poor solvent. This high-molecular weight substance is dissolved when the temperature of the solvent is high and the high-molecular substance becomes insoluble and turns into a gel when the temperature is low, so that the high-molecular substance itself does not have thermal reversibility.

Therefore, the temperature responsiveness is low in transition between a gel and a liquid and liquefaction is locally limited, so that display speed and image quality are not satisfactory.

JP-2003-149691-A discloses a display gel for electrophoretic display containing a dispersion medium, white particles, colored particles, and a gelling agent.

However, in this technology, although a gelling agent is contained in the dispersion medium, thermal reversibility is not described. Actually, due to gellation, the dispersion medium is substantially equally divided into continuous and/or discontinuous minute regions and turns into a gel and the particles electrophoretically migrate by the action of an electric field in the dispersion medium in a gel state.

Therefore, the problems regarding rewriting speed and contrast remain unsolved.

JP-2007-11342-A discloses a display medium for electrophoretic display containing a set of a liquid system, a thermoreversible gelling agent, and colored particles for PLD.

With this technology, by containing the thermoreversible gelling agent, the display medium turns into non-gel and is reduced in viscosity at temperature close to or higher than the melting point of the gelling agent, so that images can be formed in a display device. When the display device is cooled after an image is formed, the medium turns into a gel, so that the image is stably maintained without an application of an electric field.

In the method using a thermoreversible gelling agent, the gelling agent itself causes gelatinization, so that the temperature responsiveness is higher and more stable than in the conventional technologies in which waxes and solders are added or gelatinization is controlled by the solubility of a high-molecular substance in a solvent, so that this method is very excellent for enhancing image retentiveness.

However, considering that the thermoreversible gelling agent is also controlled by temperature, the adverse impact on reduction in rewriting speed becomes large for frequent image rewriting.

As described above, since this technology using a thermoreversible gelling agent is used for a display device, that is, a PLD, deterioration of display responsiveness is greater than the advantage of semipermanent image retentiveness demonstrated by using a thermoreversible gelling agent.

In addition, a heating device and a cooling device must be provided inside the device, so that the thickness and weight of the PLD increase, which also creates a large disadvantage. Therefore, the effect of use of the thermoreversible gelling agent has not been sufficiently utilized nor applied to a PLD in reality.

The PLD, mainly used as a conventional display, has currently been largely developed and significantly advanced. However, the advancement of the rewritable paper, which is mainly used as conventional paper, has been slightly delayed as compared with the PLD.

However, there is a need for paper different from that for a display, and the spread of rewritable paper that can be handled in the same manner as paper has been expected.

Problems of rewritable paper lie in image retentiveness, image quality, and rewriting property.

As described above, age retentiveness is a large issue for rewritable paper rather than for PLD.

The PLD is configured as a device for rewriting, so that the frequency of rewriting is naturally high.

Therefore, it does not necessarily require semipermanent image retentiveness.

On the other hand, although the rewritable paper is rewritable, high image retentiveness is required considering that it is used instead of paper.

In addition, since rewritable paper is not covered by a housing, it is more vulnerable to external static electricity and pressures than the PLD, which is covered by a housing, so that enhancing image retentiveness is a big problem for rewritable paper.

Therefore, image retentiveness is a very significant issue for rewritable paper rather than for PLD.

For this reason, a thermoreversible gelling agent is more useful for rewritable paper than PLD.

However, the image quality of rewritable paper is significantly dependent on the kind of a thermoreversible gelling agent so that it is necessary to appropriately select a thermoreversible gelling agent to improve the image quality.

For example, a dispersion medium containing a thermoreversible gelling agent precipitates during gelation unless an appropriate gelling agent is used. Such precipitation leads to production of defective images with beads, which results in low contrast and uneven image density.

In addition, such a dispersion medium has come to be crystallized while repeating solation and gelation, so that the dispersing agent is not solated in the end, which makes it impossible to rewrite images.

SUMMARY

The present invention provides an improved recording medium that includes a first substrate, a second substrate, and an image recording layer with insulating properties provided between the first substrate and the second substrate, the image recording layer containing cells each encapsulating at least one of electrophoretic particles or magnetophoretic particles, a dispersion medium, and at least two kinds of thermoreversible gelling agents.

As another aspect of the present invention, an improved image recording set is provided which includes the recording medium mentioned above and an image recording device having a heating device to heat the image recording layer and at least one of an electric field application device and a magnetic field application device to apply at least one of an electric field and a magnetic field to the image recording layer.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein;

FIG. 2 is a schematic diagram illustrating an example of the recording medium using cells according to an embodiment of the present invention;

FIG. 3 is a schematic diagram illustrating another example of the recording medium using cells according to an embodiment of the present invention;

FIG. 6 is a schematic diagram illustrating an example where a cross-section of the image recording layer is a substantially circle;

FIG. 7 is a schematic diagram illustrating an example where a cross-section of the image recording layer is a polygon;

FIG. 22 is a schematic diagram illustrating another example of an image recording device in the image recording set according to an embodiment of the present invention;

FIG. 23 is a schematic diagram illustrating another example of an image recording device in the image recording set according to an embodiment of the present invention;

DETAILED DESCRIPTION

Figure 1:
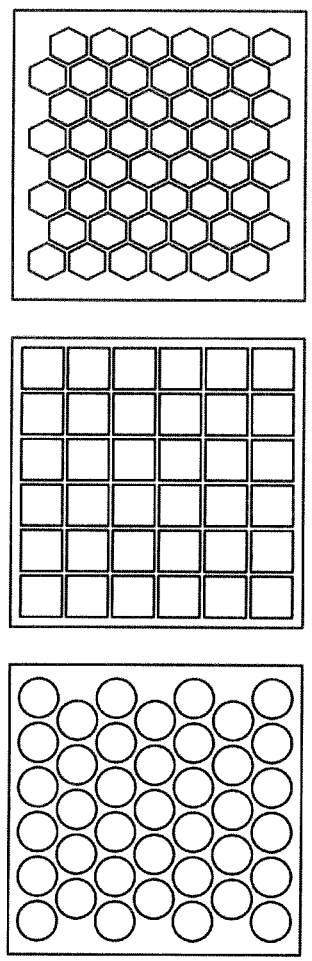
FIG. 1 is diagrams illustrating examples of forms of cells for use in the image recording layer of a recording medium using the cells according to an embodiment of the present invention.

The present invention is to provide a recording medium having high image quality, rewritability, and image retentiveness.

The present disclosure will be described below in detail with reference to several embodiments and accompanying drawings.

The several embodiments are as follows:

(1): A recording medium that includes a first substrate, a second substrate, and an image recording layer with insulating properties provided between the first substrate and the second substrate, the image recording layer comprising cells each encapsulating at least one of electrophoretic particles or magnetophoretic particles, a dispersion medium, and at least two kinds of thermoreversible gelling agents.

(2): The recording medium mentioned above, wherein the thermoreversible gelling agents contain at least one of amide bonds or urethane bonds in molecules of the thermoreversible gelling agents.

(3): The recording medium mentioned above, wherein at least one of the thermoreversible gelling agents contains a chemical structure compatible with the dispersion medium.

(4): The recording medium mentioned above, wherein at least one of the thermoreversible gelling agents contains at least one of an alkyl group having 8 to 20 carbon atoms, an alkylene group having 8 to 20 carbon atoms, and a siloxane bond.

(5): The recording medium mentioned above, wherein the dispersion medium is a liquid containing at least one of an alkyl group or a siloxane bond.

(6): The recording medium mentioned above, wherein the first substrate or the second substrate is electroconductive.

(7). The recording medium mentioned above, further having an electroconductive layer provided between the first substrate and the image recording layer or the second substrate and the image recording layer and an electrode arranged at an exterior of the recording medium, wherein the electroconductive layer and the electrode are electrically connected.

(8): The recording medium mentioned above, further having a first electroconductive layer between the first substrate and the image recording layer and a first electrode at an exterior of the recording medium, wherein the second substrate is electroconductive and the first electroconductive layer and the first electrode are electrically connected.

(9). The recording medium, further having a first electroconductive layer between the first substrate and the image recording layer; a second electroconductive layer between the second substrate and the image recording layer, and a first electrode and a second electrode both arranged at exteriors of the recording medium, wherein the first electroconductive layer and the first electrode are electrically connected and the second electroconductive layer and the second electrode are electrically connected.

(10): An image recording set that includes the recording medium mentioned above and an image recording device having a heating device to heat the image recording layer and at least one of an electric field application device or a magnetic field application device to apply at least one of an electric field or a magnetic field to the image recording layer.

(11): The image recording set mentioned above, wherein the heating device is a thermal head.

(12): The image recording set mentioned above wherein the first substrate or the second substrate is an electroconductive substrate, wherein the electric field application device is electrically connected to the electroconductive substrate to generate an electric field in the image recording layer.

(13): The image recording set mentioned above, wherein the recording medium further has an electroconductive layer provided between the first substrate and the image recording layer or the second substrate and the image recording layer and an electrode at an exterior of the recording medium, wherein the electroconductive layer and the electrode are electrically connected and the electric field application device is electrically connected to the electrode to generate an electric field in the image recording layer.

(14): The image recording set mentioned above, wherein the recording medium further has a first electroconductive layer between the first substrate and the image recording layer and a first electrode at an exterior of the recording medium, wherein the second substrate is electroconductive and the first electroconductive layer and the first electrode are electrically connected and the electric field application device is electrically connected to at least one of the first electrode or the second substrate to generate an electric field in the image recording layer.

(15): The image recording set mentioned above, wherein the recording medium further has a first electroconductive layer between the first substrate and the image recording layer, a second electroconductive layer between the second substrate and the image recording layer, and a first electrode and a second electrode both arranged at exteriors of the recording medium, wherein the first electroconductive layer and the first electrode are electrically connected, the second electroconductive layer and the second electrode are electrically connected, wherein the electric field application device is electrically connected to at least one of the first electrode or the second electrode to generate an electric field in the image recording layer.

(16): The image recording set mentioned above, wherein the image recording device further include an image erasing device to erase an image recorded in the recording medium by applying heat and at least one of an electric field or a magnetic field to the recording medium.

(17): The image recording set mentioned above, further including a screen having a sheet-like form and a drive unit to roll up and release the screen, wherein the recording medium is provided to the screen.

Although it is preferable that the image recording medium of the present invention records and erases images repeatedly, a recording medium having a similar installation to the present invention, with a feature to restrict rewritability by an additional device, unit, etc. is also included.

The rewritable paper includes all recording media such as paper and sheets on which rewriting can be repeatedly performed, and is synonymous with a rewritable recording medium included in the present disclosure.

Recording Medium

The recording medium of the present disclosure includes a first substrate, a second substrate, and an image recording layer provided between the first substrate and the second substrate, and other optional members.

Unlike paper-like display (PLD) of internal-driving type having a drive element inside, which is capable of displaying images, this recording medium is an externally driven rewritable recording medium capable of repeatedly recording and erasing images by an external image recording device.

That is, recording and erasing images on a recording medium is carried out by an external image recording device, which is not present in the recording medium.

Accordingly, the recording medium does not necessarily require a drive element or a power source, which is required for PLD to display an image.

The image recording layer contains cells each encapsulating: electrophoretic particles and/or magnetophoretic particles; a dispersion medium; and a thermoreversible gelling agent.

The electrophoretic particles and/or magnetophoretic particles migrate (move) in the dispersion medium as an electric field and/or magnetic field is externally applied.

The dispersion medium disperses the electrophoretic particles and/or magnetophoretic particles.

The thermoreversible gelling agent turns the dispersion medium into a sol (liquidizes the dispersion medium) as the temperature thereof exceed a particular temperature, turns the dispersion medium into a gel (solidifies the dispersion medium) as the temperature thereof becomes a particular temperature or lower, and can reversibly induces sol-gel transition depending on temperatures.

The recording medium of the present disclosure contains a thermoreversible gelling agent in the image recording layer. The thermoreversible gelling agent maintains the dispersion medium in a gel state at display of an image or in storage at room temperature and turns it into liquid form at temperatures higher than room temperature to record (write) an image.

That is, since the dispersion medium maintains a gel form at display or in storage, the electrophoretic particles and/or magnetophoretic particles are prevented from moving, thereby suppressing changes of the quality of image during storage thereof for a long period of time. In addition, images are steadily protected from external stresses such as electrostatics or pressure.

Moreover, since the dispersion medium is liquidized by heat applied at the time of recording (writing), the electrophoretic particles and/or magnetophoretic particles freely move in the image recording layer. According to this phenomenon, images can be repeatedly recorded and erased.

A thermoreversible gelling agent is not suitable for PLD because PLD requires quick image writing. On the other hand, the recording speed achieved by using a thermoreversible gelling agent is suitably applicable to a rewritable recording medium used like paper.

In a case where an image recording layer containing a thermoreversible gelling agent is used as an internally driven PLD having a drive element therein and capable of displaying an image itself as a conventional technique, it is necessary to house, in the display, a heating device or a cooling device as well in addition to a display driving device to apply an electric field to the display. Accordingly, the size and weight of the display increase. Moreover, it is necessary to increase and decrease the temperature every time images are rewritten, which arises problems such that display speed becomes slow and a sufficient display contrast ratio is not obtained.

However, the recording medium of the present disclosure is not PLD but to record images by an external image recording device, which obviates the need of devices to heat and cool the recording medium itself. Accordingly, these devices can be provided in an image recording device separated from the recording medium. That is, the problems involved with PLD such that the size and weight of the recording medium increases, low display speed, and insufficient display contrast ratio, can be solved.

Specifically, the recording medium can be formed into the shape or state similar to paper.

Accordingly, the recording medium of the present disclosure retains images semi-permanently while being free from the problem of low display speed ascribable to a thermoreversible gelling agent, which is not suitable for PLD.

Thermoreversible gelling agents provide such an advantage but image quality, rewritability, and image retentiveness are dependent on the thermal properties of each thermoreversible gelling agent.

Since the thermal properties of a thermoreversible gelling agent depends on the structure thereof, the molecular structure of the thermoreversible gelling agent has to be designed from the beginning to control the thermal properties thereof. However, it is not easy to obtain an optimal molecular structure.

If the thermal property of a thermoreversible gelling agent is not suitably designed, problems fatal to a recording medium arise such that image retentiveness is degraded so that images disappears over time, images disappear when the images are touched by hand after printing, and a thermoreversible gelling agent is not crystallized, which makes solation impossible any more, thereby failing to rewrite images.

However, in the present disclosure, by using a mixture of multiple thermoreversible gelling agents having different molecular structures, controlling thermal properties becomes easy and in addition the crystallization of the thermoreversible gelling agents can be prevented, thereby solving the problems described above.

The recording medium of the present disclosure contains multiple cells in the image recording layer.

Normally, these cells are spaced a constant distance apart.

These cells have a configuration encapsulating electrophoretic particles and/or magnetophoretic particles, a dispersion medium, and a thermoreversible gelling agent. Due to this, deviation of electrophoretic particles and/or magnetophoretic particles are significantly reduced, thereby maintaining the gap between the image recording layer.

As a result, image retention (retentiveness) and the stability of writing and erasing images are improved.

In addition, if there is no cells, the gel in a recording medium is cracked if the recording medium is bent, which has an adverse impact on the quality of image. This problem can be solved by providing such cells in some cases.

There is no specific limit to the form of a cell. However, if the inner angle of the wall of the cell is narrow, electrophoretic particles and/or magnetophoretic particles tend to stay at the angle portion. In order to avoid this, it is suitable to make the inner angle of a cell to be 90° or more. A honeycomb having a hexagaon form is most preferable.

Also, a recording medium having a honeycomb-like form is expected to improve the strength of a recording medium.

The recording medium of the present disclosure using the cell mentioned above can be manufactured easily by, for example, forming a cell on the first substrate and providing the second substrate or a protective layer thereon.

Since the recording medium can be made by such a simple method, the productivity thereof is improved, which is advantageous in terms of economy.

A microcapsule can be used as a form of the cell, which is significantly useful.

When using a microcapsule as the cell, the dispersion medium in the microcapsules can be reversibly changed from sol to gel or the other way round depending on temperatures by encapusulating the thermoreversible gelling agent in the microcapsules together with electrophoretic particles and/or magnetophoretic particles and the dispersion medium.

As a result, the dispersion medium in the microcapsule is immediately liquidized when heated to temperatures higher than room temperature. Accordingly, electrophoretic particles and/or magnetophoretic particles can migrate by an electric field and/or a magnetic field.

If the microcapsule is cooled down thereafter, the electrophoretic particles and/or the magnetophoretic particles do not migrate when an electric field and/or a magnetic field is applied.

For this reason, images can be retained semi-permanently. The dispersion medium in the microcapsule little or never evaporates, which is advantageous to improve the stability of repeating writing images.

In addition, since it is possible to form a microcapsule layer on a substrate by coating, there is an advantage that this can be economically produced by a simple method such as a roll to roll.

Therefore, of the cells, using microcapsules is preferable.

Substrate

There is no specific it to the material for the substrate. Specific examples thereof include, but are not limited to, plastics such as synthetic resins and natural resins, paper, water-proof paper, thin glass, metal plates, and wood plates. Of these, synthetic resins are preferable in terms of flexibility and transparency.

There is no specific limit to the synthetic resin and suitable dsynthetic resins can be selected to a particular application.

Specific examples thereof include, but are not limited to, polyethylene, chlorinated polyethylene, ethylene-vinyl acetate copolymer, ethylene-ethyl acrylate copolymer, polypropylene, polybutadiene, an AS resin, an ABS resin, a methyl methacrylate resin, a vinyl chloride resin, vinyl chloride-vinyl acetate copolymer, vinyl chloride-vinylidene chloride copolymer, vinyl chloride-acrylic ester copolymer, vinyl chloride-methacrylic acid copolymer, vinyl chloride-acrylonitrile copolymer, ethylene-vinyl alcohol-vinyl chloride copolymer, propylene-vinyl chloride copolymer, a vinylidene chloride resin, a vinyl acetate resin, methacrylic acid-styrene copolymer, a polybutyrene resin, methyl methacrylate-butadiene-styrene copolymer, polyvinyl alcohol, polyvinyl formal, a cellulose-based resin, a polyamide-based resin, a polyimide-based resin, a polyacetal resin, a polycarbonate resin, a urethane-based resin, a polyester resin (e.g., a polyethylene terephthalate resin, and a polybutyrene terephthalate resin), a polyphenylene oxide resin, a polysulfone resin, a polyamideimide resin, a polyamino bismaleimide resin, a polyether sulfone resin, a polyphenylene sulfone resin, a polyacrylate resin, a grafted polyphenylene ether resin, a polyether ether ketone resin, a polyether imide resin, a fluorine-based resin (e.g., a polytetrafluoroethylene resin, a polyfluoroethylene propylene resin, tetrafluoroethylene-perfluoroalkoxy ethylene copolymer, ethylene-tetrafluoroethylene copolymer, polyvinylidene fluoride, polychlorotrifluoroethylene, and fluoro rubber), and a silicone-based resin (e.g., a silicone resin, and silicone rubber).

These can be used alone or in combination.

The substrate can be formed of a resin curable by light, heat, electron beams, etc. to enhance damage resistance and abrasion resistance of the recording medium of the present disclosure.

Examples of such resins include, but are not limited to, photocurable resins and themrocurable resins.

In the present disclosure, of these curable resins, acrylic resins, diallyl phthalate resins, epoxy-based resins, urethane resins, melamine resins, and alkyd resins are preferably used.

As the substrate for use in the present disclosure, it is possible and suitable to use a ded from the synthesized resins mentioned above.

Specific examples of such resin films include, but are not limited to, polyolefin-based resin film such as polyethylene film, polypropylene film, and ethylene copolymer film, polyester-based film such as polyethylene naphthalate and aromatic polyesters, polyamide-based film such as Nylon 6, MXD6, and aramid, polyimide film, polyether imide film, polyetherether ketone film, polyether sulfone film, polypheneylene sulfide film, triacetyl cellulose film, polycarbonate film, polystyrene film, polyacrylonitril film, polyvinylchloride film, polyvinilydene chloride film, polyvinyl alcohol film, polyvinylbutyral film, film of copolymer of ethylene and vinyl acetate, film of copolymer of ethylene and vinylalcohol, film of copolymer of ethylene and methacylic acid, ionomer resin film, acrylic film, polyurethane film, and fluorine-containing resin film.

In addition, since these resin films have characteristics that the strength thereof can be enhanced by extending them at a fixed direction while being heated because the molecules thereof are aligned at the deformation direction, films extended along one or two axis direction can be suitably used.

In addition, resin films in which one or both sides are subject to surface treatment such as corona treatment, plasma treatment, frame treatment, or acid alkali treatment can be suitably used.

Furthermore, it is possible to for example, apply, deposit, or ion-plate a coating agent to one or both sides of these resin films.

Using these methods, it is possible to provide reflection protection features or finger print attachment prevention features, improve abrasion resistance and damage resistance, or impart antistat properties.

In the present disclosure, of the resin films, polyethylene terephthalate film, polyethylene naphthalate film, polyimide film, nylon(polyamide)film, and triacetyl cellulose film are preferable.

Also, it is possible and suitable to impart electroconductivity to a substrate. Voltage falling by a substrate is suppressed and the intensity of electric field of an image recording layer can be boosted by using an electroconductive substrate. For this reason, images having a high contrast can be obtained by a lower drive voltage.

Electroconductivity means nature of conducting electricity and is indicated by electroconductivity or resistivity (inverse of electroconductivity).

If measured by using a resistivity meter, surface resistivity or volume resistivity can be obtained.

A specific example of such a resistivity meter available on the market is Hiresta or Loresta, manufactured by Mitsubishi Chemical Analytech Co., Ltd.

The electroconductive substrate are classified into a substrate having an electroconductive surface layer and a substrate having electroconductivity.

The substrate having an electroconductive surface can be obtained by providing an electroconductive film on the surface of a substrate formed of plastic film, glass, etc., which has insulation property.

Such electroconductive film is formed on the surface of a substrate and specific examples of the electroconductive film include, but are not limited to, metal, metal leaf, plated metal, or deposited metal of ITO (indium tin oxide), zinc oxide, gold, silver, copper, aluminum, chromium, tin, nickel, etcl, silver nanowire, graphene, carbon nanotube, electroconductive polymer, or mixtures thereof.

The surface resistivity of the electroconductive film is preferably $10^7$ Ω·cm or lower, more preferably $10^3$ Ω·cm or lower, and furthermore preferably $10^1$ Ω·cm or lower.

The substrate on the side from which a recording medium is viewed is preferably transparent. It is preferable to use a transparent substrate having a surface to which a transparent film is provided.

Also, a substrate having electroconductivity is preferable.

A substrate having electroconductivity obviates the need of providing an electrode separately.

However, since a substrate having electroconductivity is not transparent in many cases, it is preferable to use such a substrate on the reverse side to the side to be viewed of a recording medium.

There is no specific limit to the electroconductive substrate and any electroconductive substrate is suitable. Specific examples thereof include, but are not limited to, metal plates, metal sheets, and metal leafs of gold, silver, copper, aluminum, chrome, tin, nickel, and iron, carbon sheets formed of carbon of graphite, electromagnetic shield film or sheet, electroconductive paper, electroconductive cloth, electroconductive glass, and electroconductive plate.

An elecroconductive substrate obviates the need of a separate electrode but has to have a low surface resistivity and volume resistivity.

The volume resistivity of the electroconductive substrate is preferably $10^7$ Ω·cm or lower, more preferably $10^3$ Ω·cm or lower, or furthermore preferably $10^1$ Ω·cm or lower.

Moreover, it is possible and suitable to add an electroconductive filler to at least one of the first substrate and the second substrate serving as the electroconductive substrate.

This filler means bulking agents or filing. Anything solid contained in a substrate is regarded as a filler.

Specific examples of such fillers include, but are not limited to, metal particulates, metal flakes, metal fiber, metal fiber resins, metal coating fiber, metal coating particles of copper, silver, gold, aluminum, nickel, iron, steel, platinum, zinc, etc.; electroconductive metal oxides such as silica, titanium oxide, alumina, magnesium oxide, berylium oxide, tin oxide, and indium oxide with which antimony, tin, aluminum, etc., are doped; and carbon powder, carbon fiber, or carbon flake of carbon compounds such as black lead, carbon black, carbon nanotube, fullerene, and graphite.

Whether a substrate having an electroconductive surface layer or a substrate having electroconductivity is used, it is preferable that the substrate is formed to be electrically connected with an image recording layer and the exterior of the recording medium.

As a result, an electric field is directly applied to the image recording layer from an image recording device.

In a case of the substrate having an electroconductive surface, an electrode is provided to the exterior of a recording medium for electric connection with the electroconductive surface layer.

An electroconductive substrate for use in a recording medium can be formed at least one of the first substrate and the second substrate.

By this formation, an image having a high contrast can be obtained by a lower drive voltage.

In a system in which the entire of the recording medium is heated to liquidize the dispersion medium in all the cells or microcapsules followed by application of an electric field to a recording area to migrate particles therein to form an image, if an electroconductive substrate is used on the side to which the electric field is applied to form an image, image flow tends to occur or no image is easily recorded.

For this reason, it is preferable to use an electroconductive substrate only on the side opposite to the side to which an electric field is applied.

On the other hand, in a case in which a recording area is heated to migrate particles therein to record an image while an electric field is applied to the entire of the recording medium, there is no restriction as described above. Accordingly, it is preferable to form an electroconductive substrate both on the first substrate and the second substrate.

Since providing an electroconductive substrate both on the first substrate and the second substrate is more advantageous to only one of them in terms of high contrast, reduction of drive voltage, and durability of a recording medium, the latter structure is preferable in the present disclosure.

The recording medium of the present disclosure has an image recording layer between a first substrate and a second substrate, but materials of the first substrate can be the same as or different from those of the second substrate.

Forms of the first substrate and the second substrate are appropriately selected depending on a particular purpose without any limitation, and examples thereof include a sheet-like form.

The first substrate and the second substrate are preferably transparent at the side from which the recording medium is viewed.

The substrate provided on the opposite side to the side from which the recording medium is viewed may be transparent, translucent, or opaque.

In some cases, a high contrast ratio can be attained and visibility can be enhanced by providing an opaque (e.g., white, black, and mono-color) substrate at the opposite side to the side from which the recording medium is viewed.

For example, the recording medium can be produced by using a transparent substrate for the first substrate, which is provided at the side from which the recording medium is viewed and a translucent or opaque substrate for the second substrate, which is provided at the opposite side to the side from which the recording medium is viewed.

Moreover, it is possible and suitable to use paper as opaque substrate.

To prepare an opaque substrate, it is suitable to add fillers such as titanium oxide and carbon black to a substrate.

For example, a white substrate is obtained by adding titanium oxide and a black substrate is obtained by adding carbon black.

In addition, known pigments and particulates can be added to a substrate to obtain a colored substrate.

Moreover, to obtain a white substrate, it is suitable to form many flat voids in a substrate to make the substrate look white by multipath reflection caused at the interface of the flat voids.

The average thickness of the substrate appropriately selected depending on the intended purpose without any limitation, but it is preferably 10 μm to 1,000 μm, more preferably 20 μm to 500 μm, and even more preferably 30 μm to 200 μm.

The average thickness of each of the first substrate and the second substrate is preferably 5 μm to 500 μm, more preferably 10 μm to 250 μm, and even more preferably 15 μm to 100 μm.

In this case, the average thickness of the first substrate and the average thickness of the second substrate may be the same or different.

When the average thickness of the substrate is less than 10 μm, wrinkles and bends may be formed, and image defects may be caused in the case where the wrinkles and bends are formed.

In addition, when the average thickness of the substrate is greater than 1,000 μm, flexibility and portability (thin film, light weight) tend to be insufficient or a high voltage or magnetic field tends to be applied at the time of recording (writing).

Image Recording Layer

The image recording layer has multiple cells encapsulating a liquid dispersion containing at least electrophoretic particles and/or magnetophoretic particles, a dispersion medium, and at least two or more kinds of thermoreversible gelling agent.

The cells optionally encapsulates other components.

A method of producing multiple cells each encapsulating a dispersion liquid containing at least electrophoretic particles and/or magnetophoretic particles, a dispersion medium, and a thermoreversible gelling agent is appropriately selected depending on a particular purpose without any limitation, provided that the method provides a structure where the dispersion liquid is encapsulated in multiple cells provided at particular distance.

For example, cells can be formed of a method including applying a thermoplastic resin or a curable resin onto a substrate, pressing a mold to provide cells against the applied resin followed by microembossing process, thereby forming multiple cells spaced a particular distance apart.

Also, a method is suitable which includes applying a material for forming cells onto a template in which recesses are regularly formed, so as to cover the recesses with the material, and then reducing the pressure of the surrounding air to relatively expand air bubbles present in the recesses at the same time, to thereby form cells.

The recording medium of the present disclosure can be produced by providing, on a substrate, multiple cells spaced a particular distance apart in the aforementioned manner, placing in the cells a liquid dispersion containing at least electrophoretic particles and/or magnetophoretic particles, a dispersion medium, and at least two kinds of thermoreversible gelling agents, and bonding a substrate thereon so as to prevent any air bubbles from letting in.

The aforementioned method uses a coating process and enables to perform continuous production. Therefore, it is very suitable for low cost production.

Moreover, as the cells have wide openings, the recording medium produced by such a method easily achieves high contrast.

A form of each cell is not particularly limited, as long as the liquid dispersion is separated by multiple cells.

For example, as illustrated in FIG. 1, cells of various shapes, such as polygons, circles, and ovals can be provided.

Considering use thereof in the recording medium, however, preferred as shapes of the cells are those each having an area on which a cell is formed as small as possible, and those each having a large angle so as not to collect the particles at a corner of the cell.

The former is preferably a rectangular and the latter is preferably a circle. In order to obtain both characteristics, the forms of the cells are particularly preferably a hexagonal honeycomb shape.

In addition to the characteristics above, the cells having the honeycomb-like form can further give an effect of enhancing the strength of the image recording layer, and therefore the honeycomb-like form is particularly preferable.

In a case in which microcapsules are used, a production method of the microcapsules is appropriately selected depending on the intended purpose without any limitation, and examples thereof include conventional methods known in the art, such as a complex coacervation method, and an interfacial polymerization method, and an in situ polymerization method.

By the coacervation method, microcapsules are formed by separating a uniform phase into a thick phase of polymers accounting for the majority and a thin phase by lowering the temperature of a polymer solution, thereby coacervated small droplets of the thick phase dispersed in the thin phase being caused to adhere to the surfaces of dispersed particles; and maintaining this state.

A specific example of materials used in the complex coacervation is gelatine-Arabian gum.

In the microcapsulation by the interfacial polymerization method, a hydrophobic monomer and a hydrophilic monomer are combined to form layers in reaction at the interface of emulsion droplets.

In the microcapsulation by the in situ polymerization method, which is also referred to as an interface reaction method, wall layer materials of monomers, prepolymers, etc, and polymerization catalysts are provided around core materials to conduct polymerization reaction at the surface (interface) of the core materials, thereby forming a layer.

Specific examples of the materials include, but are not limited to, urea-formaldehyde and melamine-formaldehyde.

Also, a phase separation method, a liquid drying method, and a liquid curing layer forming method are also suitable.

Considering the fact that the particles migrate in each microcapsule, a form of each microcapsule is preferably spherical, i.e., a cross-section of each microcapsule is preferably a circle.

In reality, however, it is preferable that microcapsules be closely filled without a space between the microcapsules to improve image quality. Therefore, there is no specific limit to the cross-section of the microcapsule. For example, forms like a circle, oval, or polygon, or a mixture thereof are suitable.

The size of the microcapsule is preferably from 1 μm to 500 μm, more preferably from 10 μm to 100 μm, and furthermore preferably from 20 μm to 80 μm.

Although large microcapsules are suitable to improve contrast, the drive voltage is increased or images exude in some cases.

In contrast, small microcapsuls are advantageous about image exuding and drive voltage but have a negative impact on contrast in some cases.

When the size is excessively small, the concentration is low even in image reverse, contrast may excessively become low.

The size of the microcapsules in the present disclosure is the diameter for a circle form, the major diameter for an ellipse form, the longest diagonal for a polygon form.

The size of microcapsules is determined by observing a microcapsule layer formed on a substrate by an optical microscope.

For example, the size is determined by calculating the average of the measuring values of, for example, 50 microcapsules to 100 microcapsules arbitrarily selected from the microcapsules observed by an optical microscope.

The size of microcapsules can be controlled by, for example, a sieve.

For example, microcapsule slurry is screened by multiple sieves having different meshes to obtain microcapsules having a desired size range.

In addition, wet classifiers or centrifugals can be used.

The microcapsule layer formed between substrates is preferably a single layer in terms of the quality of image.

If a microcapsule layer is formed by a single layer without being overlapped, drive voltage is decreased, contrast is improved, and non-uniform density is improved in some cases.

In addition, the size of microcapsules is preferably the same.

Microcapsules having the same size has a positive impact on the decrease of non-uniform density.

By using microcapsules, it is possible to prevent evaporation of a dispersion medium, which leads to a stable long working life of a recording medium.

Particularly, the recording medium of the present disclosure is heated every time recording or erasing is conducted, and therefore to prevent vaporization of the dispersion medium is preferable to achieve high image quality, high stability, and long service life of the recording medium. To this end, use of the microcapsules is more preferable.

In addition, a recording medium using a microcapsule as cell is advantageous in that it can be rolled up or bent without leaking the liquid solvent.

Moreover, slurry of the microcapsules makes it possible to manufacture recording media by coating, which is advantageous in low cost production thereof.

It is preferable that the microcapsules formed on the substrate is fixed thereon by a binder resin.

The binder resin also serves to secure insulating properties of an image recording layer in addition to fixing of microcapsules.

In particular, in a case where electric conductive layers or electric conductive substrates are provided above and below the microcapsules, it is not possible to apply an electric field to the image recording layer of an image recording medium unless the image recording layer has insulating properties. If an electric field is not applied, the particles in the image recording layer do not migrate to record an image.

As for the binder resin, suitably used is a resin having excellent insulating properties and high affinity or adhesion to a substrate, electronic conductive layer, or microcapsules.

A type of the resin for use is not particularly limited. Specific examples thereof include, but are not limited to, a thermoplastic resin and a curable resin known in the art. These resins are more preferably Merino- or photo-curable.

A microcapsule layer having insulation properties is easily formed on a substrate by mixing any of these binder resins with the microcapsules and applying the mixture onto the substrate followed by drying.

In a case where the microcapsules are not mixed with water, various resin materials can be used. In a case of slurry in which the microcapsules are mixed with water, an aqueous resin is preferably used.

Of such aqueous resins, a resin to which a hydrophilic group or hydrophilic segment is provided, an emulsion in which a hydrophilic resin is forcibly emulsified using a surfactant, a prepolymer which is blocked with a blocking agent having an hydrophilic group, or a blocked prepolymer to which a hydrophilic segment has been provided are preferable, and an aqueous urethane resin having these functions is particularly preferable.

It is preferable to impart the image recording layer with insulating properties by using only a binder resin mixed with the microcapsules. In a case where insulating properties are not sufficient, however, it is possible to further apply an insulating resin onto the microcapsule layer to form an image recording layer, and this method is suitable to maintain insulating properties of the image recording layer.

If a microcapsule is a slurry mixed with water but once can be applied to a substrate to form a layer together with an aqueous resin, even a mixture of a resin and an organic solvent can be applied to the layer. Therefore, the insulating resin can be selected from a wide range of resins.

However, if an insulating resin layer is significantly thicker than a microcapsule layer, the image recording layer becomes thick, thereby weakening the electric field, so that images having low contrast may be produced.

Accordingly, it is desirable that the insulating resin layer is not significantly thicker than the microcapsule layer.

In the present disclosure, the binder resin for use in the image recording layer or the resin layer formed to maintain the insulating properties of the image recording layer or protect microcapsules can be formed of the same material as that of the substrate.

That is, the image recording layer and the substrate for use in the present disclosure do not necessarily have an interface. If a resin, how slight the amount thereof may be, is attached to the microcapsule, it can be regarded as a substrate.

For example, in an image recording layer formed by applying a liquid dispersion in which microcapsules are mixed with a binder resin to a first substrate, if the reverse side of the microcapsule on the first substrate is covered with a binder resin, the binder resin is regarded as the second substrate.

Electrophoretic Particles and Magnetophoretic Particles

The electrophoretic particles are appropriately selected depending on the intended purpose without any limitation, provided that they are particles that can exhibit electrophoresis in a fluid dispersion medium upon application of electric field. Specific examples thereof include, but are not limited to, an organic pigment and an inorganic pigment.

A type of the pigment may be selected depending on a color of an image to be recorded in the recording medium of the present disclosure.

Specific examples of black electrophoretic particles include, but are not limited to, carbon black, aniline black, titanium black, furnace black, lamp black and black iron oxide.

Specific examples of red electrophoretic particles include, but are not limited to, rhodamine 6G lake, dimethylquinacridone, watching red, lake red C, brilliant carmine 6B, rose Bengal, rhodamine B, alizarin lake, lithol red, permanent red 4R, and benzidine red.

Specific examples of yellow electrophoretic particles include, but are not limited to, chrome yellow, benzidine yellow, hansa yellow, naphthol yellow, molybdenum yellow, quinoline yellow and tartrazine.

Specific examples of blue electrophoretic particles include, but are not limited to, phthalocyanine blue, methylene blue, cobalt blue, victoria blue, methyl violet, aniline blue, ultramarine blue, sky blue, indanthrene blue and cerulean blue.

Specific examples of green electrophoretic particles include, but are not limited to, phthalocyanine green, malachite green lake, naphthol green, emerald green, viridian, cobalt green and chrome oxide.

Specific examples of purple electrophoretic particles include, but are not limited to, fast violet, methyl violet lake, indigo, mineral violet and cobalt violet.

Specific examples of brown electrophoretic particles include, but are not limited to, toluidine maroon, indanthrene red violet RH, burnt umber and iron oxide.

Specific examples of white electrophoretic particles include, but are not limited to: metal oxide, such as titanium oxide, zinc oxide, antimony oxide, aluminum oxide, and silicon dioxide; barium titanate; and barium sulfate.

These may be used alone or in combination of two or more thereof.

It is also possible to use white electrophoretic particles, which have been colored with various colorants, such as the aforementioned pigments or dyes.

In addition, in the present disclosure, electret particles can be suitably used as the electrophoretic particles.

Electret particles have semi-permanently charges by, for example, methods using electron beams, radiation ray, corona discharging, etc.

By using electret particles, the charging size of particles can be uniformed, which is advantageous to the quality of images in some cases.

In order to enhance dispersibility of the electrophoretic particles in the dispersion medium, prevent aggregations thereof, and stably migrate electrophoretic particles, it is preferable that the electrophoretic particles particles are subject to surface treatment.

A coupling agent is mainly used for the surface treatment.

Specific examples of the coupling agent include a chromium-based coupling agent, a silane-based coupling agent, a titanate-based coupling agent, an aluminum-based coupling agent, a zirconium-based coupling agent, a zircon-alummi-nate coupling agent and a fluorine-based coupling agent.

As for the surface treatment, also suitable are a method for forming graft chains on the surfaces of electrophoretic particles, and a method for coating the surfaces of electrophoretic particle with a polymer.

The magnetophoretic particles are appropriately selected depending on the intended purpose without any limitation, provided that they are particles that can exhibits magnetophoresis in a fluid dispersion medium upon application of magnetic field. Specific examples thereof include, but are not limited to, a ferromagnetic material, such as ferromagnetic metal (e.g., iron, nickel, and cobalt) and an alloy containing the ferromagnetic metal; and permanent magnet, such as ferrite magnet, and alloy magnet.

Specific examples thereof include, but are not limited to, black iron oxide, porous iron oxide, black magnetite, γ-hematite, manganese dioxide-containing iron oxide, chromium dioxide, ferrite, iron, nickel, cobalt, gadolinium and alloys thereof.

It is also possible to use magnetophoretic particles having urfaces colored by various coloring agents.

For the purpose of enhancing dispersibility of the electrophoretic particles and/or magnetophoretic particles in the dispersion medium, preventing aggregations thereof, and achieving stable electrophoresis, it is preferred that the electrophoretic particles and/or magnetophoretic particles are subject to a surface treatment.

A coupling agent is mainly used for the surface treatment.

Specific examples of the coupling agent include a chromium-based coupling agent, a silane-based coupling agent, a titanate-based coupling agent, an aluminum-based coupling agent, a zirconium-based coupling agent, a zircon-alumminate coupling agent and a fluorine-based coupling agent.

As for the surface treatment, also suitable are a method for forming graft chains on surfaces of the electrophoretic particles and/or magnetophoretic particles, and a method for coating surfaces of the electrophoretic particles and/or magnetophoretic particles with polymer.

The average particle diameter of the electrophoretic particles and/or the magnetophoretic particles is appropriately selected depending on the intended purpose without any limitation. It is preferably from 0.01 µm to 20 µm, more preferably from 0.03 µm to 5 µm, and particularly preferably from 0.1 µm to 1 µm.

When the average particle diameter thereof is too large, the responsiveness of particles tends to be low, or the dissolution of an image tends to be low. When the average particle diameter thereof is too small, particles are easily aggregated to each other, or the image density of a resulting image tends to be low.

The average particle diameter means the particle diameter of the average primary particle diameter representing a particle group and is represented by the number average particle diameter.

Specifically, particles are directly taken out, or the recording medium of the present disclosure is cut and the section thereof is directly observed under an electron microscope. Thereafter, primary particle diameters of the particles are determined, and the average value of these primary particle diameters (for example, the average value of 100 particles) is calculated and determined as the average particle diameter.

Electrophoretic particles and/or magnetophoretic particles can be used alone or in combination.

In a case where one kind of particles is used, an image can be formed by coloring the dispersion medium and coloring the particles in a different color from that of the dispersion medium.

In a case where two kinds of particles are used, an image can be formed by using groups of particles each having different colors and charge polarities.

Alternatively, if three or more kinds of particles are used, an image can be formed by a combination of two or more kinds of the electrophoretic particles and/or magnetophoretic particles and one or more kind of non-electrophoretic particles and/or non-magnetophoretic particles.

Either of the electrophoretic particles or magnetophoretic particles can be used to record an image in the recording medium of the present disclosure. The electrophoretic particles and the magnetophoretic particles each can form an image upon application of electric field and magnetic field, respectively. In view of obtainable image quality and recording speed, use of the electrophoretic particles is preferable.

However, it is to be noted that it is possible to use the electrophoretic particles and the magnetophoretic particles in combination. By providing an image recording device with a device to apply an electric field and magnetic field, the electrophoretic particles and the magnetophoretic particles having different colors from each other are individually controlled. As a result, multicolor image formation can be achieved.

There is no specific limit to the amount of the electrophoretic particles and/or magnetophoretic particles in the image recording layer. It is appropriately determined to a particular application.

Dispersion Medium

There is no specific limit to any liquid dispersion medium at room temperature that disperses electrophoretic particles and/or magnetophoretic particles. Specific examples of the dispersion medium include, but are not limited to, an organic solvent, silicone oil, and water.

Of these, a dispersion medium having an alkyl group and/or a siloxane bond is preferable because these easily enhance migration property, responsiveness, and dispersability of electrophoretic particles and/or magnetophoretic particles and improve compatibility with the thermoreversible galling agent mentioned above.

For example, the following organic solvents and silicone oils are preferable.

Specific examples of the organic solvent include: an alcohol-based solvent, such as methanol, ethanol, and isopropanol; chain or cyclic aliphatic hydrocarbons, such as pentane, hexane, heptane, octane, nonane, decane, dodecane, isohexene, isodoctane, isododecane, tetradecane, dodecylbenzene, cyclohexane, kerosene, ISOPAR™, naphthene, liquid paraffin, and petroleum; aromatic hydrocarbons, such as benzene, toluene, xylene, alkyl benzene, solvent naphtha, phenylxyl ethane, diisopropyl naphthalene; and halogenated hydrocarbon, such as carbon tetrachloride, chloroform, dichloromethane, ethyl bromide, trichloroethylene, tetrachloroethylene, trifluoroethylene, tetrafluoroethylene, trichlorotrifluoroethylene, and tetrachlorofluoroethylene.

Of these, organic solvent having alkyl groups are preferable and non-polar solvents, in particular, aliphaticl hydrocarbons are more preferable.

Specific examples of the dispersion media having a siloxane bond, i.e., the silicone oils include, but are not limited to: various silicone oil, such as dialkyl silicone oil (e.g., dimethyl silicone oil), cyclic dialkyl silicone oil, alkylphenyl silicone oil, cyclic alkylphenyl silicone oil, and polyalkylaralkyl siloxane.

Specific examples of the alkylphenyl silicone oil include, but are not limited to, methyl phenyl silicone oil, ethyl phenyl silicone oil, propyl phenyl silicone oil, butyl phenyl silicone oil, hexyl phenyl silicone oil, octyl phenyl silicone oil, lauryl phenyl silicone oil, and stearyl phenyl silicone oil.

Specific examples of the cyclic alkylphenyl silicone oil include, but are not limited to, cyclic polymethylphenyl siloxane, cyclic polyethylphenyl siloxane, cyclic polybutylphenyl siloxane, cyclic polyhexylphenyl siloxane, cyclic polymethylchlorophenyl siloxane, and cyclic polymethylbromophenyl siloxane.

Specific examples of the polyalkylaralkyl siloxane include, but are not limited to, benzyl-modified silicone oil and methylstyryl-modified silicone oil.

Specific examples of commercial products of the silicone oil include, but are not limited to: KF96 series, KF50 series, KF54, KF56, all manufactured by Shin-Etsu Chemical Co., Ltd.; AK series, AS series, AR series, AP series, and PDM series, all manufactured by Wacker Asahikasei Silicone Co., Ltd.; TSF451 series, TSF456 series, TSF405, TSF4427, TSF431, TSF433, TSF437, and TSF456 series, all manufactured by GE Toshiba Silicone Co., Ltd.; and SH200 series, SH510, SH550, SH556, SH702, SH704, and SH705, all manufactured by Dow Corning Toray Co., Ltd.

These can be used alone or in combination. These may be used alone or in combination of two or more thereof.

There is no specific limit to the amount of the dispersion medium in the image recording layer. It can be selected to a particular application.

It is possible to tint the dispersion medium by dissolving, in the dispersion medium, a dye having the same or different color to that of the electrophoretic particles and magnetophoretic particles.

There is no specific limit to the selection of the dyes. For examples, an oil-soluble dye is suitably used.

Specific examples of the oil-soluble dye include, but are not limited to, spirit black (SB, SSBB, AB), nigrosine substrate (SA, SAP, SAPL, EE, EEL, EX, EXBP, EB), oil yellow (105, 107, 129, 3G, GGS), oil orange (201, PS, PR), fast orange, oil red (5B, RR, OG), oil scarlet, oil pink 312, oil violet #730, Macrolex blue RR, Sumiplast green G, oil brown (GR, 416), Sudan black X60, oil green (502, BG), oil blue (613, 2N, BOS), oil black (HBB, 860, BS), Valifast yellow (1101, 1105, 3108, 4120), Valifast orange (3209, 3210), Valifast red (1306, 1355, 2303, 3304, 3306, 3320), Valifast pink 2310N, Valifast brown (2402, 3405), Valifast blue (3405, 1501, 1603, 1605, 1607, 2606, 2610), Valifast violet (1701, 1702), and Valifast black (1802, 1807, 3804, 3810, 3820, 3830).

In addition to dyes, non-electrophoretic particles can be added.

Non-electrophoretic particles demonstrate no or extremely low electrophoretic properties in an electric field. Any of inorganic or non-organic particles is suitable.

Since these non-electrophoretic particles do not migrate in an electric field, a dispersion medium can form a white or colored state.

Images are recorded by the electrophoretic particles contained together migrating closer to the imaging side, i.e., rear side, than the non-electrophoretic particles.

Unlike dyes, the non-electrophoretic particles are not transparent, thereby hiding the elctrophoretic particles. As a result, the non-electrophoretic particles is advantageous in some cases to improve contrast or color representation as a recording medium.

A specific preferable example of the organic non-electrophoretic particles is polyvinylnephthalene particles.

In addition, a specific example of the inorganic non-electrophoretic particles is metal oxide. A surface-treated metal oxide can control chargeability in some cases.

In addition, it is possible to contain the magnetophoretic particles as the non-electrophoretic particles or the electrophoretic particles as the non-magnetophoretic particles These coloring agents (colorants) can be added alone or in combination to the recording medium of the present disclosure.

Thermoreversible Gelling Agent

As the thermoreversible gelling agent, it is suitable to use a thermoreversible gelling agent capable of converting the dispersion medium into a gel at the time of image browsing and image saving, and converting the dispersion medium into a liquid at the time of image recording at a temperature higher than the temperature for the image browsing and image saving.

Further, as the thermoreversible gelling agent, a thermoreversible gelling agent having higher temperature responsiveness is preferable, and a thermoreversible gelling agent that converts the dispersion medium into a sol at once when the temperature becomes higher than a certain temperature, and converts the dispersion medium into a gel at once when the temperature becomes the certain temperature or lower, is more suitable.

Image browsing means a state where a user views image information recorded on the rewritable recording medium. Image saving means a state where image information is saved on the rewritable recording medium.

In other words, the time of image browsing and image saving means a situation at a normal temperature and for example, a state at temperature of 10° C. or higher but lower than 40° C.

In the present disclosure, the state of a gel means that the liquid dispersion has lost its fluidity. Accordingly, the movements of the electrophoretic particles and/or magnetophoretic particles dispersed in the liquid dispersion is subdued and fixed.

In the present disclosure, a gel is preferably elastic in terms of imparting flexibility to a recording medium.

On the other hand, the state of liquid means that the dispersion medium has fluidity so that the electrophoretic particles and/or magnetophoretic particles dispersed in the liquid dispersion move freely.

In the present disclosure, the liquid state preferably has a sufficiently low viscosity so as not to suppress the movements of the electrophoretic particles and/or magnetophoretic particles.

The thermoreversible gelling agent forms a network structure by hydrogen bond, the van der Waals' force, hydrophobic interaction, electrostatic interaction, and π-π interaction. By incorporating the dispersion medium into the network structure, the dispersion medium is converted into a gel. On the other hand, the three-dimensional network structure is easily cut by heating, so that it is considered that the dispersion medium is returned to a liquid by heating.

The three-dimensional network structure is formed in such a manner that, for example, the thermoreversible gelling agent molecules self-aggregate due to hydrogen bonding to form fibrous aggregates by intermolecular interaction, and further, the fibrous aggregates grow due to the van der Waals' force and hydrophobic or electrostatic interaction, and fibrous aggregates intertwine with each other.

By incorporating the dispersion medium molecules into the three-dimensional network structure, gelatinization of the dispersion medium progresses.

The thermoreversible gelling agent is not particularly limited and can be appropriately selected in accordance with particular applications.

Specific examples of the thermoreversible gelling agent include, but are not limited to, organogel and hydrogel.

The organogel is a thermoreversible gelling agent that can turn an organic solvent or silicone oil serving as the dispersion medium into a gel.

For this reason, when an organic solvent or silicone oil is used as the dispersion medium, organogel is suitable as the thermoreversible gelling agent.

Specific examples of organogels include, but are not limited to, 1,2,3,4-dibenzylidene-D-sorbitol, 12-hydroxy stearic acid, N-lauroyl-L-glutamic acid-α, γ-bis-n-butyl amide, spin labelized steroid, cholesterol derivatives, dialkyl phosphoric acid aluminum, phenolic cyclic oligomer, 2,3-bis-n-hexadesiloxane anthracene, cyclic depsipeptide, partially-fluorinated alkanes, cystine derivatives, bis(2-ethylhexyl)sulfo succinic acid sodium, triphenyl amine derivatives, butylolactone derivatices, quaternary ammonium salts, fluorinated alkylized oligomers, urea derivatives, vitamine H derivatives, glucone amide derivatives, cholic acid derivatives, L-alanine derivatives, L-isoleucine derivatives, L-valine derivatives, cyclic dipeptide derivatives, oligo(α-amino acid), cyclohexane diamine derivatives, 1,3,5-cyclohexane tricarbonic acid derivatives, double headed type amino acid derivatives, derivatives, barb turic acid derivatives, and triaminopyridine derivatives.

These may be used alone or in combination of two or more thereof.

Moreover, a polymer or oligomer type thermoreversible gelling agent are known and useful.

A low molecular weight thermoreversible gelling agent is turned into a crystal while left for a long period of time depending on the structure thereof, which creates a problem of stability.

By contrast, polymer or oligomer type thermoreversible gelling agents are suitable because these are not crystallized owing to the molecular weight distribution thereof or the movements of the flexuous chain thereof.

Polymer or oligomer type thermoreversible gelling agents can be obtained, for example, by introducing a gelling component that induces gelation to a polymer component that prevents crystallization.

Since a thermoreversible gelling agent is used in the recording layer of the recording medium of the present disclosure, it is preferable that the thermoreversible gelling agent has high temperature responsiveness for sol-gel transition (promptly turn the dispersion medium into liquid as heated and immediately turns the dispersion medium into a gel as the temperature is returned to room temperature) and the thermoreversible gelling agent stably demonstrates features to prevent collapse of gel by crystallization, even after the sol-gel transition thereof is repeated.

For this reason, the following gelling agents are particularly useful.

Since it is suitable that a thermoreversible gelling agent quickly forms an associate by hydrogen bond first, the thermoreversible gelling agent preferably has an amide bond (—NHCO—) in the structure thereof and more preferably, multiple amide bonds.

A dispersion medium is turned into a gel by forming a hydrogen bond between N—H and C═O of an amide bond by a thermoreversible gelling agent.

Formation of a gel having quick temperature responsiveness depends on the reactivity of hydrogen bond and therefore thermoreversible gelling agent having an amide bond in its molecule is preferable.

In addition, the thermoreversible gelling agent preferably has a urethane bond (—NHCOO—) in its molecule.

A thermoreversible gelling agent having a urethane bond improves the temperature responsiveness for sol-gel transfer of a dispersion medium in comparison with a thermoreversible gelling agent just having an amide bond.

When a thermoreversible gelling agent has a single amide or urethane bond, the thermoreversible gelling agents themselves form a hydrogen bond. However, to quickly form a gel, it is preferable to contain multiple amide bonds and/or urethane bonds in the structure of the thermoreversible gelling agent. The more bonds, the more preferable.

By having more amide bonds or urethane bonds, gelling capability is enhanced and response to sol-gel transfer becomes significantly quick, which is useful for the present disclosure.

Moreover, it is more preferable that the thermoreversible gelling agent has a siloxane structure (bond) in its molecule. The siloxane bond has a structure in which silicon (Si) and oxygen (O) are alternately bonded. Examples of the thermoreversible gelling agent having a siloxane bond are as follows:

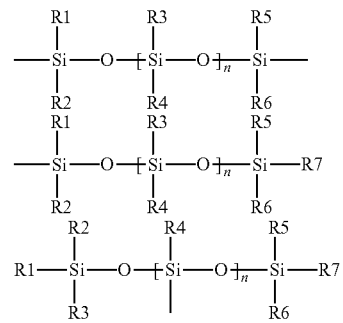

In the formulae above, R1 to R7 are each a C8-C20 alkyl group, and R1 to R7 may be the same or different to each other. A symbol "n" represents an integer of from 0 to 80.

The thermoreversible gelling agent having the siloxane bond never or little crystallizes and can enhance the stability of a gel. In addition, the gel tends to be softened, which is useful for enhancing flexibility of the recording medium of the present disclosure.

As the siloxane bond in the thermoreversible gelling agent becomes long, the gel becomes soft, and the sol-gel transition temperatures of the dispersion medium tend to become lower. However, if the gel of the dispersion medium becomes excessively soft, the electrophoretic particles may not be easily fixed or safety may be lost. It is preferable that the length of the siloxane bond is properly controlled with respect to the sol-gel transition temperatures and flexibility of the dispersion medium designed for the recording medium.

A preferable length of the siloxane bond in the thermoreversible gelling agent is defined as follows. That is, it is preferable that the number of silicon atoms M of the siloxane bond in the molecule of the thermoreversible gelling agent and the total number N of the amide bonds (—NHCO—) and urethane bonds (—NHCOO—) in the molecule satisfy the following relation:

$$0.5 \leq M/N \leq 4.0$$

When the ratio M/N is less than 0.5, the sol-gel transition temperatures of the dispersion medium may be excessively higher than solation or gelation temperature suitable for the rewritable recording medium, there is a possibility that the gel becomes unstable, or the gel becomes excessively hard and the flexibility becomes lower.

When the ratio M/N is greater than 4.0, there is a possibility that the sol-to-gel transition temperature becomes excessively lower than a sol-to-gel transition temperature suitable for a rewritable recording medium or the gel becomes excessively soft and the dispersion medium does not turn into a gel even at a normal temperature and the image retentiveness deteriorates.

In the present disclosure, the molecule of a thermoreversible gelling agent preferably has a long chain alkyl group having 8 or more carbon atoms and/or a long chain alkylene group having 8 or more carbon atoms. In order to grow associates formed by hydrogen bond of the amide bond or urethane bond of the thermoreversible gelling agent into fibrous form and further form a three-dimensional network structure, a structure is suitable in which associates easily interact with each other. It is considered that these long-chain alkyl group and long-chain alkylene group promote intermolecular interaction and contribute to the formation of the fibrous aggregates and three-dimensional network structure. The number of carbon atoms in the long chain alkyl group is preferably from 8 to 20 and, the long chain alkylene group, from 8 to 12.

As described above, not all thermoreversible gelling agents can be used for the recording medium of the present disclosure. As for the present disclosure, it is suitable to select a thermoreversible gelling agent which can be used with a high insulating dispersion medium. Also, a suitable thermoreversible gelling agent is selected whether it has a sol-gel transfer temperature suitable for the environment in which the recording medium is used and high temperature responsiveness to sol-gel transition (promptly turn the dispersion medium into a liquid as heated, and immediately turns the dispersion medium into a gel as the temperature is returned to room temperature) and can stably maintain its features without being crystallized and collapsing a gel, even after sol-gel transition thereof is repeated.

Examples of the particularly preferable gelling agents for use as the thermoreversible gelling agent in the recording medium of the present disclosure are as follows. These are examples, and the thermoreversible gelling agent for use in the present disclosure is not limited to these examples.

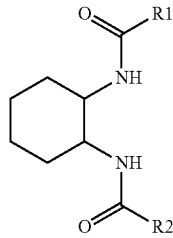

In the formulae above, R1 and R2 each, independently represent $C_8$-$C_{20}$ alkyl groups.

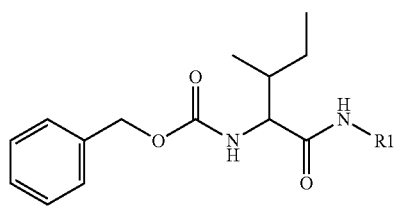

In the formula above, R1 is a $C_8$-$C_{20}$ alkyl group.

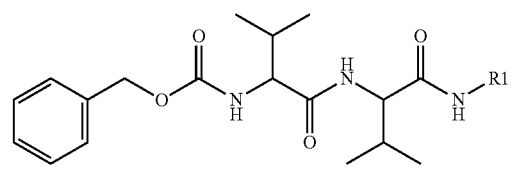

In the formula above, R1 is a $C_8$-$C_{20}$ alkyl group.

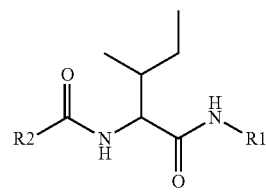

In the formulae above, R1 and R2 each, independently represent $C_8$-$C_{20}$ alkyl groups. The number of carbon atoms of the alkyl group is preferably from 8 to 20.

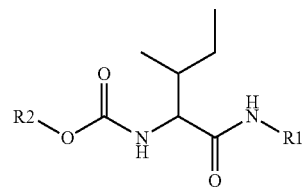

In the formulae above, R1 and R2 each, independently represent $C_8$-$C_{20}$ alkyl groups. The number of carbon atoms of the alkyl group is preferably from 8 to 20.

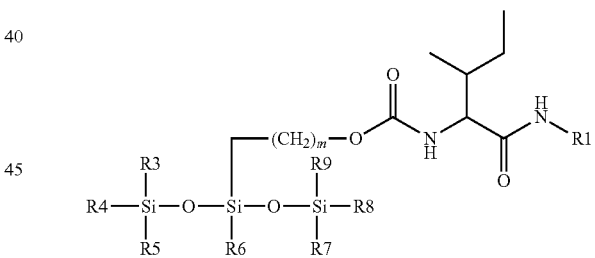

R1 represents an alkyl group having 8 to 20 carbon atoms. R3 to R9 each, independently represent hydrogen atoms, alkyl groups having 1 to 12, alkoxy groups having 1 to 12 carbon atoms, or and groups with or without substitution groups. A symbol "m" represents an integer of from 1 to 20.

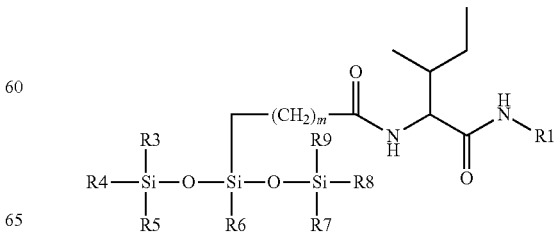

R1 represents an alkyl group having 8 to 20 carbon atoms. R3 to R9 each, independently represent hydrogen atoms, alkyl groups having 1 to 12, alkoxy groups having 1 to 12 carbon atoms, or aryl groups with or without substitution groups. A symbol "m" represents an integer of from 1 to 20.

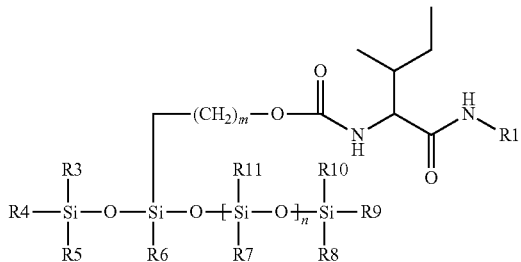

R1 represents an alkyl group having 8 to 20 carbon atoms. R3 to R11 each, independently represent hydrogen atoms, alkyl group having 1 to 12, alkoxy groups having 1 to 12 carbon atoms, or aryl groups with or without substitution groups. A symbol "m" represents an integer of from 1 to 20 and n represents an integer of from 1 to 80.

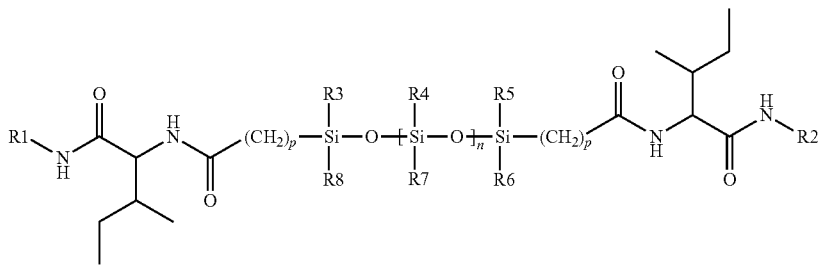

In the formulae above, R1 and R2 each, independently represent $C_8$-$C_{20}$ alkyl groups. R3 to R8 each, independently represent hydrogen atoms, alkyl group having 1 to 12, alkoxy groups having 1 to 12 carbon atoms, or an groups with or without substitution groups. A symbol "m" represents 0 or an integer of from 1 to 80 and p represents an integer of from 1 to 20.

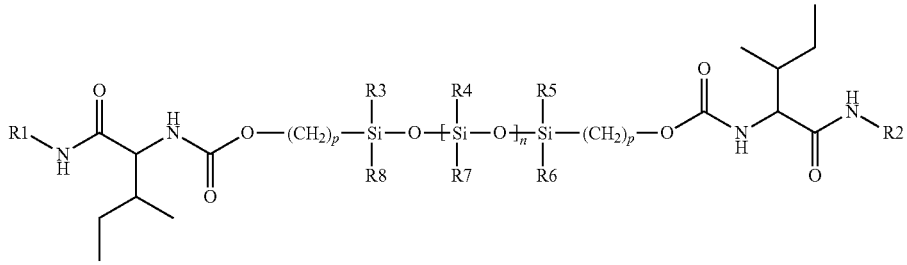

In the formulae above, R1 and R2 each, independently represent $C_8$-$C_{20}$ alkyl groups. R3 to R8 each, independently represent hydrogen atoms, alkyl group having 1 to 12, alkoxy groups having 1 to 12 carbon atoms, or aryl groups with or without substitution groups. A symbol "n" represents 0 or an integer of from 1 to 80 and p represents an integer of from 1 to 20.

The amount of the thermoreversible gelling agent in the image recording layer can be determined so that the dispersion medium is in the state of a gel while displaying and storing images, for example, at room temperature, and the dispersion medium is liquid at temperatures, for example, higher than the temperature while displaying and storing images when an image is recorded (written). The amount of the thermoreversible gelling agent in the image recording layer is preferably 0.05% by mass to 50% by mass, more preferably 0.1% by mass to 20% by mass, and even more preferably 0.5% by mass to 10% by mass, to the amount of the dispersion medium.

When the amount thereof is less than 0.05% by mass, the gelation of the dispersion medium is insufficient, which may impair image retentiveness. When the amount thereof is greater than 50% by mass, the viscosity of the dispersion medium may not be sufficiently reduced, or insoluble matter may be remained, when the recording medium is heated. As a result, movements of the electrophoretic particles and/or magnetophoretic particles is inhibited, thereby degrading image quality.

The gelation temperature and the solation temperature of the dispersion medium in the image recording layer are appropriately selected depending on the intended purpose without any limitation, but they are preferably from 40° C. to 120° C. and more preferably from 60° C. to 100° C.

Furthermore, in terms of energy, it is furthermore preferably from 80° C. to 100° C.

The gelation temperature and the solation temperature can be adjusted by appropriately selecting the kind and the amount of a dispersion medium and the kind and the amount of a thermoreversible gelling agent or mixing a different thermoreversible gelling agent with an appropriate ratio.

A thermoreversible gelling agent having a gelation temperature and solation temperature lower than 40° C. poses no problem in a normal environment. However, the image retentiveness tends to deteriorate as the recording medium is used outdoors exposed to direct sunlight or in a sun-heated car.

In particular, unlike a PLD, the recording medium of the present disclosure is anticipated to be used in various environments including outdoors, so that high image retentiveness is required in these environments.

In order to stably use a recording medium in such an environment, the gelation and the liquefaction transfer temperature of a dispersion medium is preferably 60° C. or higher.

When the gelation temperature and the solation temperature are higher than 120° C., the time taken to reach the temperatures becomes longer and thus the recording speed and image quality are easily degraded.

However, the gelation temperature and the solation temperature are not necessarily the same and hysteresis between the gelation temperature and the solation temperature is allowed.

When the solation temperature is higher than the gelation temperature, images can be recorded in a wider temperature range, which is preferable.

For example, in a case where the solation temperature is 80° C. whereas the gelation temperature is 40° C., if a dispersion medium is once turned into a sol at 80° C. or higher, it is possible to record an image until it is gelated at 40° C. or lower. That is, when compared with a case in which the solation temperature is closer to the gelation temperature, images can be recorded in a wider temperature range.

When recording can be conducted in a wider temperature range, contrast is improved, the degree of the non-uniformity of image density is reduced, and the image quality is improved.

In addition, the printing speed is also improved and the designing flexibility is obtained with regard to arrangement of a heater, an electric field applicator, or a magnetic field applicator.

In a case where a solation temperature is higher than a gelation temperature, if the dispersion medium is once turned into a gel by cooling after recording an image, it has to be heated to 80° C. or higher for notation. Accordingly, it is possible to maintain image retentiveness.

Which of the notation temperature and the gelation temperature is higher depends on a dispersion medium and a thermoreversible gelling agent but not on electrophoretic particles or magnetophoretic particles.

Here, the gelation temperature and the solation temperature means temperature at which a mixture of a dispersion medium and a thermoreversible gelling agent is turned from a sol (liquid) into a gel or from a gel into a sol (liquid) by a thermoreversible gelling agent.

The recording medium of the present disclosure contains at least two kinds of the thermoreversible gelling agents.

Any recording medium containing thermoreversible gelling agents having different structures is within the scope of the present disclosure, no matter how slight the difference may be.

By having two or more kinds of thermoreversible elling agents, it is possible to design a dispersion medium having a particular solation transfer temperature or gelation transfer temperature.

In addition, in a case in which a thermoreversible gelling agent is crystallized or no reversible sol-gel transfer is demonstrated because of insufficient compatibility with a dispersion medium used, compatibility is improved by mixing two or more kinds of thermoreversible gelling agents to solve this problem.

Although there is no specific limit to the combination of the thermoreversible gelling agents irrespective of their structures, effects of the present disclosure may not be demonstrated sufficiently depending on the combination.

In the present disclosure, it is preferable that at least one of the at least two or more kinds of thermoreversible gelling agents has a chemical structure compatible with a dispersion medium.

For example, if two kinds of thermoreversible gelling agents are contained in the cell mentioned above, at least one of the thermoreversible gelling agent (A) and the thermoreversible gelling agent (B) has a chemical structure compatible with a dispersion medium.

An example of the thermoreversible gelling agent having a chemical structure compatible with a dispersion medium is a case in which part of the structure of the thermoreversible gelling agent is the same as part of the structure of the dispersion medium.

For example, it is possible to improve the compatibility between a dispersion medium and at least one of thermoreversible gelling agents when a dispersion medium has an alkyl group and the at least one of the thermoreversible gelling agents has an alkyl group.

Alternatively, when a dispersion medium has a siloxane bond, it is possible to improve compatibility if at least one of the thermoreversible gelling agents contained has a siloxane bond.

As a result, it is possible to suppress precipitation or crystallization of a gelling agent, which leads to improvement of contrast and reduction of unevenness of image density as recording medium, thereby improving image quality.

Furthermore, sol-gel transfer is stably repeated without precipitation of the thermoreversible gelling agent in the middle, which is preferable to make the service life of a recording medium longer.

To be more specific, by using an aliphatic hydrocarbon-based solvent having an alkyl group as dispersion medium, it is possible to suppress precipitation or crystallization of a gelling agent in some cases when the thermoreversible gelling agent (A) has an alkyl group in its molecule while the thermoreversible gelling agent (B) has no alkyl group.

Moreover, when silicone oil is used as dispersion medium and the thermoreversible gelling agent (A) has a siloxane bond in its molecule but the thermoreversible gelling agent (B) has no siloxane bond, the same result can be obtained in some cases.

It is preferable that all the thermoreversible gelling agents contained in a recording medium have structures compatible with a dispersion medium. However, even if only one of the thermoreversible gelling agents has the structures compatible with the dispersion medium, the objective of the present disclosure is achieved.

This mechanism is inferred that when thermoreversible gelling agents having different structures are mixed, these form associates to form a gel.

To form one gel by thermoreversible gelling agents having different structures, it is more preferable that all the thermoreversible gelling agents have amide bonds and/or urethane bonds in common.

In the recording medium of the present disclosure, at least two kinds of thermoreversible gelling agents are mixed in a cell, optimal properties are obtained for the recording medium by adjusting the mixing ratio of these in some cases.

Furthermore, three or more kinds of the thermoreversible gelling agents can be mixed. This is advantageous in some cases to obtain control of solation or gelation transfer temperature, stabilization of sol-gel transfer, prevention of crystallization of the thermoreversible gelling agents, etc. or cancel trade-off therebetween.

To demonstrate a desired solation or gelation transfer temperature as recording medium, thermoreversible gelling agents are selected among many kinds. However, selected gelling agents are easily crystallized, the temperature responsiveness to sol-gel transfer is insufficient, or gelation temperature is not suitable if solation temperature is suitable in many cases.

A recording medium made by using such thermoreversible gelling agents tend to have trade-off such as a short working life in spite of high contrast, white beads or uneven image density in spite of excellent repeating rewritable properties, or extremely high temperatures to form images in spite of good image quality. As a result, the printing speed falls excessively or the substrate of the recording medium deteriorates by heat. Accordingly, it is difficult to satisfy all the properties.

By contrast, as a result of mixing two or more kinds of thermoreversible gelling agents and adjusting the mixing ratio thereof the recording medium of the present disclosure controls the solation or gelation transfer temperature and improves compatibility with a dispersion medium, thereby preventing crystallization. Consequently, various trade-off is cancelled. For example, contrast is improved, uneven image density is reduced, and sol-gel transfer is stably repeated, thereby prolonging the working life of a recording medium.

A method of determining the gelation temperature and solation temperature of a dispersion medium containing a thermoreversible gelling agent is not particularly limited, as long as it is capable of determining the temperature at which transition from a sol to a gel or transition from a gel to a sol occurs. For example, the following method is appropriate, in which a differential scanning calorimetry (DSC) is used.

As for a device, a commercially available DSC analysis device is used.

When a sample containing a thermoreversible gelling agent is set and measured by DSC, the endothermic peak thereof is observed during a heating process, and, the exothermic peak, during a cooling process.

The temperature of the endothermic peak in the heating process can be regarded as solation temperature and the temperature of the exothermic peak in the cooling process can be regarded as gelation temperature.

If the heating rate and the cooling rate are too fast, traceability of the heat deteriorates, resulting in a large error in the value. Therefore, the heating rate and the cooling rate are preferably slow, e.g., 5° C./min or less, more preferably 2° C./min or less.

Moreover, using dynamic mechanical analysis (DMA) is another method.

A device, which is generally called as a viscoelasticity measuring device or rheometer, can be used for the measurement.

When a sample containing the thermoreversible gelling agent is set and measured by DMA, an area where the storage elastic modulus (G') exceeds the loss elastic modulus (G") and an area where the storage elastic modulus (G') and the loss elastic modulus (G") are crossed and the loss elastic modulus (G") exceeds the storage elastic modulus (G') are observed.

Typically, the sample is regarded as the state of a gel in the region where G' is larger than G" (G'>G") and is regarded as the state of a sol in the region where G' is smaller than G" (G'<G"). The point at which G' and G" are crossed during a heating process can be regarded as the solation temperature, and the point at which G' and G" are crossed during a cooling process can be regarded as the gelation temperature.

If the heating rate and the cooling rate are too fast, traceability of the heat deteriorates, resulting in a large error in the value. Therefore, the heating rate and the cooling rate are preferably slow, e.g., 5° C./min or less, more preferably 3° C./min or less.

Moreover, in order to prevent vaporization of the dispersion medium in the state of a sol, a surrounding area of the plate to which the sample is set can be sealed with oil, which is useful in some cases.

Other various methods known in the art can be used to measure the solation temperature and the gelation temperature of a dispersion medium, for example: a method using a tuning-fork vibration viscometer, in which an oscillator is vibrated in liquid at a constant frequency, to measure the value of electric current with which the viscous resistance of the oscillator becomes exciting-force, to thereby measure a viscosity; a method using a rigid pendulum rheometer, in which a measuring part, being a supporting point of a pendulum, on a sample, and a damping factor of the vibrations of the pendulum is measured; and a method including placing a colored liquid or object on a gel sample, and visually observing a change caused by heating.

Other Components

Examples of other components contained in the image recording layer include a dispersing agent and a surfactant.

However, the aforementioned other components are not limited to these examples, and optionally contains other components.

Dispersing Agent

The dispersing agent is appropriately selected depending on the intended purpose without any limitation, provided that it is a dispersing agent capable of enhancing dispersibility of the electrophoretic particles and/or magnetophoretic particles in the dispersion medium, preventing aggregation of electrophoretic particles and/or magnetophoretic particles and stably migrating the electrophoretic particles and/or magnetophoretic particles.

It is preferable to select a dispersing agent from those soluble to the dispersion medium and having a feature of preventing the electrophoretic particles and/or magnetophoretic particles from being aggregated to each other by electrostatic repulsion or steric hindrance by being adsorbed to the surfaces of the electrophoretic particles and/or magnetophoretic particles.

In addition, a dispersing agent soluble in a non-polar solvent is preferable and a polymer dispersing agent is more preferable.

This is because the dispersion stability of particles in a non-polar organic solvent system greatly depends on the steric effect of a polymer compound.

A polymer dispersing agent having a basicity or acidity is preferable as the polymer dispersing agent and a dispersing agent polymer having a basicity is more preferable.

This is because it is considered that, for example, in a case where a pigment, such as carbon black, is used as electrophoretic particles, a basic polymer dispersing agent is adsorbed to the surface of the pigment and acts as a positive charge-controlling agent, and demonstrates positively charging the pigment surface.

Examples of the polymer dispersing agent having a basic group include a polymer prepared from at least one monomer having a basic group (e.g., N-methylaminoethylmeth)acrylate, N-ethylaminoethylmeth)acrylate, N,N-dimethylaminoethyl(meth)acrylate, N,N-diethylaminoethylmeth)acrylate, N,N-dibutylaminoethyl acrylate, N,N-di-tert-butylaminoethyl acrylate, N-phenylaminoethyl methacrylate, N,N-diphenylaminoethyl methacrylate, amino styrene, dimethylaminostyrene, N-methylaminoethylstyrene, dimethylaminoethoxystyrene, diphenylaminoethylstyrene, N-phenylaminoethylstyrene, 2-N-piperidylethyl(meth)acrylate, 2-vinylpyridine, 4-vinylpyridine, and 2-vinyl-6-methylpyridine) and at least one selected from the group consisting of alkyl ester of (meth)acrylic acid, and aryl ester of (meth)acrylic acid.

As for the polymer dispersing agent having a basic group, a commercial product can be used.

As for the commercial product thereof, preferred are SOLSPERSE 17000 (single polyester, anchoring site: basic group), SOLSPERSE 16000 (single polyester, anchoring site: basic group), SOLSPERSE 41000 (single polyester, anchoring site: acid), and SOLSPERSE 3000 (single polyester, anchoring site: acid), all manufactured by The Lubrizol Corporation.

As another example, Disperbyk-2050, 2150, 160, 161, 162, 163, 164, 166, 167, and 182 (all manufactured by BYK Japan KK) can also be preferably used.

Surface Active Agent (Surfactant)

The surfactant is added for the purpose of improving of the dispersion stability of the electrophoretic particles and/or magnetophoretic particles, obtaining a sufficient migration speed, and enhancing image retentiveness.

The surfactant is appropriately selected depending on the intended purpose without any limitation, but it is preferably a nonionic surfactant.

If a surfactant other than nonionic surfactants is used, for example, an ionic surfactant is used, the ionic surfactant is adsorbed to the surfaces of the electrophoretic particles and magnetophoretic particles and the behavior of the electrophoretic particles and/or magnetophoretic particles may become unstable.

Specific examples of the nonionic surfactant include, but are not limited to, polyoxyethylene alkyl ether, polyoxyethylene alkyl allyl ether, polyoxyethylene alkylphenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ether of glycerin ester, polyoxyethylene ether of sorbitan ester, polyoxyethylene ether of sorbitol ester, fatty acid alkanol amide, amine oxide, polyoxyethylene alkyl amine, glycerin fatty acid ester, sorbitan fatty acid ester, polyoxyethylene sorbitan fatty acid ester, polyoxyethylene sorbitol fatty acid ester, and alkyl(poly)glycoxyde.

Of these, preferred are sorbitan trioleate, sorbitan laurate, sorbitan palmitate, sorbitan stearate, sorbitan tristearate, sorbitan oleate, sorbitan tribehenate, and sorbitan caprylate.

Structural Example of Recording Medium

One example of the recording medium of the present disclosure using cells is described with reference to FIG. 2.

The recording medium illustrated in FIG. 2 contains a first substrate 1, a second substrate 2, and an image recording layer 7 sandwiched with these substrates (namely, enclosed with these substrates).

The image recording layer 7 contains cells 8 spaced a constant distance apart and a colored dispersion medium 3 containing white electrophoretic particles 4 and two or more kinds of thermoreversible gelling agents. The colored dispersion medium 3 is encapsulated in the cells 8.

As for the electrophoretic particles 4, particles of any color can be used other than white.

Moreover, it is possible to provide a sealant 9 at the perimeter of the recording medium for the purpose of bonding the first substrate 1 with the second substrate 2 and sealing the image recording layer 7.

Either or both of the first substrate 1 and the second substrate 2 contains a filler.

The recording medium illustrated in FIG. 3 contains a first substrate 1, a second substrate 2, and an image recording layer 7 sandwiched with these substrates (namely, enclosed with these substrates).

The image recording layer 7 contains cells 8 spaced a constant distance apart and a transparent dispersion medium 3 containing white electrophoretic particles 4, black electrophoretic particles 5, and two or more kinds of thermoreversible gelling agents. The transparent dispersion medium 3 is encapsulated in the cells 8.

As for the electrophoretic particles 4 and 5, particles of any color can be used other than white or black.

Moreover, it is possible to provide a sealant 9 at the perimeter of the recording medium for the purpose of bonding the first substrate 1 with the second substrate 2 and sealing the image recording layer.

Either or both of the first substrate 1 and the second substrate 2 contains a filler.

One example of the recording medium of the present disclosure using microcapsules is described with reference to FIG. 4.

Figure 4:
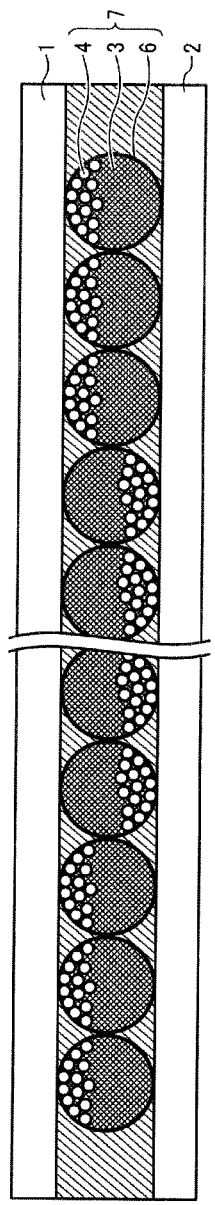
FIG. 4 is a schematic diagram illustrating an example of the recording medium using microcapsules according to an embodiment of the present invention.

The recording medium illustrated in FIG. 4 contains a first substrate 1, a second substrate 2, and an image recording layer 7 sandwiched with these substrates (namely, enclosed with these substrates).

The image recording layer 7 contains arranged multiple microcapsules 6, each containing a colored dispersion medium 3 containing white electrophoretic particles 4 and two or more kinds of thermoreversible gelling agents.

As for the electrophoretic particles 4, particles of any color can be used other than white.

Either or both of the first substrate 1 and the second substrate 2 contains a filler.

Figure 5:
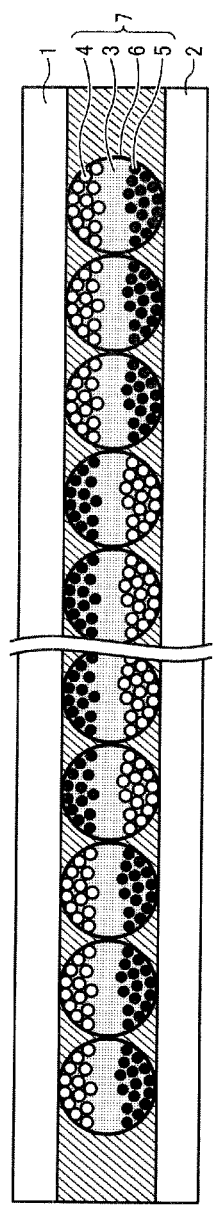
FIG. 5 is a schematic diagram illustrating another example of the recording medium using microcapsules according to an embodiment of the present invention.

The recording medium illustrated in FIG. 5 contains a first substrate 1, a second substrate 2, and an image recording layer 7 sandwiched with these substrates (namely, enclosed with these substrates).

The image recording layer 7 contains arranged multiple microcapsules 6, each containing a transparent dispersion medium 3 containing white electrophoretic particles 4, black electrophoretic particles 5, and two ore more kinds of thermoreversible gelling agents.

As for the electrophoretic particles 4 and 5, particles of any color can be used other than white or black.

Either or both of the first substrate 1 and the second substrate 2 contains a filler.

The average thickness of the image recording layer is appropriately selected depending on the intended purpose without any limitation. It is preferably 5 µm to 1,000 µm, more preferably 10 µm to 100 µm, and even more preferably 20 µm to 60 µm.

When the thickness of the image recording layer is less than 5 µm, a contrast ratio may be low. When the thickness thereof is greater than 200 µm, recording speed or resolution may be reduced, or it may be necessary to increase a drive voltage.

Note that, the thickness of the image recording layer indicates a thickness of the thickest part of the image recording layer.

For example, as illustrated in FIGS. 6 and 7, in the case where a cross-section of the image recording layer 7 is other than a true circle, for example, a substantially circle and a polygon, the length of the longest part of the image recording layer along the thickness direction is the thickness of the image recording layer 7.

The average thickness of the recording medium of the present disclosure is appropriately selected depending on the intended purpose without any limitation, but it is preferably 15 µm to 1,200 µm, more preferably 30 µm to 600 µm, and even more preferably 50 µm to 260 µm.

Moreover, it is possible and suitable that the recording medium of the present disclosure has a structure where an electric conductive layer between the image recording layer and the substrate, and the electric conductive layer is electrically connected with an electrode formed on the exterior of the recording medium.

Figure 8:
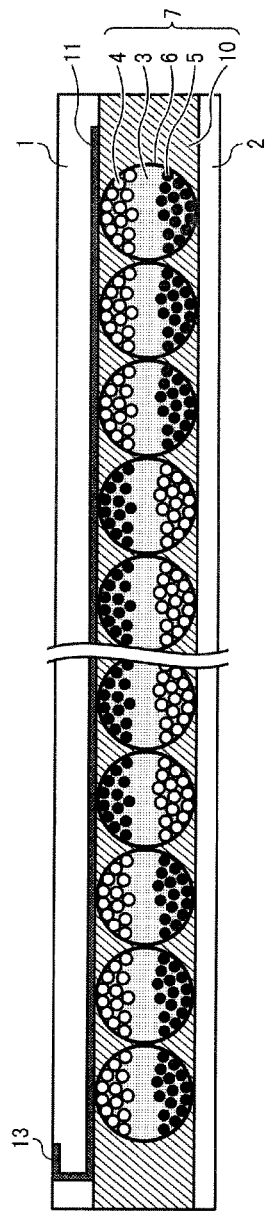
FIG. 8 is a schematic diagram illustrating an example of the recording medium in which an electric conductive layer is formed between the image recording layer and the substrate according to an embodiment of the present invention.

For example, FIG. 8 illustrates an example of a recording medium having an electroconductive layer provided between one of the substrates and the image recording layer 7, that is, a first electric conductive layer 11 is provided between the first substrate 1 and the image recording layer 7 of the recording medium of FIG. 5.

The recording medium illustrated in FIG. 8 has the first substrate 1, the second substrate 2, and the image recording layer 7 provided between these substrates.

In the image recording layer 7, multiple microcapsules 6 each containing a transparent dispersion medium 3 containing white electrophoretic particles 4, black electrophoretic particles 5, and a thermoreversible gelling agent are arranged and fixed and insulated by a binder resin 10.

A first electric conductive layer 11 is provided between the image recording layer 7 and the first substrate 1.

Moreover, the first electric conductive layer 11 is electrically connected with a first electrode 13 formed on a surface of the recording medium.

The second substrate 2 onto which an electric conductive layer is not formed is preferably made as thin as possible.

Figure 9:
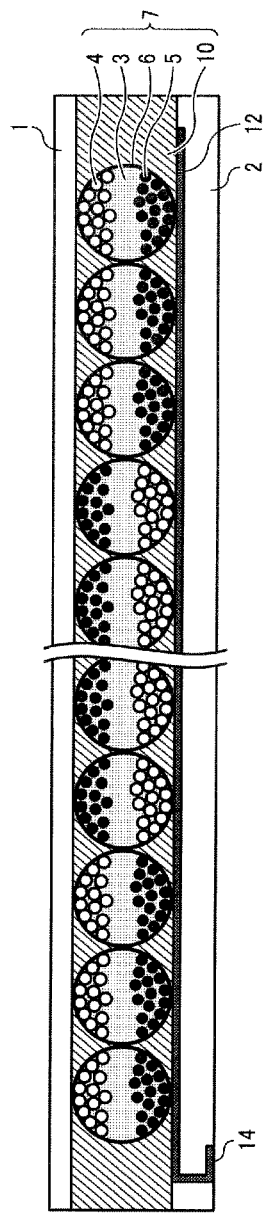
FIG. 9 is a schematic diagram illustrating another example of the recording medium in which an electric conductive layer is formed between the image recording layer and the substrate according to an embodiment of the present invention.

As another example of the recording medium of the recording medium of FIG. 8, a recording medium possibly has a structure as illustrated in FIG. 9, where a second electric conductive layer 12 is provided between the second substrate 2 and the image recording layer 7, and the second electric conductive layer 12 and an electrode 14 are electrically connected.

Figure 10:
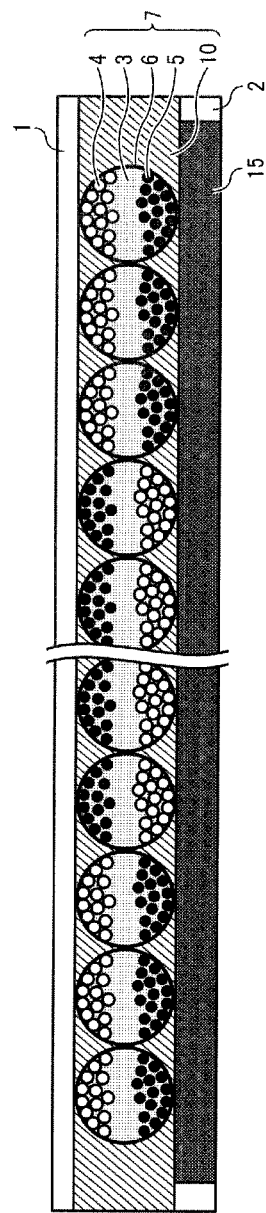
FIG. 10 is a schematic diagram illustrating one example of the recording medium which uses an electric conductive substrate according to an embodiment of the present invention.

Further, as another example of the recording medium different from the recording medium of FIG. 9, a recording medium possibly has a structure as illustrated in FIG. 10, where an electric conductive substrate 15 is used instead of the second substrate 2.

Moreover, a case where the electric conductive layer and the electrode are integratedly mounted is depicted in FIGS. 8 to 10, but the electric conductive layer and the electrode can be provided as separate devices.

Figure 11:
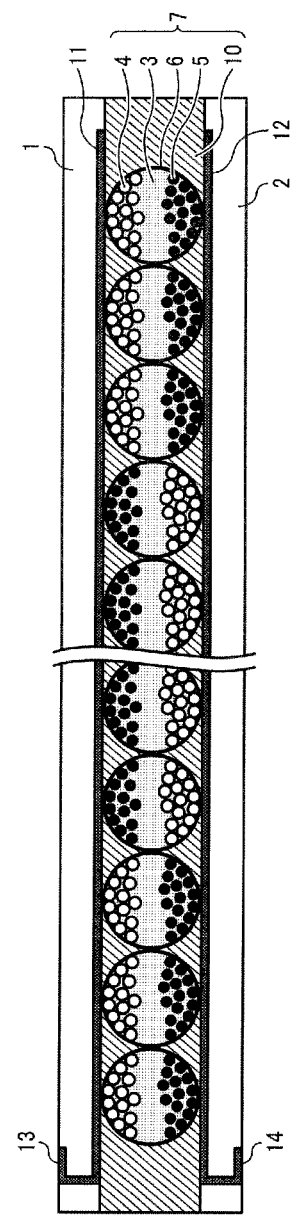
FIG. 11 is a schematic diagram illustrating another example of the recording medium which uses an electric conductive substrate according to an embodiment of the present invention.

In addition, FIG. 11 illustrates an example of the recording medium having electroconductive layers between one substrate and the image recording layer and between the other substrate and the image recording layer, in which the first electric conductive layer 11 is provided between the first substrate 1 and the image recording layer 7 of the recording medium of FIG. 5, and a second electric conductive layer 12 is provided between the second substrate 2 and the image recording layer 7 thereof.

The recording medium illustrated in FIG. 11 has the first substrate 1, the second substrate 2, and the image recording layer 7 provided between these substrates.

In the image recording layer 7, the multiple microcapsules 6 each containing a transparent dispersion medium 3 containing white electrophoretic particles 4, black electrophoretic particles 5, and two or more kinds of thermoreversible gelling agents are arranged and fixed and insulated by a binder resin 10.

The first electric conductive layer 11 is provided between the image recording layer 7 and the first substrate 1, and the second electric conductive layer 12 is provided between the image recording layer 7 and the second substrate 2.

Moreover, the first electric conductive layer 11 is electrically connected with a first electrode 13 formed on the exterior of the recording medium, and the second electric conductive layer 12 is electrically connected with a second electrode 14 formed on the opposite exterior of the recording medium.

Note that, the "exterior of the recording medium" can be any area of the recording medium which can be electrically connected to an application device equipped with an image recording device. For example, the exterior (external surface) of the recording medium indicates a surface, a back surface, and a side surface of the recording medium.

Moreover, a case where the electric conductive layer and the electrode are integratedly mounted is depicted in FIG. 11 but the electric conductive layer and the electrode can be provided as separate devices.

Figure 12:
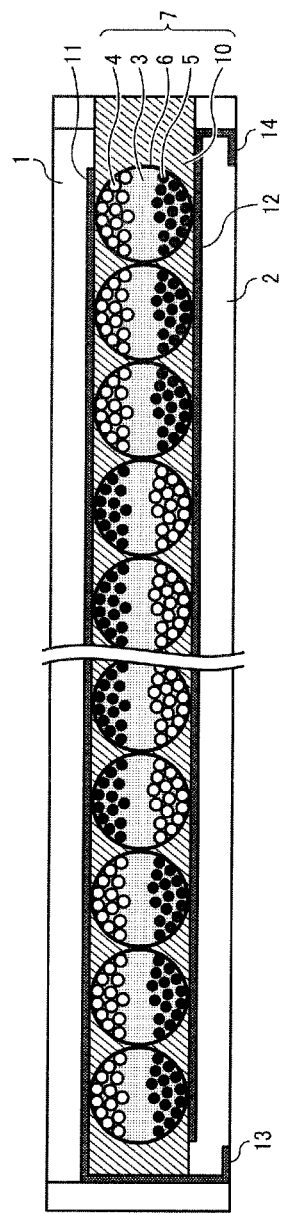
FIG. 12 is a schematic diagram illustrating yet another example of the recording medium in which an electric conductive layer is formed between the image recording layer and the substrate according to an embodiment of the present invention.

Moreover, as another example of the recording medium of FIG. 11, the first electrode 13 and the second electrode 14 can be provided on the same surface, as illustrated in FIG. 12.

Figure 13:
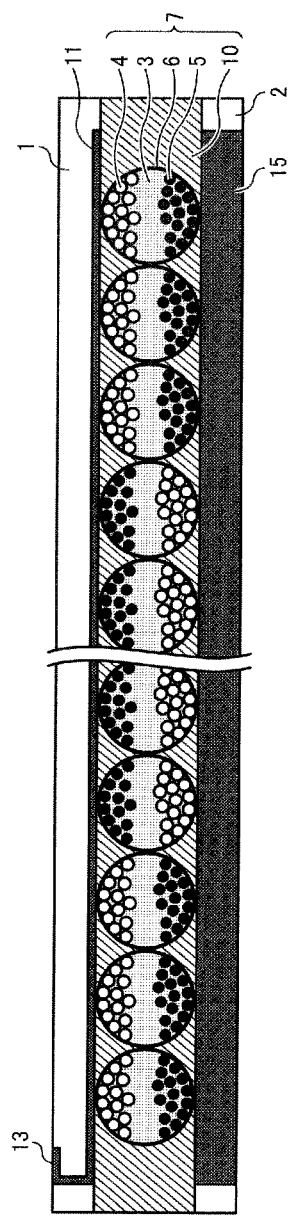
FIG. 13 is a schematic diagram illustrating one example of the recording medium in which an electric conductive layer is formed between the image recording layer and an electric conductive substrate according to an embodiment of the present invention.

As another example of the recording medium of the recording medium of FIG. 11, the recording medium may have a structure illustrated in FIG. 13.

The recording medium illustrated in FIG. 13 has the first substrate 1, the second substrate 15, and the image recording layer 7 provided between these substrates.

In the image recording layer 7, the multiple microcapsules 6 each containing a transparent dispersion medium 3 containing white electrophoretic particles 4, black electrophoretic particles 5, and two or more kinds of thermoreversible gelling agents are arranged and fixed and insulated by a binder resin 10.

The first electric conductive layer 11 is provided between the image recording layer 7 and the first substrate 1, and the first electric conductive layer 11 is electrically connected to the first electrode 13 formed in the exterior of the recording medium.

As for the substrate (second substrate) provided an opposite side of the recording medium, the electric conductive substrate 15 containing an electroconductive filler is provided, being electrically connected to the image recording layer 7.

Moreover, a case where the electric conductive layer and the electrode are integratedly mounted is illustrated in FIGS. 12 to 13, but the electric conductive layer and the electrode can be provided as separate devices.

Image Recording Device, Image Recording Method, and Image Recording Set

The image recording device of the present disclosure is an image recording device used for recording an image on the recording medium of the present disclosure, and contains at least a heating device, an electric field application device and/or a magnetic field application device. The image recording device of the present disclosure preferably further contains an image erasing device, and may further contain other devices, if necessary.

In accordance to the image recording method of the present disclosure, an area of the image recording medium of the rewritable recording medium heated by the image recording device is smaller than, or larger than, or the same to an area of the image recording layer of the recording medium to which an electric field and/or magnetic field is applied.

In the case where the heated area of the image recording layer of the rewritable recording medium is smaller than the area of the image recording layer of the recording medium to which an electric field or magnetic field is applied, for example, used is a system where an electric field and/or magnetic field is applied an entire area of the recording medium, and an image pattern is recorded by applying heat.

In the case where the heated area of the image recording layer of the rewritable recording medium is larger than the area of the image recording layer of the recording medium to which an electric field or magnetic field is applied, for example, used is a system where an entire area of the recording medium is heated to turn the dispersion medium therein into a state of a sol, and an image patient is recorded by applying an electric field and/or magnetic field.

In the case where the heated area of the image recording layer of the rewritable recording medium is the same to the area of the image recording layer of the recording medium to which an electric field or magnetic field is applied, for example, used is a system where heat, and electric field and/or magnetic field are applied to an area of the recording medium to which an image is recorded.

The image recording set of the present disclosure contains at least the recording medium of the present disclosure, and an image recording device, and may further contain other members, if necessary.

Image Recording Device

The image recording device of the present disclosure is an image recording device used for recording an image on the recording medium of the present disclosure, and contains at least a heating device, an electric field application device and/or a magnetic field application device. The image recording device of the present disclosure preferably further contains an image erasing device, and may further contain other devices, if necessary.

The heating device, the electric field application device and/or the magnetic field application device, and the image erasing device are not necessarily provided in this order in the image recording device, and they can be arbitrarily provided. The image recording method of the present disclosure contains at least a heating step, and an electric field applying step or magnetic field applying step, preferably further contains an image erasing step, and may further contain other steps, if necessary.

The image recording method can be suitably carried out by the image recording device. The heating step can be carried out by the heating device. The electric field applying step or magnetic field applying step can be carried out by the electric field application device or magnetic field application device. The image erasing step can be carried out by the image erasing device.

The heating step, the electric field applying step and/or magnetic field applying step, and the image erasing step do not need to be performed in this order, and the order thereof can be appropriately set.

The image recording device is not integrated with the recording medium of the present disclosure and is a so-called external drive-type image recording device.

Heating Device and Heating Step

The heating device is appropriately selected depending on the intended purpose without any limitation, provided that it is a device capable of heating the recording medium to temperature equal to or higher than gelation (liquidization) temperature of the dispersion medium in the image recording layer of the recording medium.

The heating device is used differently in a case where the entire area of the image recording layer of the recording medium of the present disclosure is heated and a case where a part of the image recording layer is heated, depending on the image recording method.

For example, the former is a case where an entire area of the image recording layer is heated to turn into a state of a sol, followed by applying an electric field and/or magnetic field to a part of the image recording layer to record an image, and the latter is a case where, after (or while) an electric field and/or magnetic field is applied to the entire area of the image recording layer, part of the image recording layer is heated and turned into a state of a sol, thereby recording an image.

The sequence of the heating step and the electronic and/or magnetic field applying step can be the other way round.

It is also suitable to apply heat and an electric field and/or magnetic eld only to the area in which an image is recorded.

There is no specific limit to the heating method when heating the entire of an image recording layer. For example, various heaters are usable.

In addition, a fixing device for use in electrophotographic copiers or printers can be suitably used as the heating device.

Specifically, examples thereof include a heat roller.

The heating step is appropriately selected depending on the intended purpose without any limitation, provided that the recording medium of the present disclosure can be heated, and for example, the heating step can be carried out by the heating device.

Figure 14:
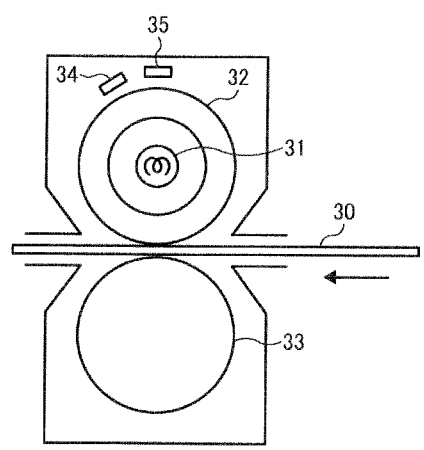
FIG. 14 is a schematic diagram illustrating an example of a heating device of an image recording device in an example of the image recording set according to an embodiment of the present invention.

FIG. 14 illustrates one example of the heating device using a heat roller.

The heating device of FIG. 14 contains a heat roller 32 having a heat source 31 inside, a pressure roller 33, a high speed response thermistor 34, and a thermostat 35 for preventing overheating.

Examples of the heat source 31 include a halogen heater, and a ceramic heater.

The heating roller 32 preferably has a configuration in which Si rubber is covered on a core metal with high rigidity such as iron and SUS.

As the pressure roller 33, a coating with a thickness of approximately 100 μm of Si rubber, fluorine-contained rubber or fluorine resin is coated on a core metal for smoothly feeding and preventing twining of a transfer material.

In addition, it is preferable that a pressurizing arm is provided on an end portion of the pressurizing roller 33, and spring suspension is provided to allow a load to be applied between the pressurizing roller and the heating roller 32.

A method is also possible that the pressurizing roller 33 is a heat roller enclosing a heater so as to heat the recording medium from both of the recording surface side and the back surface side, and this is suitable to increase the recording speed of the rewritable recording medium 30.

Figure 15:
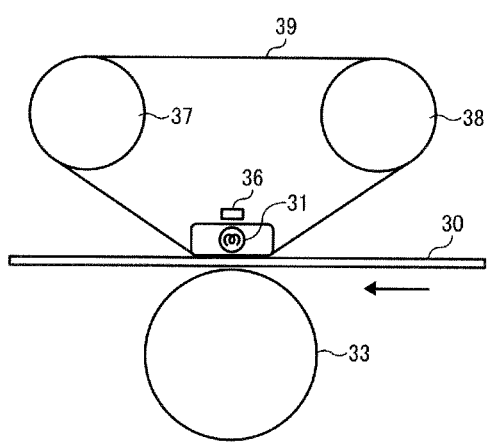
FIG. 15 is a schematic diagram illustrating another example of a heating device of an image recording device in an example of the image recording set according to an embodiment of the present invention.

As illustrated in FIG. 15, moreover, a device containing a belt-like form film roll 39 disposed in contact with the recording medium 30 of the present disclosure, and a heat source 31 fixed on the inner side of the film so as to face the recording medium 30 can be used.

This has advantages such as shortening the warm-up time and reducing the power consumption.

In this heating device, the belt-like form film roll 39 is rotated by a roller 37 and a roller 38.

Moreover, the recording medium 30 is pressurized by the pressure roller 33, Furthermore, the temperature of the heat source 31 is controlled by a temperature sensor 36.

The heating device is, for example, an IH (Electromagnetic Induction Heater) type device.

In the IH system, when a high-frequency power source (inverter) is connected to an exciting coil and a high-frequency current is supplied to the exciting coil, a high-frequency magnetic field is generated around an IH coil, and due to this magnetic field, an eddy current flows to a magnetic metal member and Joule heat is generated, whereby performing heating.

On the other hand, for recording an image on the recording medium to which an electric field and/or a magnetic field is applied by heating a part of the image recording layer, a thermal head can be used.

A thermal head is to record an image on a recording medium by selectively applying a potential to aligned heat resisting elements to generate heat according to image data.

The thermal head can be appropriately selected from conventional thermal heads used for a thermosensitive printer, such as a direct thermal printer, and a thermal transfer printer, provided that it can heat the recording medium to temperature equal to or higher than the solation temperature.

The thermal head is light in weight and small in size, requires low consumption power, and is capable of straight pass, hence is very suitable as an image forming device used for the recording medium of the present disclosure.

The recording medium of the present disclosure uses the thermoreversible gelling agent, and therefore temperature responsiveness of the recording medium to sol-gel transition is high, and sol-gel transition of the dispersion medium can be sufficiently induced by the thermal head.

Moreover, because of the points as mentioned, image formation can be performed not only by an electric field, but also by heat, it is very suitable and useful.

As another method, moreover, a method using laser light can be applied.

In this method, heating is performed using thermal energy of laser light, which is a non-contact heating system different from recording by a thermal head. With this method, recording can be performed from a position distant from the recording medium.

As other heating devices, for example, a microwave and an IH heater can be used. Any heating device that can n heat a recording medium can be used.

Electric Field or Magnetic Field Application Device and Electric Field or Magnetic
Field Applying Step The electric field application device or magnetic field application device is appropriately selected depending on the intended purpose without any limitation, provided that it is a device to apply an electric field, or a magnetic field, or a combination thereof to the recording medium of die present disclosure.

The electric field applying step or magnetic field applying step is appropriately selected depending on the intended purpose without any limitation, provided that it is a step containing applying an electric field and/or a magnetic field to the recording medium of the present disclosure. For example, the electric field applying step or magnetic field applying step can be performed by the electric field application device or magnetic field application device.

Electric Field Application Device

The electric field application device is used differently in a case where an electric field is applied to the entire area of the image recording layer of the recording medium of the present disclosure and in a case where an electric field is applied to a part of the image recording layer, depending on the image recording method.

The former is a case where, after (or during) an electric field is applied to the entire area of the image recording layer, an image is formed by the heating device, and the latter is a case where, after an entire area of the image recording layer is heated by the heating device, an electric field is applied to a part of the image recording layer to record an image.

As for a device to apply an electric field to an entire area of the image recording layer of the recording medium, various chargers or dischargers are used, but such device is particularly limited as long as it is capable of applying an electric field. Examples thereof include a corona charger, a roller charger, a brush charger, a blade charger, and a solid discharger.

The corona charger is a member that charges the rewritable recording medium by applying a high voltage to a wire, ionizing the air around the wire, and moving the ions to the surface of the rewritable recording medium, and has advantages of non-contact, high-speed traceability, and high charge uniformity.

The corona charger is formed by laying discharge wires such as tungsten wires and stainless steel wires with a diameter of 40 μm to 100 μm in 1 row to 3 rows in a shield case provided with corrosion resistance, and gold-plated discharge wires are used for reducing discharge unevenness in many cases.

As the corona charger, there are a corotron type without a grid and a scorotron type using metal thin wires or punching metal as a grid (control grid or suppressor grid).

The discharge state is different between the case where a positive voltage is applied to the discharge wire and the case where a negative voltage is applied to the discharge wire, and when a positive voltage is applied, discharge occurs uniformly along the wire, and on the other hand, when a negative voltage is applied, discharge becomes point-like.

Therefore, when a positive voltage is applied, charging becomes substantially uniform even without a grid, and on the other hand, when a negative voltage is applied, charge unevenness assuming linear shading occurs without a grid, so that a scorotron type provided with a grip is preferable for uniform charging.

The roller charger is electrically connected to or provided adjacent to the recording medium of the present disclosure, and can charge an entire surface of the recording medium while rolling with respect to the movement of the recording medium.

The roller charger is typically composed of two layers of an elastic layer and a top layer provided on a core metal. Particularly for the elastic layer, for example, hydrin rubber or urethane rubber is used.

A resistance control material such as carbon, graphite, active carbon fiber, and an ion electroconductive material is dispersed in these kinds of rubber to control the volume resistivity within the range of from $10^5$ Ω·cm to $10^8$ Ω·cm.

The roller charger produces less ozone and NOx and allows setting of a low applied voltage, so that it is useful to reduce power consumption.

Moreover, it is also possible to use an application device, other than a charger utilizing discharge. Such application device is particularly suitably used for a recording medium, in which an electric conductive layer is provided between a substrate and an image recording layer, or an electric conductive substrate is used as a substrate.

Use of these recording mediums is particularly preferable because driving voltage can be significantly reduced and it obviates the need of a charger utilizing discharge, which it particularly preferable in the present disclosure.

In a case of the recording medium in which an electric conductive layers or electric conductive substrates are provided on both surfaces of the image recording layer, an electric field can be applied thereto which has a voltage equal to the difference between the voltage applied to the electric conductive layer or electric conductive substrate provided at the side from which the recording medium is viewed and the voltage applied to the electric conductive layer or electric conductive substrate provided at the opposite side to the side from which the recording medium is viewed.

For example, an electric field of 100 V can be applied to the image recording layer by applying voltage of 100V to the electric conductive layer provided at the side from which viewed, through an electrode of the recording medium electrically connected with the electric conductive layer, and electrically connecting the electrode, which is electrically connected with the electrically conductive layer provided at the opposite side to the side from which viewed, with earth. The reverse connection thereof can apply an electric field of −100 V to the image recording layer.

In this case, as for the application device, any device can be used, as long as it is electrically connected to an electrode or electric conductive substrate, and is capable of applying an electric field to the image recording medium.

For example, a brush-like form or roller-like form member having electric conductivity is preferably used. Specifically, a brush formed of electric conductive fibers or metal plating, or a rubber formed of electric conductive rubber or metal can be used.

The device to apply a part of the image recording layer of the recording medium of the present disclosure to form an image is appropriately selected depending on the intended purpose without any limitation, provided that it is capable of forming a latent electrostatic image, and can form an image by applying an electric field to the recording medium.

As for a system for forming the latent electrostatic image, an electrophotographic system, and an ion irradiating system have been known, and these systems can be particularly effectively used in the present disclosure.

In order to apply an electric field, a counter electrode is provided at the osition facing the image forming device via the recording medium.

Electrophotographic Image Forming Device

The electrophotographic application device is appropriately selected depending on the intended purpose without any limitation, and examples thereof include a device to charge an image hearing member, and then exposing the image bearing member to light corresponding to an image pattern to form a latent electrostatic image on the surface of the image bearing member.

The recording medium of the present disclosure can be recorded by bringing the recording medium into contact with the surface of the image bearing member on which a latent electrostatic image has been formed.

The electrophotographic image forming device includes at least an image bearing member, a charger, and an exposing device, and may further have other members, such as a diselectrification device, if necessary.

In order to apply an electric field to the recording medium of the present disclosure, a counter electrode is provided at the position facing the image bearing member serving as the image forming device via the recording medium of the present disclosure.

Image Bearing Member

There is no specific limit to the selection of the image bearing member. Any image bearing member that can form a latent electrostatic image can be suitably used.

For example, it is appropriate to use an image bearing member having a single-layer photosensitive layer formed by intermingling a charge generating material and a charge transporting material, provided on an electric conductive substrate formed of an aluminum or nickel element tube or a belt or a laminate image bearing member, in which a charge generating layer and a charge transporting layer are laminated.

Further, the image bearing member is optionally of a high resistant image bearing member, in which a protective layer is provided at a top surface thereof.

The image bearing member can be used both by positively charged and by negatively charged. As there are more variations of hole transporting materials than those of electron transporting materials, a negative charging system (in this case, black electrophoretic particles are positively charged) is preferable in view of electrostatic properties.

However, a positive charging system can be used in the case of the single-layer image bearing member, as electron transportation and hole transportation are possible.

Charger

The charger is appropriately selected depending on the intended purpose without any limitation, provided that it is capable of charging the image bearing member. Examples of the charger include a corona charger, a roller charger, a solid discharger, and a brush charger.

Of these, a corona charger and a roller charger are preferable.

Exposing Device

The exposing device is appropriately selected depending on the intended purpose without any limitation, provided that it is capable of forming a latent electrostatic image on a surface of the image bearing member, and examples thereof include a semiconductor laser (LD), a light emitting diode (LED), and an electroluminescence (EL).

Of these, a semiconductor laser (LD) and a light emitting diode (LED) are preferable.

Among these, light emitting diodes (LED) and semiconductor lasers (LD) are commonly used.

Diselectrification Device

The diselectrification unit is appropriately selected depending on the intended purpose without any limitation, provided that it is capable of totally erasing the latent electrostatic image formed on the surface of the image bearing member.

Specific examples thereof include, but are not limited to, a semiconductor laser (LD), a light emitting diode (LED), an electroluminescence (EL), a fluorescent light, a tungsten lamp, and a halogen lamp. Of these, a light emitting diode (LED) is preferable.

Other Devices

Examples of the aforementioned other devices include a cleaning device, and a lubricating substance application device.

The cleaning device is used for the purpose of removing foreign matter and discharge product deposited on the surface of the image bearing member.

The cleaning device is appropriately selected depending on the intended purpose without any limitation, and examples thereof include a blade, and a brush.

The cleaning device is preferably disposed to be in contact with the image bearing member.

The lubricating substance application device is used for the purpose of enhancing lubricity of the surface of the image bearing member or removing a discharge product in combination with the cleaning device.

The lubricating substance application device is appropriately selected depending on the intended purpose without any limitation, and examples thereof include a brush.

The lubricating substance application device is preferably disposed to be in contact with the image bearing member and a solid lubricating substance.

In a case where the lubricating substance application device is a brush, the lubricating substance is applied to the surface of the image bearing member by rotating the brush.

Examples of the lubricating substance include wax, a fluorine-containing resin, a silicone resin, a polyolefin-based resin, and fatty acid metal salt.

Of these, fatty acid metal salt is preferable, and zinc stearate is more preferable.

Counter Electrode

The counter electrode is provided at the position opposite to the image bearing member to place the recording medium of the present disclosure between the counter electrode and the image hearing member.

A material of the counter electrode is appropriately selected depending on the intended purpose without any limitation, provided that it conducts electricity, and examples thereof include platinum, gold, silver, copper, aluminum, zinc, nickel, titanium, and bismuth, alloys of these metals and carbon.

Since it is suitable to enhance the attachability between the counter electrode and the rewritable recording medium, for example, a conductive roll member with elasticity is preferably used as the counter electrode.

Figure 16:
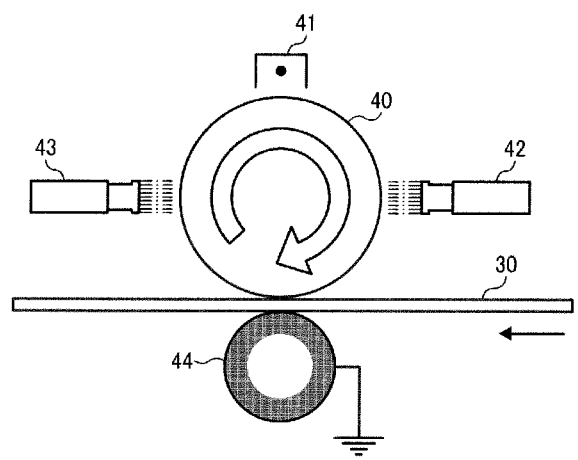
FIG. 16 is a schematic diagram illustrating an example of an electric field application device in an example of an image recording device in the image recording set according to an embodiment of the present invention.

FIG. 16 illustrates an example of an image forming device using an image bearing member in the image recording device.

At the recording side of the recording medium 30 of the present disclosure, an image bearing member 40 is provided to be in contact with the recording medium 30. At the back surface side of the recording medium 30, a counter electrode 44 is provided to at the position opposite to the image bearing member 40 to place the recording medium 30 between the counter electrode 44 and the image bearing member 40.

In the surrounding area of the image bearing member 40, provided are at least a charger 41 to charge the image bearing member 40, an exposing device 42 to form a latent electrostatic image on a surface of the image bearing member 40, and a diselectrification device 43 to erase the latent electrostatic image on the surface of the image bearing member 40.

Ion Irradiation Type Image Forming Device

The ion irradiation type application device includes, for example, an ion flow generating section generally made of a discharge body, an electrode that controls a generated ion flow, and an opening for releasing an ion flow.

The flow volume of ions generated in the ion flow generating section is controlled by an electric field.

With the ion irradiation type, under an atmosphere in which ion generation is possible such as in the atmosphere, a latent electrostatic image can be directly formed by irradiation of ions generated by discharge from a discharge electrode, so that an image can be directly recorded on the recording medium of the present disclosure.

As the ion irradiation type, for example, JP-3725092-B1 (JP-2003-326756-A) describes a heating discharge type in which discharge is generated by selectively heating discharge electrodes in a state where a voltage (discharge control voltage) that does not generate discharge only by being applied to the discharge electrodes but generates discharge by heating is applied.

This type includes discharge electrodes and heating elements disposed corresponding to the respective discharge electrodes, and discharge is not generated only by applying a voltage to the discharge electrodes, and discharge is generated by heating.

Therefore, ion generation can be controlled by the presence/absence of heating elements, and lower-voltage driving, cost reduction, and downsizing of the device are realized.

A specific example of the ion irradiation type application device is an ion irradiation head having the aforementioned mechanism.

The ion irradiation head contains a discharge body, and optionally a heating member and other members.

Moreover, a counter electrode is provided at the position opposite to the ion irradiation head via the recording medium of the present disclosure.

Since image recording to the recording medium of the present disclosure is realized by heating and liquidizing the dispersion medium of the image recording layer, the aforementioned system, in which heating is performed during image recording, is very suitable for the present disclosure.

That is, this image recording method is capable of matching the area of the image recording layer of a rewritable recording medium to which an electric field is applied with the area of the image recording layer of a rewritable recording medium to which heat is applied.

Therefore, in this method, this irradiation device (ion irradiation head) serves as a heating device and an electric field application device, which is advantageous to reduce the cost, power consumption, and the size of a device.

Figure 17:
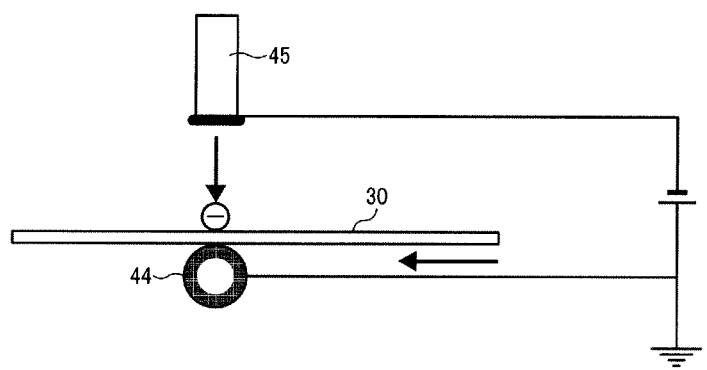
FIG. 17 is a schematic diagram illustrating another example of an electric field application device in an example of an image recording device in the image recording set according to an embodiment of the present invention.

FIG. 17 illustrates one example of the ion irradiation type image forming device. In FIG. 17, at the position opposite to the ion irradiation head 45, a counter electrode 44 is provided to as to be in contact with the back surface of the recording medium 30. The ion irradiation head 45 is provided in contact with or adjacent to the recording surface of the recording medium 30.

Inside the ion irradiation head 45, a discharger and optionally a heating member are provided. In the case of heating discharge system, a voltage is applied to a region in which discharge is generated by heating, and ion irradiation is carried out by temperature control by using the heating member.

Ions that passed through the opening of the ion irradiation head 45 are attached to the recording medium 30 according to an electric field formed between the ion irradiation head 45 and the counter electrode 44, thereby recording an image.

Device to Form Image by Applying Magnetic Field

Similar to the application device, the magnetic field application device is used differently in a case where a magnetic field is applied to an entire area of the image recording layer of the recording medium of the present disclosure, and in a case where a magnetic field is applied to a part of the image recording layer, depending on the image recording method.

The former is the case where an image is formed by the heating device, while applying a magnetic field to the entire area of the image recording Layer, and the latter is a case where, after the entire area of the image recording layer is heated by the heating device, a magnetic field is applied to a part of the image recording layer to record an image.

The magnetic field application device to apply a magnetic field to an entire surface of the image recording layer of the recording medium is preferably a magnet, in particular, a permanent magnet such as an alnico magnet, ferrite magnet, neodymium magnet, and samarium-cobalt magnet, or electromagnet, and particularly preferably an electromagnet.

The electromagnet is formed by winding a coil around a ferromagnetic iron core with high magnetic permeability, and when a current is supplied to the coil, due to its magnetic field, the iron core is magnetized and becomes a magnet, and when the current is cut off, the iron core returns to an unmagnetized state.

On the other hand, the magnetic field application device to apply a magnetic field to a part of the image recording layer of the recording medium is appropriately selected depending on the intended purpose without any limitation, provided that it can form a latent magnetic image, and can form an image by applying a magnetic field of the recording medium. Examples thereof include a magnetic head to be used for a magnetography magnetic printer.

Magnetic Head

The magnetic head is enabled to form a latent magnetic image when leakage magnetic flux is generated from the magnetic pole tip end portion by supplying a current to the coil of each channel.

By scanning the recording medium with the magnetic head, magnetophoretic particles of the recording medium are made migrate, and an image is recorded on the recording medium.

However, as the magnetic head, there are a multi-channel type and a full-line type, and a full-line type including aligned multichannel heads enables high-speed recording without the need of scanning of the heads.

The material of the head is preferably a soft magnetic material to be used for a high-permeability core.

The soft magnetic material is, for example, a high-permeability material with low coercivity and high saturation flux density such as Fe—Si—B—C amorphous alloy, FeP, pennalloy (NiFe alloy), FeCoP, CoP, FeB, FeBSi, and silicon steel.

The magnetic printer is capable of forming a latent magnetic image on a latent magnetic image bearing member by using a magnetic head, and in the present disclosure, is also capable of performing recording by bringing the recording medium according to the present disclosure into contact with the latent magnetic image bearing member on which a latent magnetic image is formed.

It is possible to use an application device and a magnetic field application device in combination, as the image forming device.

A multi-color printing can be realized by using the application device and the magnetic field application device in combination, using electrophoretic particles and magnetophoretic particles, colors of which are different, in the recording medium of the present disclosure.

Image Erasing Device and Image Erasing Step

The image erasing device is appropriately selected depending on the intended purpose without any limitation, provided that it is to apply an electric field, or a magnetic field, or a combination thereof to the recording medium of the present disclosure to erase the image recorded on the recording medium.

The image erasing step is appropriately selected depending on the intended purpose without any limitation, provided that it contains applying an electric field, or a magnetic field, or a combination thereof to the recording medium of the present disclosure to erase the image recorded on the recording medium. For example, the image erasing step can be carried out by the image erasing device.

Device to Erase Image by Applying Electric Field

The device for erasing an image by applying an electric field is appropriately selected depending on the intended purpose without any limitation, and examples thereof include an image erasing device containing a counter electrode, and any of a charger, a discharger, an electric conductive brush, or electric conductive roller.

Specifically, the application device to apply an electric field to the entire surface of the image recording layer of the recording medium of the present disclosure, such as a corona charger, a roller charger, a solid discharger, a metal brush, and an electric conductive rubber roller, is also effectively used as the image erasing device.

Examples of the counter electrode include the counter electrode mentioned in the descriptions of the electrophotographic image forming device.

Device to Erase Image by Applying Magnetic Field

The device to erase an image by applying a magnetic field is appropriately selected depending on the intended purpose without any limitation. For example, the magnetic field application device to apply a magnetic field to the entire surface of the image recording layer of the recording medium of the present disclosure, such as permanent magnet, and electromagnet, is also effectively used as the image erasing device.

By scanning the rewritable recording medium or the permanent magnet in a state where the permanent magnet is brought into contact with the recording surface and/or the back surface of the recording medium, a recorded image can be totally erased.

The electromagnet is capable of controlling its magnetic force by means of turning ON/OFF of current supply, so that for example, a head including aligned electromagnets is provided, and the head is scanned with respect to the entire surface of the recording medium in a state where the current supply is turned ON, whereby totally erasing a recorded image.

Other Device and Other Process

Examples of the aforementioned other devices include a cooling device.

Examples of the aforementioned other steps include a cooling step.

Cooling Device and Cooling Step

The cooling device is appropriately selected depending on the intended purpose without any limitation, provided that it is a device capable of cooling the image recording layer of the recording medium of the present disclosure to temperature equal to or lower than the gelation temperature thereof.

Examples of the cooling device include a cooling fan, a cooling roller, and a cooling belt.

The cooling step is appropriately selected depending on the intended purpose without any limitation, provided that it is a step containing cooling the image recording layer of the recording medium of the present disclosure to temperature equal to or lower than the gelation temperature thereof. For example, the cooling step can be carried out by the cooling device.

By the cooling device and the cooling step, the dispersion medium is turned into a gel soon after image recording, and image defects can be prevented, so that higher image quality is realized.

The image forming device of the set of the image recording set of the present disclosure includes at least a heating device and an electric field application device and/or a magnetic field application device and preferably an optional device of an image erasing device. It is possible to combine at least two of the heating device, the electric field application device and/or the magnetic field application device, and the image erasing device as a single device, which is advantageous to reduce the cost, power consumption, and the size of a device.

Specifically, it is possible to perform image formation while heating, using the heating device and the application device in combination.

For example, the ion irradiation head is provided with a heating member, or a drum heater is mounted on the image bearing member capable of forming a latent electrostatic image.

It is also possible that the image erasing device and the application device are combined so that image recording is performed subsequently to total image erasing.

For example, after totally erasing the image on the recording medium of the present disclosure by the application device, an image can be used by means of the same application device.

Similarly, it is also possible to combine the heating device, the electric field application device and/or magnetic field application device, and the image erasing device.

For example, an image on the recording medium of the present disclosure is erased by initially outputting a solid pattern on the entire surface of the recording medium by the image bearing member equipped with a drum heater as the heating member, followed by outputting an image pattern.

As described above, as for the image recording device of the image recording set of the present disclosure, the heating device, the image erasing device, the electric field application device and/or the magnetic field application device can be combined for use, and all combinations are within the scope of the present disclosure.

Each of the heating device, the image erasing device, and at least one of the electric field application device and the magnetic field application device provided can be plural in number.

In particular, by installing multiple the heating devices, the image quality may be improved.

For example, an image is stably formed in any temperature environment by maintaining the temperature of the recording medium of the present disclosure with multiple the heating devices from the time when the recording medium is passed the first heating device to the time when an image is recorded.

In the case where an image bearing member is used as the image forming device, particularly, gelation of the dispersion medium may be started when the recording medium, which has been heated by the heating device in advance, is in contact with the image bearing member, if the image bearing member serving as the image forming device is cold.

Therefore, it may be suitable to provide a drum heater serving as the heating member to the image bearing member to maintain the temperature of the recording medium high until image recording is completed.

One example of the electrophoretic image recording method using the recording medium of the present disclosure is explained with reference to FIGS. 18 and 19.

However, the present disclosure is not limited to these examples.

Figure 18:
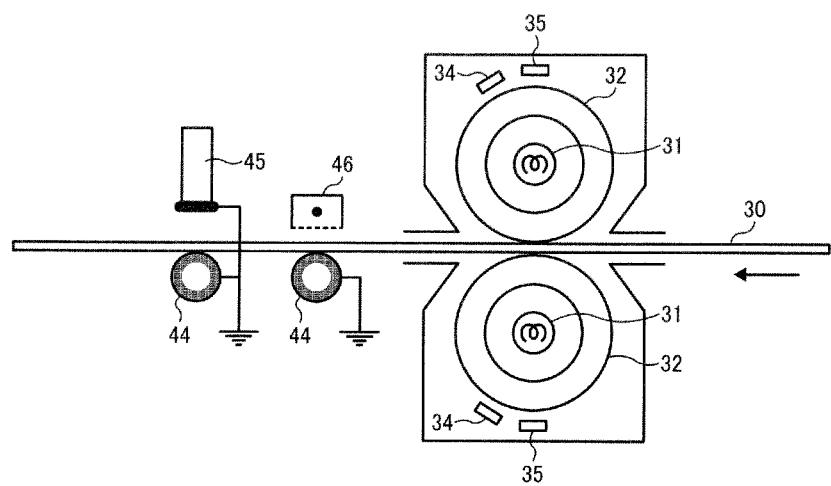
FIG. 18 is a schematic diagram illustrating an example of an image recording device in the image recording set according to an embodiment of the present invention.

The image recording device depicted in FIG. 18 contains a heating device equipped with heating rollers 32 each containing a heat source 31 respectively provided with respect to both a recording surface and back surface of the recording medium 30 of the present disclosure, an image erasing device 46 to charge an entire recording surface of the recording medium 30 by a corona charger to erase all the recorded image, an image forming device to form an image on the recording medium 30 using an ion irradiation head 45, and a counter electrode 44, which is brought into contact with back surface of the recording medium 30 when the recorded image is all erased and an image is formed.

The heating device further contains a high speed response thermistor 34 and a thermostat 35.

Figure 19:
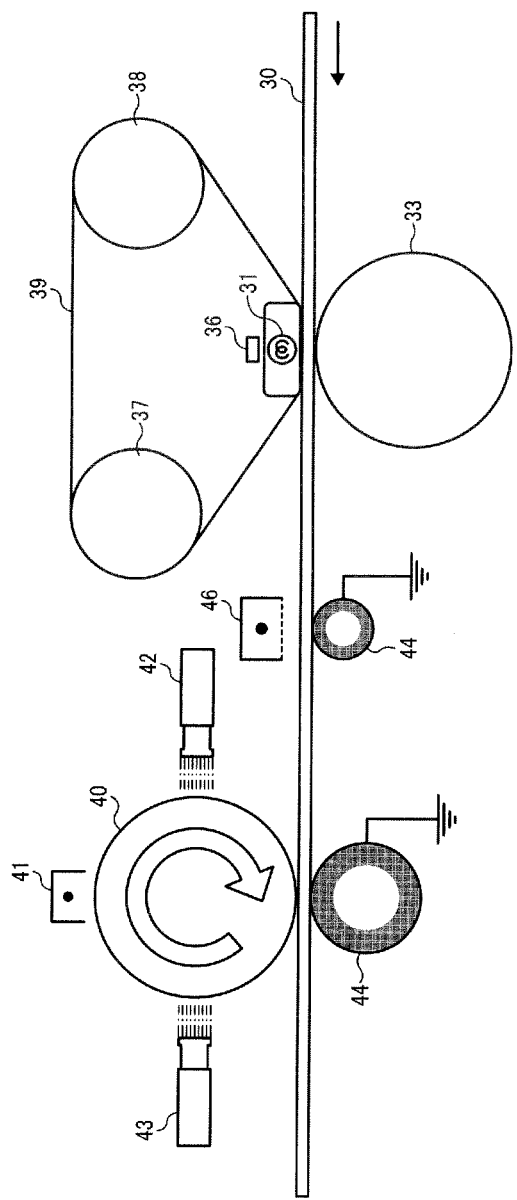
FIG. 19 is a schematic diagram illustrating another example of an image recording device in the image recording set according to an embodiment of the present invention.

The image recording device depicted in FIG. 19 contains a heating device to heat the recording medium 30 through a belt-like form film roll 39 that is suspended around and provided in contact with a heat source 31, an image erasing device 46 to charge an entire recording surface of the recording medium 30 by means of a corona charger to erase the recorded image, an image forming device containing an image bearing member 40 to which a latent electrostatic image can be repeatedly formed by means of a charger 41, an exposing device 42, and a diselectrification device 43, and a counter electrode 44, which is brought into contact with back surface of the recording medium 30 when the recorded image is all erased and an image is formed.

In the heating device, the belt-like form film roll 39 is rotated by a roller 37, and roller 38.

Moreover, the recording medium 30 is pressurized by the pressure roller 33.

Furthermore, the temperature of the heat source 31 is controlled by a temperature sensor 36.

As illustrated in FIGS. 18 and 19, as the recording medium 30 is heated by the heating device, the dispersion medium contained in the recording medium is turned into a liquid by a function of the thermoreversible gelling agent contained in the dispersion medium, so that the electrophoretic particles dispersed in the dispersion medium are allowed to move.

Next, uniform voltage is applied to an entire recording surface of the recording medium 30 by the image erasing device 46 to erase all the recorded image on the recording medium 30, so that the electrophoretic particles, which contribute to image formation, move to the opposite side of the image recording layer to the side thereof from which it is viewed.

In the case where electrophoretic particles for constituting a background of an image are contained, these electrophoretic particles are moved to the side of the image recording layer from which it is viewed.

In the case where positively charged black electrophoretic particles are contained in the dispersion medium, for example, the black electrophoretic particles are moved to the opposite side to the side thereof from which it is viewed by applying positive charge by the image erasing device 46.

In the case where negatively charged white electrophoretic particles are contained as well as the black electrophoretic particles, the black electrophoretic particles are moved to the opposite side to the side thereof from which it is viewed by applying positive charge and the white electrophoretic particles are moved to the side from which it is viewed, by applying positive charge by the image erasing device 46.

Subsequently, a latent electrostatic image corresponding to an image pattern is formed on the recording medium 30, to thereby record the image pattern on the recording medium 30.

In the case where an image forming device to form a negatively charged latent electrostatic image in an imaging area is used, for example, the positively charged black electrophoretic particles are moved to the side to be viewed, and no movement of the particles occurs in non-imaging area, so that a black image pattern is recorded on the recording medium 30.

Thereafter, once the recording medium 30 is cooled to room temperature, the dispersion medium in the recording medium 30 is turned into a state of a gel by a function of the thermoreversible gelling agent, so that the electrophoretic particles contained in the dispersion medium cannot move, and the dispersion medium turns white (e.g., turns cloudy).

As a result, the imaging area in which the black electrophoretic particles have moved to the side to be viewed is displayed in black, and other area is displayed in white, to thereby form an image.

Moreover, the formed image is stably maintained even when stimuli is externally applied over a long period, as the dispersion medium is converted into a gel.

Figure 20:
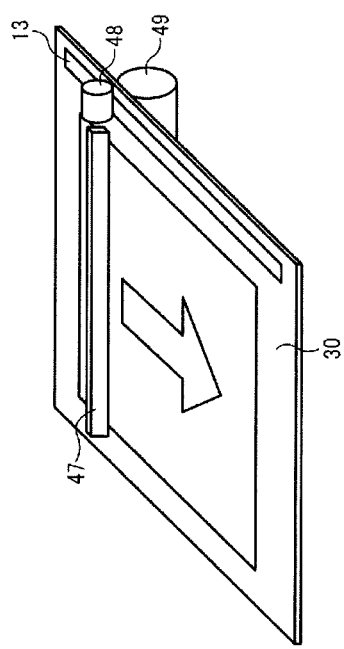
FIG. 20 is a schematic diagram illustrating another example of an image recording device in the image recording set according to an embodiment of the present invention.
Figure 21:
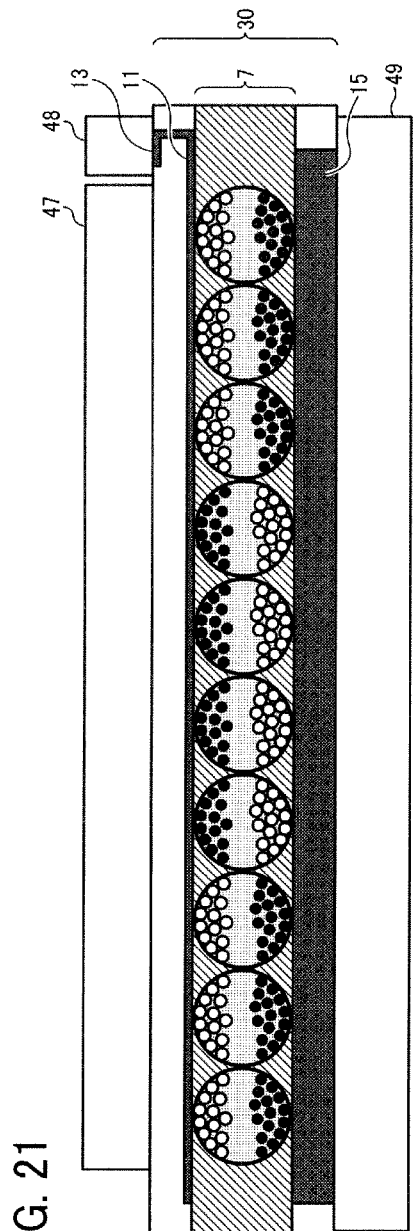
FIG. 21 is a schematic diagram illustrating another example of an image recording device in the image recording set according to an embodiment of the present invention.

Another example of an image recording method of electrophoresis using the recording medium of the present disclosure will be exampled through FIGS. 20 and 21.

However, the present disclosure is not limited to these examples.

The image recording device depicted in FIG. 20 contains a thermal head 47 serving as an image forming device to heat a certain area of the recording medium 30 of the present disclosure, an application device 48 to electrically connect with a first electrode 13 formed in an external part of the recording medium and to apply an electric field to the image recording layer in the recording medium, and an electric field application device 49 to externally connect to a second electrode 14 or an electric conductive substrate 15 (not illustrated) formed on a back surface of the recording medium, and to apply an electric field to the image recording layer in the recording medium.

FIG. 21 illustrates the state where FIG. 20 is viewed from the side, and as for the recording medium, the recording medium illustrated as one example thereof in FIG. 13 is used.

Once the recording medium 30 is set in the image recording device and is transported therein, the first electrode 13 formed in the external part of the recording medium 30 and the roller-like form application device 48 equipped with the image recording device are brought into contact with each other.

Similarly, the electrode conductive substrate 15 formed on the back surface of the recording medium 30 and the electric field application device 49 having a roller-like form provided to the image recording device are brought into contact each other.

When an electric field is applied to the application devices 48 and 49, the electric field is applied to the entire image recording layer 7.

Note that, the first electric conductive layer 11 and the electric conductive substrate 15 are not electrically connected to each other, and they are insulated with the image recording layer 7.

Moreover, as for other structural examples of FIG. 21, there are structures illustrated in FIGS. 22 and 23.

At the same time as the electric field is applied to the entire image recording layer 7, the predetermined area of the image recording layer 7 is heated by the thermal head 47.

The area heated by the thermal head 47 is liquidized by a feature of the thermoreversible gelling agent contained in the dispersion medium in the recording medium, and the electrophoretic particles therein are allowed to move by further applying an electric field to the entire area of the image recording layer 7.

When the recorded image in the entire area of the recording medium 30 is erased, the entire area of the image recording layer 7 is heated by the thermal heat 47, while applying an electric field to the entire area of the image recording layer 7, thereby liquidizing the dispersion medium. As a result, the electrophoretic particles contributing to image formation are moved to the opposite side to the side of the image recording layer from which the image recording layer is viewed, thereby erasing the entire area of the recording medium. In a case where positively charged black electrophoretic particles are added to the dispersion medium, for example, the black electrophoretic particles are moved to the opposite side to the side to be viewed by positively charging the side of the image recording layer 7 from which it is viewed by means of the electric field application devices 48 and 49.

In a case where negatively charged white electrophoretic particles are added as well as the black electrophoretic particles, the white electrophoretic particles are moved to the side to be viewed.

As a result, the entire surface turned into white so that a state where an image is erased can be created.

When an image pattern is recorded on the recording medium 30, the predetermined area of the image recording layer 7 is heated by the thermal head 47 to liquidize only the dispersion medium present in the heated area, while an electric field is applied to the entire image recording layer 7, so that the electrophoretic particles contributing to image formation are moved to the side of the image recording layer 7 from which the image recording layer 7 is viewed.

In a case where negatively charged white electrophoretic particles are contained as well as the black electrophoretic particles, the white electrophoretic particles are moved to the opposite side to the side from which it is viewed.

As a result, arbitrary image patterns can be recorded.

In the case where positively charged electrophoretic particles are contained in the dispersion medium, for example, from the initial state that the entire area of the image recording layer 7 is in white, the black electrophoretic particles are moved to the side from which the image recording layer 7 by negatively charging the side of the image recording layer 7 from which it is viewed by means of the electric field application devices 48 and 49.

In a case where negatively charged white electrophoretic particles are contained as well as the black electrophoretic particles, the white electrophoretic particles are moved to the opposite side to the side from which it is viewed.

As a result, the predetermined black image pattern with the white background can be recorded.

When the recording medium, to which recording or erasing has been performed in the aforementioned manner, is cooled, the dispersion medium in the recording medium 30 is turned into a state of a gel by a function of the thermoreversible gelling agent so that the electrophoretic particles contained the dispersion medium cannot move. Therefore, an image on the recording medium is stably maintained, even when the recording medium is maintained over a long period, or stimuli is externally applied thereto.

The aforementioned image recording device using the thermal head 47 has a very simple structure, and therefore it is very effective in downsizing, reducing the weight thereof, cost waving, and powder saving.

Moreover, the recording medium having an electrode at the exterior thereof or electric conductive substrate, which is used for the aforementioned image recording device, is as thin as paper, and an electric field is directly applied to the image recording layer thereof, while maintaining flexibility. Therefore, it is possible to record a high contrast image thereon with low driving voltage, and this recording medium is particularly useful in the present disclosure.

The image recording set is very useful as a portable rewritable printer.

The image recording set of the present disclosure contains the aforementioned recording medium, and an image recording device equipped with a heating device to heat the recording medium, and an electric field and/or magnetic field application device to apply an electric field and/or magnetic field to the recording medium.

The image recording set of the present disclosure include, not only an embodiment where a recording medium and an image recording device, which are separately existed, are used as a set, but also an embodiment where a recording medium and an image recording device are integrated.

Figure 24:
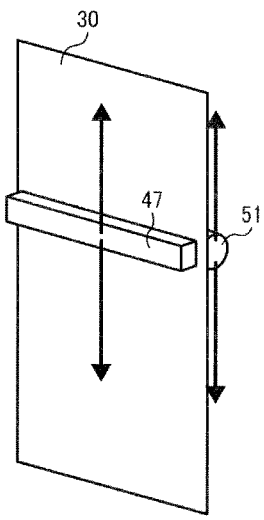
FIG. 24 is a diagram illustrating an example of an image recording set where a recording medium and an image recording device are integrated together.
Figure 25:
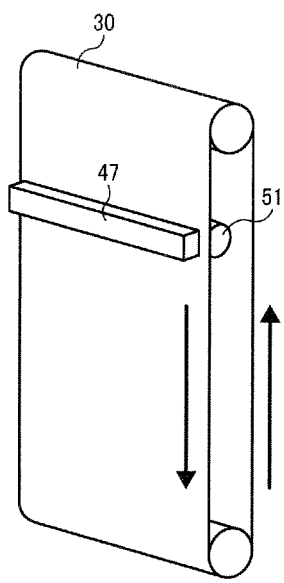
FIG. 25 is a diagram illustrating another example of an image recording set where a recording medium and an image recording device are integrated together.

Examples of the integrated image recording set will be illustrated in FIGS. 24 and 25.

FIG. 24 is a diagram illustrating the image recording set of the present disclosure equipped with a heating device 47 to record and erase an image on the recording medium 30 of the present disclosure, and an electric field and/or magnetic field application device 51 to generate an electric field and/or a magnetic field in an image recording layer, which are integratedly mounted with the recording medium 30.

Moreover, the image recording set contains other devices, such as an image erasing device, and a cooling device.

In the image recording set depicted in FIG. 24, the recording medium 30 is fixed, and an image can be recorded on and erased from the recording medium 30, by moving the heating device 47, and the electric field and/or magnetic field application devices 51, which had been integrated with the recording medium 30, over an external surface of the recording medium 30.

Moreover, another example, which is different from FIG. 24, is depicted in FIG. 25. FIG. 25 is a diagram illustrating the image recording set of the present disclosure equipped with a heating device 47 to record and erase an image on the recording medium 30, and an electric field and/or magnetic field application device 51 to generate an electric field and/or a magnetic field in an image recording layer, which are integratedly mounted with the recording medium 30 of the present disclosure.

Moreover, the image recording set contains other devices, such as an image erasing device and a cooling device.

In the image recording set depicted in FIG. 25, the heating device 47 and the electric field and/or magnetic field application devices 51 and 52 are fixed, and an image can be recorded on and erased from the recording medium 30 by moving the recording medium 30 while in contact with the heating device 47 and the electric field and/or magnetic field application devices 51.

Figure 26:
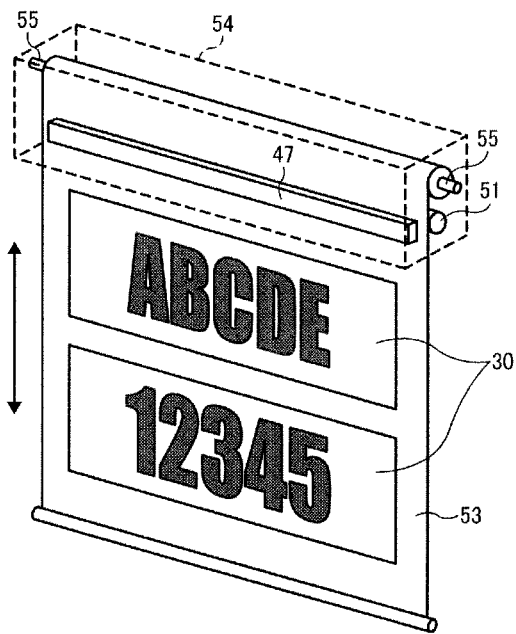
FIG. 26 is a diagram illustrating another example of an image recording set where a recording medium and an image recording device are integrated together.

Furthermore, the image recording set of the present disclosure having a roll screen as illustrated in FIG. 26 is very suitable.

The image recording set of FIG. 26 is a roll screen type having a flexible sheet-like form screen 53 and a drive unit 55 to roll up or release the screen 53 in addition to the recording medium 30, the heating device 47, and the electric field and/or magnetic field application devices 51. The recording medium 30 is provided on the screen 53.

In addition, the image recording set optionally has a container 54 to accommodate the screen 53, the recording medium 30, the heating device 47, the electric field and/or magnetic field application devices 51, etc.

Figure 27:
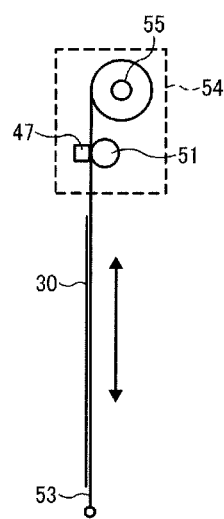
FIG. 27 is a diagram illustrating another example of an image recording set where a recording medium and an image recording device are integrated together.

FIG. 27 is a diagram illustrating a side view of FIG. 26.

Rolling up a screen means that a screen having a sheet-like form is rolled up. Releasing a screen means drawing a screen in a reverse direction of rolling up. That is, a screen having a roll-like form is released to have a sheet-like form.

In addition, the screen 53 to which the recording medium 30 is provided is formed by attaching the recording medium 30 to the screen 53. Alternatively, both are integrated.

The image recording set records or erases an image in the recording medium 30 by using the heating device and the electric field and/or magnetic field application device in the step of rolling up or releasing the screen 53 to which the recording medium 30 is provided.

Recorded and erasing images can be conducted in the step of rolling up or releasing the screen or separately.

For example, when the screen 53 to which the recording medium 30 is provided, accommodated in the container 54, is released and pulled out therefrom, it is possible to record an image in the recording medium 30 provided to the screen 53 by the heating device 47 and the electric field and/or magnetic field application devices 51.

To the contrary, when the screen 53 pulled out from the container 54 is pulled thereinto, the recorded image on the recording medium 30 provided to the screen 53 can be erased by the heating device 47 and the electric field and/or magnetic field application devices 51.

In addition, it is possible to record or erase an image in the medium 30 provided to the screen 53 when the screen 53 is rolled up. Also it is possible when the screen 53 is released.

Furthermore, it is possible to record an image while the screen 53 to which the recording medium 30 is provided is released, thereafter, roll up the screen 53 without erasing the image, and overwrite the image when the screen 53 is released again.

The image recording set, as illustrated in FIGS. 26 and 27, records and erases image by the heating device 47 and the electric field and/or magnetic field application devices 51.

It is also possible to provide the heating devices 47 for recording and erasing separately and the electric field and/or magnetic field application devices 51, which is suitable in terms of improvement of contrast and suppressing residual images.

In addition, in addition to a case in which only a single recording medium 30 is provided to the screen 53, multiple sheets of the recording media 30 can be provided to the screen 53 as illustrated in FIG. 26.

For example, multiple color images can be demonstrated by multiple sheets of the recording media 30 having different colors while a sheet of the recording medium 30 represents only two colors.

Furthermore, the image recording device preferably has the drive unit 55 which employs an electric system in order to conduct rolling up and releasing the screen 53 at a constant speed.

Additionally, it is possible and suitable to provide a screen holding member to hold the screen 53.

It is preferable that the screen holding member expands and contracts to the movement of the screen 53.

Figure 28:
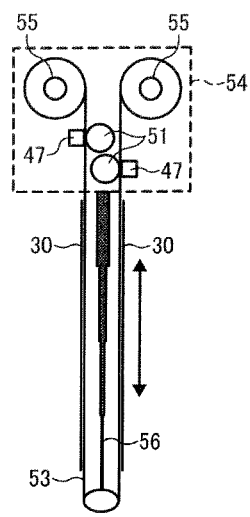
FIG. 28 is a diagram illustrating another example of an image recording set where a recording medium and an image recording device are integrated together.

FIG. 28 is a diagram illustrating an example of an image recording set having two screens, each having the recording medium 30 to write and erase images on both sides.

In this case, it is possible to record different images on the recording media 30.

A screen holding member 56 is provided expandable and contractable to hold the screen 53, which is useful to suppress curling or twisting of the screen 53.

The advantage of the roll type image recording set of the present disclosure is, for example, as follows:

The recording medium is thin, light-weight, and flexible, so that the provided screen can be accommodated in the container, thereby improving the portability of the set.

Conventional sinages or signboards are not flexible, which requires extensive installation work for a large sinage or signboard;

Since the freedom of the installation of such a set high, it is possible to set it on a ceiling or a window pane.

For example, if it is set on a window pane, in addition to light-shielding, image can be displayed thereon;

Images in the recording medium is overwritable, which obviates the need of work such as printing, replacement, or removal of a screen. In addition, it is repeatedly usable, thereby being free from the problem of waste of the screen and ink.

As a result, it is effective to reduce the cost;

Since there is no need to provide a pixel electrode or thin film transistor (TFT) substrate, the production cost is reduced, which is advantageous to size increase.

Moreover, such a set is tough, so that a long working life is expected; and such a set employs a reflection type display system and retains images very good once recording is conducted, so that visibility of the images is high and the electricity to display an image is unnecessary.

The image recording set is applicable to fields of still images for signboards, advertisement, annunciators, etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples and Comparative Examples but not limited thereto.

In addition, "%" represents "% by weight" except for the ID change ratio.

Measuring Method of Sol transfer Temperature and Gel Transfer Temperature

The sol-gel transfer temperature and gel transfer temperature of the thermoreversible gelling agents or mixtures thereof for use in Examples and Comparative Examples were measured as follows:

A thermoreversible gelling agent was added in a dispersion medium and thereafter heated for melting. The resultant was sufficiently stirred followed by cooling to obtain a gel sample. The sol transfer temperature and the gel transfer temperature of the sample were measured by a differential scanning calorimeter (DSCQ200, manufactured by TA Instruments). The measuring conditions were: heating the sample from 10° C. to 90° C. at a temperature rising speed of 2° C./minute, cooling it down from 90° C. to 10° C. at a temperature falling speed of 2° C./minute, and thereafter, heating the sample again from 10° C. to 90° C.

The endothermic peak temperature in the second temperature rising of the DSC measuring was determined as the sol transfer temperature and the exothermic peak temperature in the temperature falling was determined as the gel transfer temperature.

Preparation of Electrophoretic Particle 1

A solvent mixture of 93 parts of ethanol and 7 parts of water was placed in a reaction container equipped with a stirrer and the temperature controlling device and glacial acetic acid was added there to adjust the pH thereof to be 4.5.

16 parts of 3-(trimethoxy silyl)propyl methacrylate was added and dissolved in the solvent. Thereafter, 100 parts of titanium oxide was added and stirred for 10 minutes.

Next, 180 parts of ethanol was added thereto followed by stirring. After centrifugal to retrieve a solid portion, the solid portion was left all night and all day. The resultant was dried in vacuum at 70° C. for 4 hours to obtain a surface-treated titanium oxide.

Thereafter, 70 parts of toluene and 40 parts of the thus-obtained surface-treated titanium oxide were placed and stirred in a reaction container equipped with a stirrer, a thermometer, and a reflux cooler. A solution in which 50 parts of lauryl methacrylate and 0.3 parts of azobis isobutylonitrile were dissolved in 25 parts of toluene was put and stirred in the reaction container followed by heating and stirring at 70° C. and 7 hours in nitrogen atmosphere.

When the reaction was complete, a solid portion was separated and refined by repeating centrifugal and toluene washing. The resultant was dried in vacuum at 70° C. for 4 hours to obtain target negatively-charged white electrophoretic particles 1.

Preparation of Electrophoretic Particle 2

14 parts of methacyloxy propyl-modified silicone (Silaplane FM-0711, manufactured by INC Corporation), 1 part of dimethyl amino ethylmethacylate (manufactured by Tokyo Chemical Industry Co., Ltd.), and 0.1 parts of azobis dimethyl valeronitrile serving as polymerization initiator were dissolved in 180 parts of toluene and heated at 60° C. for 6 hours in nitrogen atmosphere.

After the reaction was complete, toluene was removed by evaporation to obtain a dispersing agent.

Thereafter, 1 part of the thus-obtained dispersing agent, 1.5 parts of carbon black, and 200 parts of silicone oil were mixed in a reaction container equipped with a stirrer, a thermometer, and a reflux cooler followed by irradiation of ultrasonic wave for one hour by a HOMOGENIZER while being cooled by ice to disperse the carbon black.

6 parts of methylmethacrylate, 3 parts of methacryloxy propyl-modified silicone (Silaplane FM-0725, molecular weight: about 10,000, manufactured by INC Corporation), 0.1 parts of N—N,dimethyl aminopropyl acrylamide, and 0.05 parts of azobis dimethyl valeronitrile serving as polymerization initiator were added to conduct reaction at 60° C. for 6 hours.

After the reaction was complete, just a solid portion was retrieved and dried to obtain target positively-charged black electrophoretic particles 2.

Example 1

Preparation of Liquid Dispersion 1

4.0 parts of the white electrophoretic particles 1, 0.2 parts of the black electrophoretic particles 2, 0.05 parts of a dispersing agent (Solsperse 17000, manufactured by the Lubrizol Corporation), and 0.05 parts of a surfactant (SPAN 85, sorbitan trioleate) were added to 5.7 parts of isoparaffin-based hydrocarbon solvent (Isopar G, manufactured by Exxon Mobil Corporation) followed by ultrasonic dispersion to prepare a liquid dispersion of electrophoretic particle. The liquid dispersion was heated to a temperature to the sol transfer temperature or higher.

Thereafter, the thermoreversible gelling agents represented by the following chemical formula I and II were mixed at a mass ratio of the agent represented by chemical formula I to the agent represented by chemical formula II of 1/10. 0.57 parts of the mixture was added to the liquid followed by heating to the sol transfer temperature or higher to melt and prepare a liquid dispersion 1.

The thermoreversible gelling agents represented by the following chemical formula I and II were synthesized with reference to JP-2005-232108-A.

The sol transfer temperature and the gel transfer temperature of the mixture of the thermoreversible gelling agents were 49° C. (endothermic peak temperature in the temperature rising) and 33° C. (exothermic peak temperature in the temperature falling), respectively, as measured by the DSC measurement described above.

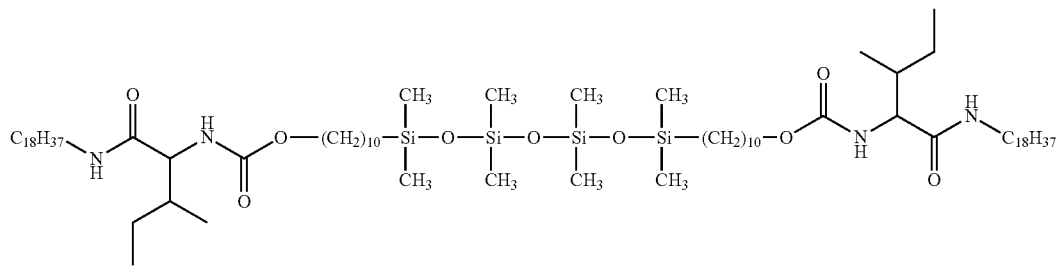

Chemical formula I

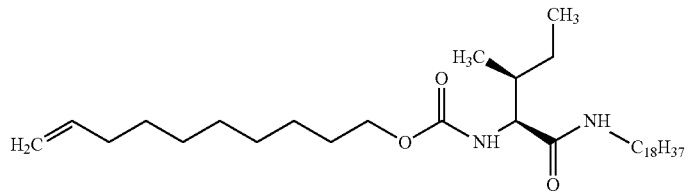

Chemical formula II

Preparation of Microcapsule Slurry 1

Gelatin was added to water, which was heated to 40° C. and stirred for 30 minutes to obtain 100 parts of 2.5% gelatin aqueous solution.

Thereafter, the solution was heated to the sol transfer temperature or higher. While being stirred, 15 parts of the liquid dispersion 1, which was preliminarily heated to the sol transfer temperature or higher, was added slowly below the liquid surface of the gelatin aqueous solution.

Next, 25 parts of 5% gum arabic aqueous solution was placed therein followed by stirring for 30 minutes.

Thereafter, 10% acetic acid aqueous solution was added dropwise to the aqueous solution until the pH of the system was 3.5 followed by stirring for 30 minutes.

Thereafter, the liquid temperature was maintained at 5° C. for 60 minutes and 1.2 parts of 25% glutal aldehyde aqueous solution was slowly added dropwise to the resultant followed by stirring for 30 minutes.

Thereafter, 10% sodium hydroxide was added dropwise to the resultant until the pH of the system was 9.0 followed by stirring for 30 minutes.

Thereafter, the liquid was heated to 40° C. and stirred for 120 minutes followed by being cooled down to room temperature and stirred all night and all day.

The finally-obtained capsule slurry was repeatedly washed with water until the pH of the washing water was 5.0 followed by classification using a screen to obtain microcapsule slurry 1.

Manufacturing of Recording Medium 1

The microcapsule slurry 1 was mixed with a urethane resin for heat-seal. The mixture was applied by a blade to the ITO (indium•tin oxide) film formed on a polyester substrate having a thickness of 50 μm to form an image recording layer. The image recording layer was naturally dried and further dried at 70° C. for 30 minutes.

Thereafter, a thermocurable liquid resin having insulating property was thinly applied by a blade just to cover the microcapsule layer followed by drying at 80° C. for 30 minutes for curing.

Moreover, a silver paste (Dotite, manufactured by FUJIKURAKASEI CO., LTD.) was applied thereto by a blade followed by drying.

Furthermore, a metal foil tape was attached to the end at which the ITO surface was bare because neither image recording layer nor the thermocurable resin was applied.

Thereafter, it was folded in half to form a portion electrically connected to the surface of the polyester substrate, which served as electrode.

Thereafter, the end was insulated to manufacture a recording medium 1.

Example 2

Manufacturing of Recording Medium 2

The recording medium 2 was manufactured in the same manner as in Example 1 except that the mixing mass ratio (the agent represented by chemical formula I to the agent represented by chemical formula II) of the thermoreversible gelling agents represented by the chemical formula I and II was changed to 1/40.

The sol transfer temperature and the gel transfer temperature of the mixture of the thermoreversible gelling agents were 47° C. (endothermic peak temperature in the temperature rising) and 31° C. (exothermic peak temperature in the temperature falling), respectively, as measured by the DSC measurement described above.

Example 3

Manufacturing of Recording Medium 3

The recording medium 3 was manufactured in the same manner as in Example 1 except that the mixing mass ratio (the agent represented by chemical formula I to the agent represented by chemical formula II) of the thermoreversible gelling agents represented by the chemical formula I and II was changed to 1/60.

The sol transfer temperature and the gel transfer temperature of the mixture of the thermoreversible gelling agents were 47° C. (endothermic peak temperature in the temperature rising) and 29° C. (exothermic peak temperature in the temperature falling), respectively, as measured by the DSC measurement described above.

Comparative Example 1

Manufacturing of Recording Medium 4

The recording medium 4 was manufactured in the same manner as in Example 1 except that no thermoreversible gelling agent was added.

Comparative Example 2

Manufacturing of Recording Medium 5

The recording medium 5 was manufactured in the same manner as in Example 1 except that no thermoreversible gelling agent represented by chemical formula I but the thermoreversible gelling agent represented by chemical formula II was added.

The sol transfer temperature and the gel transfer temperature of the mixture of the thermoreversible gelling agents were 47° C. (endothermic peak temperature in the temperature rising) and 28° C. (exothermic peak temperature in the temperature falling), respectively, as measured by the DSC measurement described above.

Example 4

Manufacturing of Recording Medium 6

The recording medium 6 was manufactured in the same manner as in Example 1 except that the dispersion medium was changed to silicone oil (KF96-10cs, manufactured by Shin-Etsu Chemical Co., Ltd.), no dispersion medium was added, the mixing ratio (the agent represented by chemical formula I to the agent represented by chemical formula II) of the thermoreversible gelling agents represented by the chemical formula I and II was changed to 1/5.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 76° C. and 65° C., respectively, as measured by the DSC measurement described above.

Example 5

Manufacturing of Recording Medium 7

The recording medium 7 was manufactured in the same manner as in Example 4 except that the mixing mass ratio (the agent represented by chemical formula I to the agent represented by chemical formula II) of the thermoreversible gelling agents represented by the chemical formula I and II was changed to 1/1.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 72° C. and 61° C., respectively, as measured by the DSC measurement described above.

Example 6

Manufacturing of Recording Medium 8

The recording medium 8 was manufactured in the same manner as in Example 4 except that the thermoreversible gelling agent represented by chemical formula I was changed to thermoreversible gelling agent represented by chemical formula III and the mixing mass ratio (the agent represented by chemical formula III to the agent represented by chemical formula II) of the thermoreversible gelling agents represented by the chemical formula II and III was changed to 1/1.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 70 and 59° C., respectively, as measured by the DSC measurement described above.

Chemical formula III

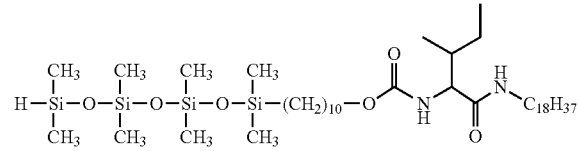

Example 7

Manufacturing of Recording Medium 9

The recording medium 9 was manufactured in the same manner as in Example 4 except that the thermoreversible gelling agent represented by chemical formula II was changed to thermoreversible gelling agent represented by chemical formula IV and the mixing mass ratio (the agent represented by chemical formula I to the agent represented by chemical formula IV) of the thermoreversible gelling agents represented by the chemical formula I and VI was changed to 1/1.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 69° C. and 60° C., respectively, as measured by the DSC measurement as described above.

Chemical formula IV

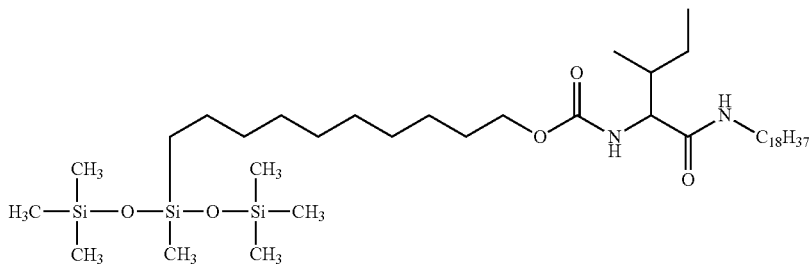

Example 8

Manufacturing of Recording Medium 10

The recording medium 10 was manufactured in the same manner as in Example 7 except that the thermoreversible gelling agent represented by chemical formula IV was changed to thermoreversible gelling agent represented by chemical formula V and the mixing mass ratio (the agent represented by chemical formula I to the agent represented by chemical formula V) of the thermoreversible gelling agents represented by the chemical formula I and V was changed to 1/5.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 68° C. and 45° C., respectively, as measured by the DSC measurement described above.

Chemical formula V

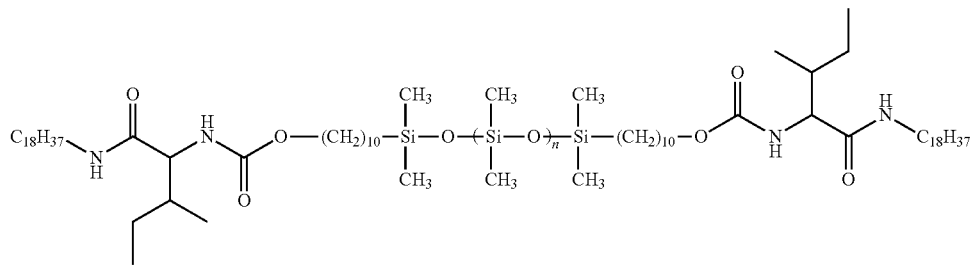

n=ca.80

Example 9

Manufacturing of Recording Medium 11

The recording medium 11 was manufactured in the same manner as in Example 7 except that the thermoreversible gelling agent represented by chemical formula IV was changed to thermoreversible gelling agent represented by chemical formula VI and the mixing mass ratio (the agent represented by chemical formula I to the agent represented by chemical formula VI) of the thermoreversible gelling agents represented by the chemical formula I and VI was changed to 5/1.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 81° C. and 61° C., respectively, as measured by the DSC measurement described above.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 76° C. and 62° C., respectively, as measured by the DSC measurement as described above.

Chemical formula VI

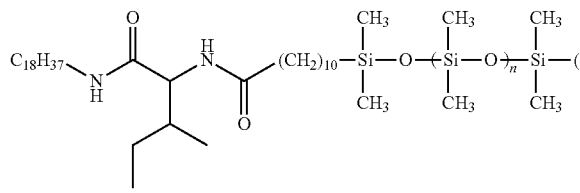

n = ca. 12-13

Example 10

Manufacturing of Recording Medium 12

The recording medium 12 was manufactured in the same manner as in Example 7 except that the thermoreversible gelling agent represented by chemical formula IV was changed to thermoreversible gelling agent represented by chemical formula VII and the mixing mass ratio (the agent represented by chemical formula I to the agent represented by chemical formula VII) of the thermoreversible gelling agents represented by the chemical formula I and VII was changed to 10/1.

The endothermic peak temperature (sol transfer temperature) in the temperature rising and the exothermic peak temperature (gel transfer temperature) in the temperature falling of the gel sample of the mixture of theremoreversible gelling agents and the dispersion medium were 74° C. and 58° C., respectively, as measured by the DSC measurement described above.

Comparative Example 3

Manufacturing of Recording Medium 14

The recording medium 14 was manufactured in the same manner as in Example 4 except that no thermoreversible gelling agent was added.

Comparative Example 4

Manufacturing of Recording Medium 15

The recording medium 15 was manufactured in the same manner as in Example 4 except that no thermoreversible gelling agent represented by chemical formula I but the thermoreversible gelling agent represented by chemical formula II was added.

Chemical formula VII

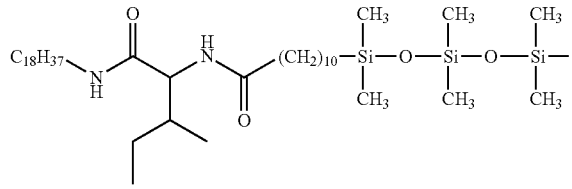

Example 11

Manufacturing of Recording Medium 13

The recording medium 13 was manufactured in the same manner as in Example 4 except that the thermoreversible gelling agent represented by chemical formula V was added and the mixing mass ratio (the agent represented by chemical formula I to the agent represented by chemical formula II to the thermoreversible gelling agent represented by chemical formula V) of the thermoreversible gelling agents represented by the chemical formula I, II, and V was set to 1/5/1.

The sol transfer temperature and the gel transfer temperature of the mixture of the thermoreversible gelling agents were 80° C. (endothermic peak temperature in the temperature rising) and 68° C. (exothermic peak temperature in the temperature falling), respectively, as measured by the DSC measurement described above.

Comparative Example 5

Manufacturing of Recording Medium 16

The recording medium 16 was manufactured in the same manner as in Example 8 except that no thermoreversible gelling agent represented by chemical formula I but the thermoreversible gelling agent represented by chemical formula V was added.

The sol transfer temperature and the gel transfer temperature of the mixture of the thermoreversible gelling agents were 66° C. (endothermic peak temperature in the temperature rising) and 41° C. (exothermic peak temperature in the temperature falling), respectively, as measured by the DSC measurement described above.

Comparative Example 6

Manufacturing of Recording Medium 17

The recording medium 17 was manufactured in the same manner as in Example 10 except that no thermoreversible gelling agent represented by chemical formula I but the thermoreversible gelling agent represented by chemical formula VII was added.

The sol transfer temperature (endothermic peak temperature in the temperature rising) and the gel transfer temperature (exothermic peak temperature in the temperature falling) of the mixture of the thermoreversible gelling agents were not observed, as measured by the DSC measurement as described above.

Observation of Gel Sample

The gel samples of the thermoreversible gelling agents and the dispersion media of Examples 1 to 11 and Comparative Example 1 to 6 were heated to the sol transfer temperature or higher or cooled down to the sol transfer temperature or lower, which was repeated to observe the gel.

The results are shown in Table 1.

Method of Evaluating Image

Printing was conducted on the thus-obtained recording media 1 to 17 using the image forming device illustrated in FIGS. 20 and 21 and the thus-obtained images were evaluated.

The image forming devices were designed such that the recording medium was transferred in a straight line. On the side to view the recording medium were arranged the heating device using a thermal head and the electric field application device having a roller-like form to generate an electric field in the image recording layer while electrically connected to the electrode of the recording medium.

The Thermal head was able to be set at an arbitrary temperature.

On the reverse side of the recording medium, i.e., the side not to view the recording medium, an electroconductive platen roller was provide that was able to apply an electric field.

Furthermore, a fan was provided as a cooler to the portion from which the recording medium was discharged.

For example, it is possible to generate an electric field of +50 V in the image recording layer of a recording medium when 50 V is applied to an electric field application device arranged on the side of the recording medium to be viewed and an electric field application device (electroconductive platen roller) arranged on the reverse side is grounded.

On the other hand, it is possible to generate an electric field of −50 V in the image recording layer of a recording medium when an electric field application device arranged on the side of the recording medium to be viewed is grounded and 50 V is applied to an electric field application device arranged on the reverse side.

Image Evaluation

When a recording medium was set in the image recording device described above and a solid black pattern was output on the entire of the recording medium while +50 V was applied to the image recording layer by an electric field application device while the temperature of the thermal head was set to the sol transfer temperature or higher, the entire surface of the recording medium was reversed to white.

The recording medium was observed by an optical microscope and evaluated about uneven image density.

Thereafter, when a recording medium was set in the image recording device again and a solid black pattern was output on the entire of the recording medium while −50 V was applied to the image recording layer while the temperature of the thermal head was set to the sol transfer temperature or higher, the entire surface of the recording medium was reversed to black.

The recording medium was observed by an optical microscope and evaluated about uneven image density.

Thereafter, in the same manner as described above, the image was reversed to white again. A metal was brought into contact with the recording medium two minutes after the output to evaluate the image retentiveness of the recording medium.

Finally, the image was turned black and left undone for two months. The change of the image density over time was evaluated.

The results are shown in Table 1.

The evaluation criteria are as follows:

TABLE 1

| | Medium No. | Gelling agent | Dispersion medium | Gel sample observation results | Uneven image density evaluation results | Image retentiveness | Density change over time |
|---|---|---|---|---|---|---|---|
| Example 1 | 1 | Chem I/ Chem II | Isopar G | A | A | A | A |
| Example 2 | 2 | Chem I/ Chem II | Isopar G | A | A | A | A |
| Example 3 | 3 | Chem I/ Chem II | Isopar G | B | B | A | A |
| Comparative Example 1 | 4 | —/— | Isopar G | — | B | D | D |
| Comparative Example 2 | 5 | Chem II | Isopar G | C | C | B | B |
| Example 4 | 6 | Chem I/ Chem II | Silicone oil | A | A | A | A |
| Example 5 | 7 | Chem I/ Chem II | Silicone oil | A | A | A | A |

TABLE 1-continued

| | Medium No. | Gelling agent | Dispersion medium | Gel sample observation results | Uneven image density evaluation results | Image retentiveness | Density change over time |
|---|---|---|---|---|---|---|---|
| Example 6 | 8 | Chem II/Chem III | Silicone oil | A | A | A | A |
| Example 7 | 9 | Chem II/Chem IV | Silicone oil | A | A | A | A |
| Example 8 | 10 | Chem I/Chem V | Silicone oil | A | A | B | A |
| Example 9 | 11 | Chem I/Chem VI | Silicone oil | A | A | A | A |
| Example 10 | 12 | Chem I/Chem VII | Silicone oil | A | A | B | A |
| Example 11 | 13 | Chem I/Chem II/Chem V | Silicone oil | A | A | A | A |
| Comparative Example 3 | 14 | —/— | Silicone oil | — | B | D | D |
| Comparative Example 4 | 15 | Chem II | Silicone oil | C | C | B | B |
| Comparative Example 5 | 16 | Chem V | Silicone oil | C | C | C | B |
| Comparative Example 6 | 17 | Chem VII | Silicone oil | D | C | D | D |

TABLE 2

| | Gel sample observation results | Uneven image density evaluation results | Image retentiveness | Density change over time |
|---|---|---|---|---|
| A | Quick for solation and gelation. No precipitate appears | No uneven image density recognized visually | No image disturbed at all with excellent image retentiveness | No image density change measured |
| B | No problem at response for solation and gelation. Cloudy but no precipitate appears | Slight uneven image density recognized visually, causing no practical problem | Slight change of image measured but with no visual confirmation | Slight image density change measured but with no visual confirmation |
| C | Slow for solation and gelation. Precipitate appears slightly | Uneven image density recognized visually, requiring improvement | Change of image visually confirmed | Significant image density change measured and visually confirmed |
| D | Extremely slow for solation and gelation. No solation/gelation occurred | Significant uneven image density recognized, causing visual problems | Significant change of image confirmed with no image retained | Extremely significant image density change measured with no image |

Example 12

Manufacturing of Recording Medium 18

In Example 1, the microcapsule slurry 1 was mixed with a urethane resin for heat-seal to form an image recording layer on a polyester substrate having a thickness of 50 μm by blade application. The image recording layer was naturally dried and further dried at 70° C. for 30 minutes.

Thereafter, a thermocurable liquid resin having insulating properties was thinly applied onto an image recording layer just to cover the image recording layer followed by curing at 80° C. for 30 minutes to manufacture a recording medium 18.

Example 13

Manufacturing of Recording Medium 19

In Example 1, the microcapsule slurry 1 was mixed with a urethane resin for heat-seal. The mixture was applied by a blade to the ITO (indium.tin oxide) film formed on a polyester substrate having a thickness of 50 μm to form an image recording layer. The image recording layer was naturally dried and further dried at 70° C. for 30 minutes.

Thereafter, a thermocurable liquid resin having insulating properties was thinly applied by a blade just to cover the microcapsule layer followed by drying at 80° C. for 30 minutes for curing.

Furthermore, a metal foil tape was attached to the end at which the ITO surface was bare with neither image recording layer nor the thermocurable resin applied. Thereafter, it was folded in half to form a portion electrically connected to the back surface of the polyester substrate, which served as electrode.

Thereafter, the end was insulated to manufacture a recording medium 19.

Example 14

Forming of Image Recording Layer Using Cell

A curable epoxy resin was applied to a polyamide film having a thickness of 20 µm. After a semi-cured state was obtained, the epoxy resin was subject to embossing treatment to form a cell aggregation having a honeycomb-like form in which hexagonal concave portions having a diagonal of about 150 µm at maximum were arranged in matrix.

The cell aggregation was exposed to ultraviolet ray to cure the epoxy resin to form a cell aggregation having a thickness of about 50 µm on the substrate.

Manufacturing of Recording Medium 20

A spacer having a thickness of 50 µm with thermocurable attachment surfaces on both sides was attached around the cell aggregation like a frame.

This was set on a hot plate and heated to the sol transfer temperature thereof or higher of the liquid dispersion 1. The liquid dispersion 1 preliminarily heated was infused into the cell followed by quick squeezing to fill the cell with. A polyamide film substrate having a thickness of 20 µm to which a sealant was applied was attached by a roller to prevent air bubbles from entering into the cell for heat sealing.

Thereafter, a UV curable sealant was infused between the two substrates followed by extension by a roller. Thereafter, a recording medium 20 was manufactured by curing by UV ray irradiation and sealing.

Comparative Example 7

Manufacturing of Recording Medium 21

The recording medium 21 was manufactured in the same manner as in Example 12 except that no thermoreversible gelling agent represented by chemical formula I but the thermoreversible gelling agent represented by chemical formula II was added.

Image Evaluation

The recording media 18 to 21 of Examples 12 to 14 and Comparative Example 7 were reversed by the following method to evaluate the thus-obtained images.

The image forming device used had a structure in which a corona charger serving as charger conducted charging while moving over an image recording medium set on a grounded metal plate in a non-contact manner.

As the melting device, a hot plate was provided to the reverse side of the metal plate to heat the entire metal plate.

After the recording medium was set on the metal plate and heated to the sol transfer temperature or higher by using the hot plate followed by positively charging the entire of the recording medium by the corona charger, the entire surface was turned white.

The recording medium was thereafter cooled down to the gel transfer temperature or lower, it was observed by an optical microscope and evaluated about the unevenness of image density.

Thereafter the recording medium was heated again to the sol transfer temperature or higher by using the hot plate followed by negatively charging the entire of the recording medium by the corona charger, the entire surface was tamed black.

The recording medium was thereafter cooled down to the gel transfer temperature or lower, it was evaluated by an optical microscope and evaluated about the unevenness of image density.

Thereafter, in the same manner as described above, the image was reversed to white again. A metal was brought into contact with the recording medium two minutes after the output of the image to evaluate the image retentiveness of the recording medium.

Finally, the image was turned black and left undone for two months. The change of the image density over time was evaluated.

The results are shown in Table 3.

The evaluation criteria are as shown in Table 2.

TABLE 3

|  | Medium No. | Gelling agent | Dispersion medium | Gel sample observation results | Uneven image density evaluation results | Image retentiveness | Density change over time |
| --- | --- | --- | --- | --- | --- | --- | --- |
| Example 12 | 18 | Chem I/ Chem II | Isopar G | A | B | A | A |
| Example 13 | 19 | Chem I/ Chem II | Isopar G | A | A | A | A |
| Example 14 | 20 | Chem I/ Chem II | Isopar G | A | B | A | A |
| Comparative Example 7 | 21 | Chem II | Isopar G | C | C | B | B |

Example 15

Preparation of Liquid Dispersion 2

0.2 parts of black ferrite particles having a surface treated with silicone oil and 0.05 parts of a surfactant (Span 20, sorbitan monolaurate) were added to 1.75 parts of silicone oil (KF-96, 10cs, manufactured by Shin-Etsu Corporation) followed by ultrasonic treatment to prepare a liquid dispersion 2-1.

To 4.0 parts of the silicone oil was added 4.0 parts of non-migration type polyvinyl naphthalene particle as white particles followed by stirring and ultrasonic dispersion to prepare a liquid dispersion 2-2.

These liquid dispersions were mixed. Thereafter, 0.05 parts of yellow dye (OIL YELLOW GG-S, manufactured by Orient Chemical Industries Co., Ltd.) serving as colorant was added. Subsequent to ultrasonic dispersion, the liquid dispersion was heated to the sol-transfer temperature or higher. The thermoreversible gelling agents represented by the chemical formula I and VII were mixed in a mass ratio (chemical formula I to chemical formula VII) of 5/1. 0.57 parts of this mixture was added to the liquid dispersion followed by heating to the sol transfer temperature or higher for fusion to prepare a liquid dispersion 2.

Preparation of Microcapsule Slurry 2

Microcapsule slurry 2 was prepared in the same manner as in Example 1 by using the liquid dispersion 2.

Manufacturing of Recording Medium 22
Recording medium 22 was manufactured in the same manner as in Example 1 by using the microcapsule slurry 2.

Comparative Example 8

Manufacturing of Recording Medium 23
The recording medium 23 was manufactured in the same manner as in Example 15 except that no thermoreversible gelling agent represented by chemical formula I but the thermoreversible gelling agent represented by chemical formula VII was added.

to record an image was heated by a heating device to a temperature higher than the sol transfer temperature of a dispersion medium at the same time, the printing area was turned black.

By contrast, if a magnetic field was applied to attract black particles by the magnetic field application device and the area to record an image was heated by a heating device to a temperature higher than the sol transfer temperature of a dispersion medium at the sante time, the printing area was turned yellow.

Furthermore, a fan was provided as a cooler to the portion from which the recording medium was discharged.

When the recording medium was set in the image recording device, a magnetic field to attract black particles was applied by the magnetic field application device, and the area to record an image was heated by a heating device to a temperature higher than the sol transfer temperature of a dispersion medium at the same time, the printing area was turned yellow.

After cooling down, the recording medium was observed by an optical microscope and evaluated about the uneven image density thereof.

Thereafter, using the image recording device, a magnetic field having a polarity to repel black particles was applied by the magnetic field application device and the area to record an image was heated by a heating device to a temperature higher than the sol transfer temperature of a dispersion medium at the same time, the printing area was turned black.

After cooling, the recording medium was observed by an optical microscope and evaluated about the uneven image density thereof.

Thereafter, the image was reversed to white again. A metal was brought into contact with the recording medium three minutes after the output to evaluate the image retentiveness of the recording medium.

Finally, the image was turned black and left undone for two months. The change of the image density over time was evaluated.

The results are shown in Table 4.

The evaluation criteria are those shown in Table 2.

TABLE 4

| | Medium No. | Gelling agent | Dispersion medium | Gel sample observation results | Uneven image density evaluation results | Image retentiveness | Density change over time |
|---|---|---|---|---|---|---|---|
| Example 15 | 22 | Chem I/ Chem VII | Isopar G | A | A | A | A |
| Comparative Example 8 | 23 | Chem VII | Isopar G | D | C | D | D |

Image Evaluation
The recording media 22 and 23 were reversed using the following image recording device to evaluate the thus-obtained images.

The image recording device was designed to convey a recording medium in a straight line. Also, a thermal head serving as heating device was arranged on the side of the recording medium to be viewed and an electric magnet serving as a magnetic field application device (magnetic head) was arranged on the reverse side.

For example, if a magnetic field was applied to repel black particles by the magnetic field application device and the area

Example 16

A recording medium was manufactured in the same manner as in Example 4 to obtain a roll screen type image recording set illustrated in FIG. 26.

A flexible sheet was used as the screen and a hole was made on the flexible sheet at a portion where the flexible sheet was attached to the recording medium to form art electrically connected portion. Thereafter, the recording medium was attached to the flexible sheet.

To the rear side of the flexible sheet was attached an elecroconductive tape. The electroconductive substrate formed on the rear side of the recording medium was electrically connected to the electroconductive tape attached to the rear side of the flexible sheet through this electrically connected portion.

A long pipe was fixed on the upper end of the thus-obtained flexible sheet. Gears were attached to both ends of the long pipe in order to roll up and release the flexible sheet at a constant speed by an electric motor.

In addition, a long pipe was attached to the lower end of the flexible sheet to prevent the flexible sheet from twisting.

A heating device and an electric field application device were provided around the roll-up portion of the flexible sheet.

A line thermal head serving as heating device and an electroconductive brush serving as an electric field application device were provided to the side of the flexible sheet on which the recording medium was provided to bring the electroconductive brush into contact with the electrode formed on the surface of the recording medium.

On the rear side of the flexible sheet, an electroconductive platen roller serving as electric field application device was arranged at the position facing the thermal head. The electroconductive platen roller was brought into contact with the electroconductive tape.

The electroconductive brush and the electroconductive platen roller were set in order to be arbitrarily electrically connected to a power source or grounded to make it possible to apply a desired bias thereto.

In addition, the speed of rolling up and releasing the flexible sheet was adjusted by meeting the speed of the electroconductive platen roller and that of the electric motor.

The thus-manufactured flexible screen type image recording set was used to conduct a printing test.

The entire surface of the image recording area of the recording medium was heated by the heating device to a temperature higher than the sol temperature of the dispersion medium to liquidize the dispersion medium while the flexible sheet was being rolled up. At the same time, a bias of +70 V was applied to the image recording layer of the recording medium by the electric field application device.

Thereafter, once the flexible sheet was released, the entire surface of the recording medium was reversed to white, meaning that the image was erased.

Next, while rolling up the flexible sheet again, a lattice pattern was output by the heating device. Thereafter, the heated area was heated to temperatures higher than the sol transfer temperature of the dispersion medium to liquidize the dispersion medium. At the same time, a bias of −60 V was applied to the image recording layer of the recording medium by the electric field application device.

There was no change to the non-heated area of the recording medium. Only the heated area was reversed black. Accordingly, black lattice patterns were printed on the white background.

Again, as in the same manner as described above, when the entire surface of the image recording area of the recording medium was heated and at the same time a bias of +60 V was applied to the image recording layer of the recording medium, the entire surface was turned white to find that the lattice pattern was erased.

When some of thermoreversible gelling agents were used singly, they create problems such that a precipitate appears at gelation, white mottles appears when turned black, crystallization occurs, thereby making it impossible to demonstrate sol-gen transfer any more, temperature responsiveness of sol-gel transfer becomes extremely low, or no gelation occurs at room temperature, which prevents demonstration of the features of the recording medium of the present disclosure.

However, by mixing two or more kinds of thermoreversible gelling agents, the compatibility thereof with a dispersion medium is improved, thereby subduing precipitation and crystallization, improving the temperature responsiveness of sol-gel transfer, or making it possible to demonstrate gelation in the case in which no gelation occurs at room temperature, so that the recording medium can demonstrate its features.

In addition, when a thermoreversible gelling agent is used singly, the sol transfer temperature or a gel transfer temperature thereof is not a desired temperature in some cases. However, by mixing two or more kinds of thermoreversible gelling agents, these temperatures can be controlled so that an optimal sol transfer temperature or gel transfer temperature can be attained depending on the use environment of a recording medium.

Furthermore, when using a thermoreversible gelling agent singly, the gel obtained is not stable so that a sufficient image retensiveness is not obtained in some cases. However, by mixing two or more kinds of thermoreversible gelling agents, image retentiveness is enhanced.

As described above, the image quality, image retentivenss, and the temperature responsivenss of a recording medium are improved by mixing two or more kinds of thermoreversible gelling agents appropriately, which is extremely useful.

Having now fully described embodiments of the present invention, it will be apparent to one of ordinary skill in the art that many changes and modifications can be made thereto without departing from the spirit and scope of embodiments of the invention as set forth herein.

What is claimed is:

1. A recording medium comprising:
    a first substrate;
    a second substrate; and
    an image recording layer with insulating properties, provided between the first substrate and the second substrate, the image recording layer comprising cells each encapsulating at least one of electrophoretic particles or magnetophoretic particles, a dispersion medium, and at least two kinds of thermoreversible gelling agents,
    wherein each of the thermoreversible gelling agents comprises at least one of amide bonds and urethane bonds in molecules of the thermoreversible gelling agents.

2. The recording medium according to claim 1, wherein at least one of the thermoreversible gelling agents comprises a chemical structure compatible with the dispersion medium.

3. The recording medium according to claim 1, wherein at least one of the thermoreversible gelling agents comprises at least one of an alkyl group having 8 to 20 carbon atoms, an alkylene group having 8 to 20 carbon atoms, or a siloxane bond.

4. The recording medium according to claim 1, wherein the dispersion medium is a liquid comprising at least one of an alkyl group or a siloxane bond.

5. The recording medium according to claim 1, wherein the first substrate or the second substrate is electroconductive.

6. The recording medium according to claim 1,
    further comprising an electroconductive layer provided between the first substrate and the image recording layer or the second substrate and the image recording layer and an electrode arranged at an exterior of the recording medium,
    wherein the electroconductive layer and the electrode are electrically connected.

7. The recording medium according to claim 1,
    further comprising a first electroconductive layer between the first substrate and the image recording layer and a first electrode at an exterior of the recording medium, wherein the second substrate is electroconductive,
wherein the first electroconductive layer and the first electrode are electrically connected.

8. The recording medium according to claim 1,
further comprising a first electroconductive layer between the first substrate and the image recording layer; a second electroconductive layer between the second substrate and the image recording layer, and a first electrode and a second electrode both arranged at exteriors of the recording medium,
wherein the first electroconductive layer and the first electrode are electrically connected,
wherein the second electroconductive layer and the second electrode are electrically connected.

9. The recording medium according to claim 1, wherein the at least two kinds of thermoreversible gelling agents are selected from the group consisting of thermoreversible gelling agents having the following chemical formulae:

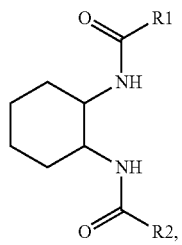

wherein R1 and R2 each independently represent $C_8$-$C_{20}$ alkyl groups;

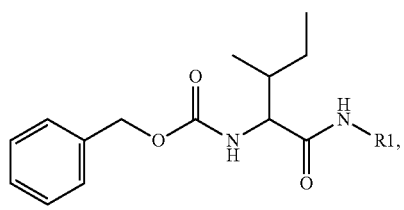

wherein R1 represents a $C_8$-$C_{20}$ alkyl group;

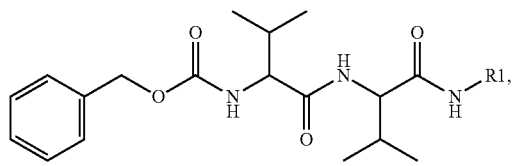

wherein R1 represents a $C_8$-$C_{20}$ alkyl group;

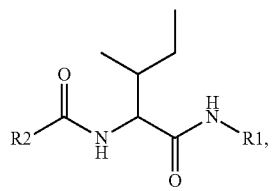

wherein R1 and R2 each independently represent $C_8$-$C_{20}$ alkyl groups;

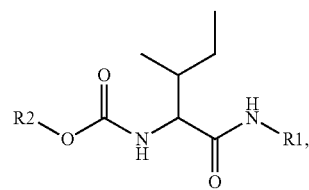

wherein R1 and R2 each independently represent $C_8$-$C_{20}$ alkyl groups;

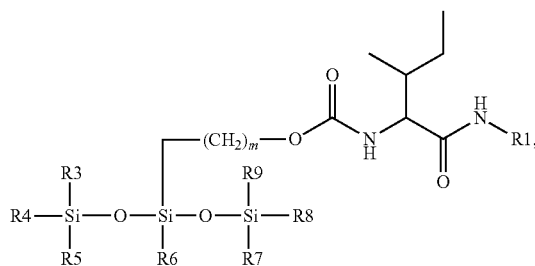

wherein R1 represents a $C_8$-$C_{20}$ alkyl group, R3 to R9 each independently represent a hydrogen atom, a $C_1$-$C_{12}$ alkyl group, a $C_1$-$C_{12}$ alkoxy group, or an aryl group with or without substitution groups, and m represents an integer of from 1 to 20;

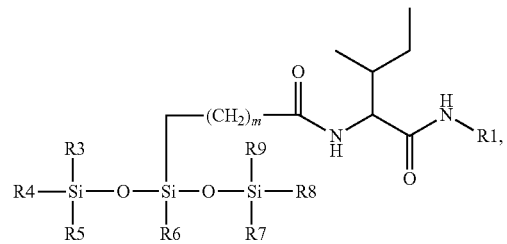

wherein R1 represents a $C_8$-$C_{20}$ alkyl group, R3 to R9 each independently represent a hydrogen atom, a $C_1$-$C_{12}$ alkyl group, a $C_1$-$C_{12}$ alkoxy group, or an aryl group with or without substitution groups, and m represents an integer of from 1 to 20;

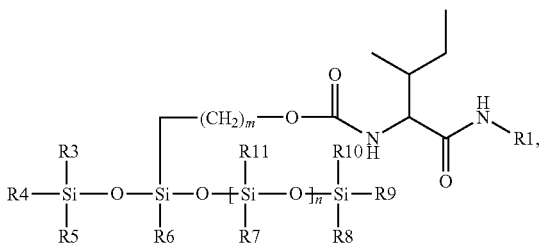

wherein R1 represents a $C_8$-$C_{20}$ alkyl group, R3 to R11 each independently represent a hydrogen atom, a $C_1$-$C_{12}$ alkyl group, a $C_1$-$C_{12}$ alkoxy group, or an aryl group with or without substitution groups, m represents an integer of from 1 to 20, and n represents an integer of from 1 to 80;

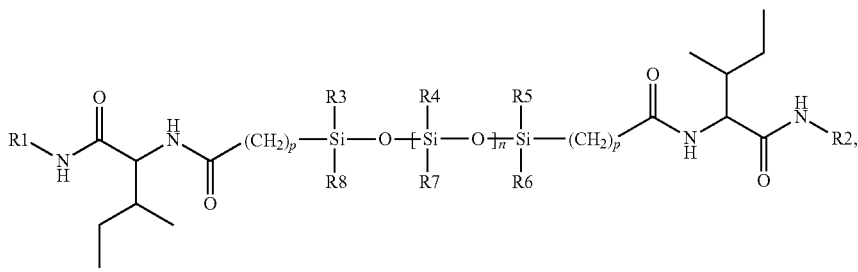

wherein R1 and R2 each independently represent $C_8$-$C_{20}$ alkyl groups, R3 to R8 each independently represent a hydrogen atom, a $C_1$-$C_{12}$ alkyl group, a $C_1$-$C_{12}$ alkoxy group, or an aryl group with or without substitution groups, n represents 0 or an integer of from 1 to 80, and p represents an integer of from 1 to 20; and

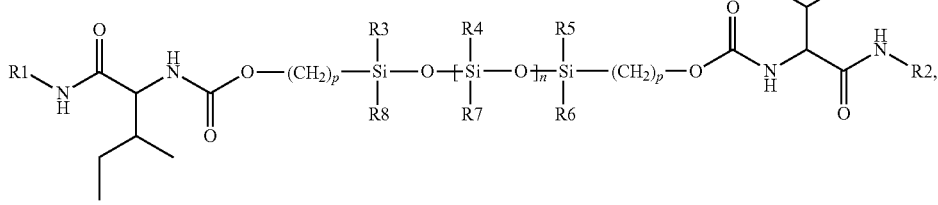

wherein R1 and R2 each independently represent $C_8$-$C_{20}$ alkyl groups, R3 to R8 each independently represent a hydrogen atom, a $C_1$-$C_{12}$ alkyl group, a $C_1$-$C_{12}$ alkoxy group, or an aryl group with or without substitution groups, n represents 0 or an integer of from 1 to 80, and p represents an integer of from 1 to 20.

10. An image recording set comprising:
a recording medium comprising:
  a first substrate;
  a second substrate; and
  an image recording layer with insulating properties provided between the first substrate and the second substrate, the image recording layer comprising cells each encapsulating at least one of electrophoretic particles or magnetophoretic particles, a dispersion medium, and at least two kinds of thermoreversible gelling agents,
  wherein each of the thermoreversible gelling agents comprises at least one of amide bonds and urethane bonds in molecules of the thermoreversible gelling agents; and
an image recording device comprising:
  a heating device to heat the image recording layer; and
  at least one of an electric field application device or a magnetic field application device to apply at least one of an electric field or a magnetic field to the image recording layer.

11. The image recording set according to claim 10, wherein the heating device is a thermal head.

12. The image recording set according to claim 10, wherein the first substrate or the second substrate is an electroconductive substrate,
wherein the electric field application device is electrically connected to the electroconductive substrate to generate an electric field in the image recording layer.

13. The image recording set according to claim 10,
wherein the recording medium further comprises an electroconductive layer provided between the first substrate and the image recording layer or the second substrate and the image recording layer and an electrode at an exterior of the recording medium,
wherein the electroconductive layer and the electrode are electrically connected,
wherein the electric field application device is electrically connected to the electrode to generate an electric field in the image recording layer.

14. The image recording set according to claim 10,
wherein the recording medium further comprises a first electroconductive layer between the first substrate and the image recording layer and a first electrode at an exterior of the recording medium,
wherein the second substrate is electroconductive,
wherein the first electroconductive layer and the first electrode are electrically connected,
wherein the electric field application device is electrically connected to at least one of the first electrode or the second substrate to generate an electric field in the image recording layer.

15. The image recording set according to claim 10,
wherein the recording medium further comprises a first electroconductive layer between the first substrate and the image recording layer, a second electroconductive layer between the second substrate and the image recording layer, and a first electrode and a second electrode both arranged at exteriors of the recording medium,
wherein the first electroconductive layer and the first electrode are electrically connected,
wherein the second electroconductive layer and the second electrode are electrically connected,
wherein the electric field application device is electrically connected to at least one of the first electrode or the second electrode to generate an electric field in the image recording layer.

16. The image recording set according to claim 10, wherein the image recording device further comprises an image erasing device to erase an image recorded in the recording medium by applying heat and at least one of an electric field or a magnetic field to the recording medium.

17. The image recording set according to claim 10, further comprising a screen having a sheet-like form and a drive unit to roll up and release the screen, wherein the recording medium is provided to the screen.

18. The image recording set according to claim 10, wherein the at least two kinds of thermoreversible gelling agents are selected from the group consisting of thermoreversible gelling agents having the following chemical formulae:

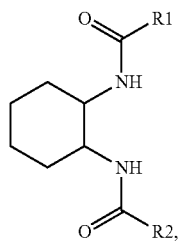

wherein R1 and R2 each independently represent $C_8$-$C_{25}$ alkyl groups;

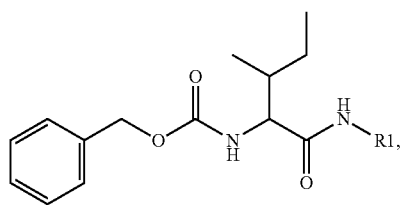

wherein R1 represents a $C_8$-$C_{20}$ alkyl group;

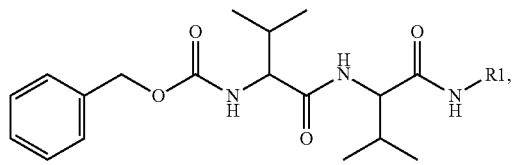

wherein R1 represents a $C_8$-$C_{20}$ alkyl group;

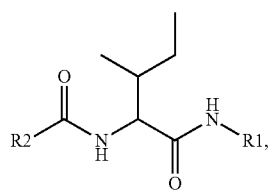

wherein 121 and R2 each independently represent $C_8$-$C_{20}$ alkyl groups;

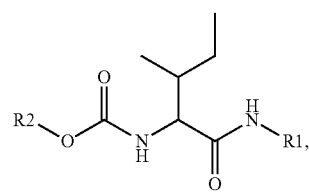

wherein R1 and R2 each independently represent $C_8$-$C_{25}$ alkyl groups;

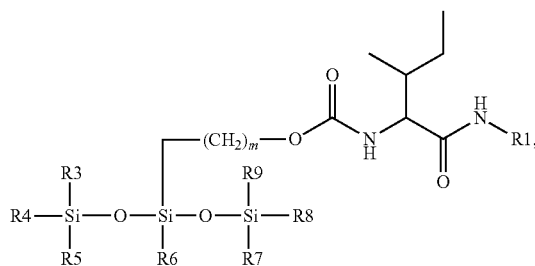

wherein R1 represents a $C_8$-$C_{25}$ alkyl group, R3 to R9 each independently represent a hydrogen atom, a $C_1$-$C_{12}$ alkyl group, a $C_1$-$C_{12}$ alkoxy group, or an aryl group with or without substitution groups, and m represents an integer of from 1 to 20;

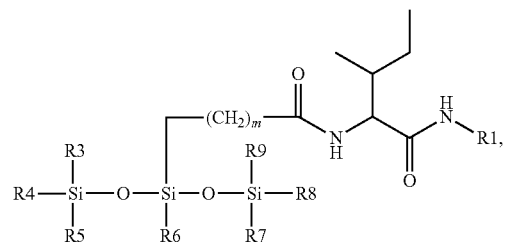

wherein R1 represents a $C_8$-$C_{20}$ alkyl group, R3 to R9 each independently represent a hydrogen atom, a $C_1$-$C_{12}$ alkyl group, a $C_1$-$C_{12}$ alkoxy group, or an aryl group with or without substitution groups, and m represents an integer of from 1 to 20;

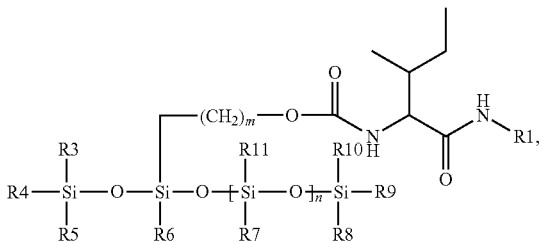

wherein R1 represents a $C_8$-$C_{20}$ alkyl group, R3 to R11 each independently represent a hydrogen atom, a $C_1$-$C_{12}$ alkyl group, a $C_1$-$C_{12}$ alkoxy group, or an aryl group with or without substitution groups, m represents an integer of from 1 to 20, and n represents an integer of from 1 to 80;

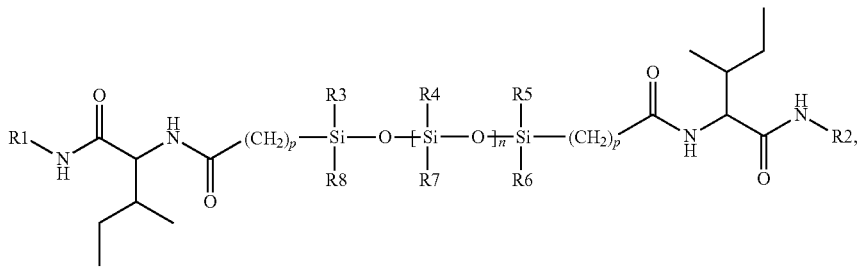

wherein R1 and R2 each independently represent $C_8$-$C_{20}$ alkyl groups, R3 to R8 each independently represent a hydrogen atom, a $C_1$-$C_{12}$ alkyl group, a $C_1$-$C_{12}$ alkoxy group, or an aryl group with or without substitution groups, n represents 0 or an integer of from 1 to 80, and p represents an integer of from 1 to 20; and

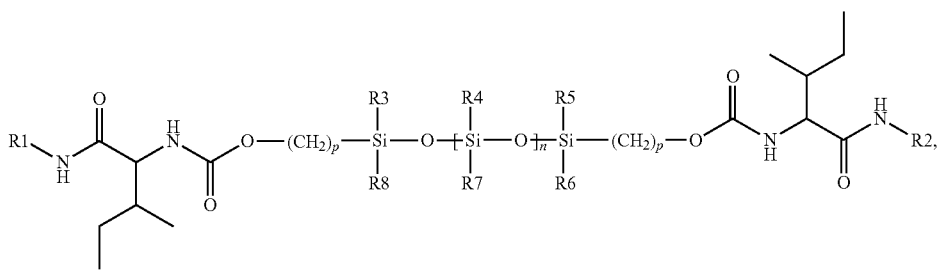

wherein R1 and R2 each independently represent $C_8$-$C_{20}$ alkyl groups, R3 to R8 each independently represent a hydrogen atom, a $C_1$-$C_{12}$ alkyl group, a $C_1$-$C_{12}$ alkoxy group, or an aryl group with or without substitution groups, n represents 0 or an integer of from 1 to 80, and p represents an integer of from 1 to 20.

* * * * *